(12) United States Patent
Taeko et al.

(10) Patent No.: US 9,158,102 B2
(45) Date of Patent: Oct. 13, 2015

(54) MICROSCOPE OBJECTIVE LENS INCLUDING A FIRST LENS GROUP WITH A POSITIVE REFRACTIVE POWER, A SECOND LENS GROUP, AND A THIRD LENS GROUP HAVING A NEGATIVE REFRACTIVE POWER

(71) Applicant: NIKON CORPORATION, Tokyo (JP)

(72) Inventors: Toshi Taeko, Tokyo (JP); Miyagawa Akiko, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 14/586,004

(22) Filed: Dec. 30, 2014

(65) Prior Publication Data

US 2015/0109673 A1 Apr. 23, 2015

Related U.S. Application Data

(60) Division of application No. 12/889,783, filed on Sep. 24, 2010, now Pat. No. 8,958,154, which is a continuation of application No. PCT/JP2009/057161, filed on Apr. 8, 2009.

(30) Foreign Application Priority Data

| Apr. 11, 2008 | (JP) | 2008-103139 |
| Sep. 10, 2008 | (JP) | 2008-231955 |
| Feb. 24, 2009 | (JP) | 2009-040281 |

(51) Int. Cl.
*G02B 5/18* (2006.01)
*G02B 21/02* (2006.01)
(Continued)

(52) U.S. Cl.
CPC ............ *G02B 21/02* (2013.01); *G02B 27/0056* (2013.01); *G02B 27/42* (2013.01); *G02B 27/4211* (2013.01); *G02B 27/4216* (2013.01)

(58) Field of Classification Search
None
See application file for complete search history.

(56) References Cited

U.S. PATENT DOCUMENTS

| 3,041,934 A | 7/1962 | Ruben et al. |
| 5,631,779 A | 5/1997 | Kashima |

(Continued)

FOREIGN PATENT DOCUMENTS

| EP | 1830205 | 9/2007 |
| JP | 6-331898 | 12/1994 |

(Continued)

OTHER PUBLICATIONS

International Search Report mailed Jul. 7, 2009 in corresponding International Application No. PCT/JP2009/057161.

(Continued)

*Primary Examiner* — Arnel C Lavarias

(57) ABSTRACT

A microscope objective lens includes a first lens group, a second lens group, and a third lens group. The first lens group includes a positive lens component having a lens surface positioned nearest to the object side and having a negative refractive power. The second lens group includes a diffractive optical element that joins two diffractive element components respectively made from different optical materials and which has a diffractive optical surface on which diffractive grating grooves are formed on the bonded surface of the two diffractive element components. The third lens group includes at least one achromatic lens component having a negative refractive power, and a lens surface of the third lens group nearest to the image side is arranged so that a concave surface of the lens surface faces the image side.

4 Claims, 25 Drawing Sheets

(51) Int. Cl.
*G02B 27/00* (2006.01)
*G02B 27/42* (2006.01)

(56) References Cited

U.S. PATENT DOCUMENTS

| | | | |
|---|---|---|---|
| 5,748,372 A | 5/1998 | Kitagawa | |
| 7,848,027 B2 | 12/2010 | Yoshida | |
| 8,958,154 B2 * | 2/2015 | Taeko et al. | 359/566 |
| 2008/0094712 A1 | 4/2008 | Miyakawa | |
| 2008/0107903 A1 | 5/2008 | Miyakawa et al. | |
| 2009/0059376 A1 | 3/2009 | Hayakawa | |
| 2011/0102899 A1 * | 5/2011 | Taeko et al. | 359/576 |

FOREIGN PATENT DOCUMENTS

| | | |
|---|---|---|
| JP | 8-286113 | 11/1996 |
| JP | 2000-2838 | 1/2000 |
| JP | 2005-237573 | 9/2005 |
| JP | 2007-11066 | 1/2007 |
| JP | 2007-334120 | 12/2007 |
| JP | 2008-83096 | 4/2008 |
| WO | WO 2006/068138 | 6/2006 |

OTHER PUBLICATIONS

Japanese Office Action issued Dec. 17, 2012 in corresponding Japanese Patent Application No. 2009-040281.
Japanese Office Action issued Aug. 13, 2013 in corresponding Japanese Patent Application No. 2009-040281.
Chinese Office Action issued Apr. 17, 2012 in corresponding Chinese Patent Application No. 200980112811.8.
Chinese Office Action issued Jan. 4, 2013 in corresponding Chinese Patent Application No. 200980112811.8.
Extended Search Report issued Oct. 21, 2013 in corresponding European Patent Application No. 09729761.8.
Notification issued Dec. 9, 2010 in corresponding PCT Application No. PCT/JP2009/057161.
Notification issued Oct. 21, 2010 in corresponding PCT Application No. PCT/JP2009/057161.
Chinese Office Action issued Nov. 17, 2014 in corresponding Chinese Patent Application No. 201310088382.3.
Election Requirement issued Mar. 6, 2014 in related U.S. Appl. No. 12/889,783.
Quayle Office Action issued Jun. 16, 2014 in related U.S. Appl. No. 12/889,783.
Notice of Allowance issued Sep. 30, 2014 in related U.S. Appl. No. 12/889,783.
Office Action issued Mar. 23, 2015 in related U.S. Appl. No. 14/585,976.
Notice of Allowance issued May 11, 2015 in related U.S. Appl. No. 14/585,976.

* cited by examiner

MICROSCOPE OBJECTIVE LENS INCLUDING A FIRST LENS GROUP WITH A POSITIVE REFRACTIVE POWER, A SECOND LENS GROUP, AND A THIRD LENS GROUP HAVING A NEGATIVE REFRACTIVE POWER

CROSS-REFERENCE TO RELATED APPLICATIONS

This application is a divisional of U.S. application Ser. No. 12/889,783 filed Sep. 24, 2010, now allowed, which is a U.S. Continuation application claiming priority benefit under 35 U.S.C. Section 111(a), of PCT International Application No. PCT/JP2009/057161, filed Apr. 8, 2009, which claims earlier priority benefit to Japanese Application No. 2008-103139, filed Apr. 11, 2008, Japanese Application No. 2008-231955, filed Sep. 10, 2008, and Japanese Application No. 2009-040281, filed Feb. 24, 2009, the entire disclosures of which are incorporated by reference as a part of this application.

TECHNICAL FIELD

The present invention relates to a microscope objective lens.

BACKGROUND ART

Conventional microscope objective lenses require large numbers of cemented lenses for favorably correcting various aberrations, in particular, chromatic aberration, and also require the use of anomalous dispersion glass materials for correcting secondary spectra. Accordingly, conventional microscope objective lenses are inevitably expensive. In recent years, high-magnification, large numerical aperture lens systems are being proposed which use a diffractive optical element (DOE) capable of correcting various aberrations, in particular, chromatic aberration including secondary spectra without having to use large numbers of cemented lenses and anomalous dispersion glass materials (for example, refer to Patent Document 1).

Patent Document 1: Japanese Patent Laid-Open No. H06-331898

DISCLOSURE OF THE INVENTION

Problems to be Solved by the Invention

However, such a lens system using a diffractive optical element is problematic in that even if chromatic aberration can be corrected by the diffractive optical element, correcting coma aberration at a large angle of view is difficult and image performance is low in peripheries of the visual field.

The present invention has been made in consideration of the problems described above, and an object thereof is to provide a microscope objective lens capable of sufficiently correcting chromatic aberration while offering a sufficient visual field range in which various aberrations are favorably corrected.

Means for Solving the Problems

In order to solve the problems described above, a microscope objective lens according to a first aspect of the present invention comprises, in order from the object side: a first lens group having a positive refractive power, a second lens group, and a third lens group having a negative refractive power, wherein the first lens group includes a positive lens component having a lens surface positioned nearest to the object side and having a negative refractive power and at least one cemented lens component having a combined positive refractive power, the second lens group includes a diffractive optical element that joins two diffractive element components respectively made from different optical materials and which has a diffractive optical surface on which diffractive grating grooves are formed on the bonded surface of the two diffractive element components, and at least one cemented lens component, and the third lens group includes at least one achromatic lens component and a lens surface of the third lens group nearest to the image side is arranged so that a concave surface of the lens surface faces the image side. In addition, the microscope objective lens is configured such that if f denotes a focal length of the entire system and f12 denotes a combined focal length of the first lens group and the second lens group, then the microscope objective lens preferably satisfies a condition expressed by $$1.5 \leq |f12/f| \leq 2.5, \text{ and}$$

if f denotes a focal length of the entire system and f3 denotes a focal length of the third lens group, then the microscope objective lens preferably satisfies a condition expressed by $10 \leq |f3/f| \leq 20$.

With such a microscope objective lens, if r denotes a curvature radius of the surface having a negative refractive power of the positive lens component provided in the first lens group, n1 denotes a refractive index of an object-side medium of the surface having a negative refractive power with respect to the d line, n2 denotes a refractive index of an image-side medium with respect to the d line, and dR denotes an optical path length from a vertex of the surface having a negative refractive power to the object, then the microscope objective lens satisfies a condition expressed by $|(n2-n1)/(r \cdot dR)| \leq 0.5$, and if f denotes a focal length of the entire system and h denotes a height from an optical axis of a principal ray of a light bundle passing through the diffractive optical surface and corresponding to a maximum field angle, then the microscope objective lens satisfies a condition expressed by $0.1 \leq |h/f|$.

However, a principal ray of a light bundle emitted from an off-axis object point is assumed to be a central ray of a light bundle resulting from restricting a ray emitted in a direction most separated from an optical axis among light bundles emitted from the off-axis object point using a vertex of a ray with a maximum numerical aperture (NA) emitted from an on-axis object point and an appropriate surface in the first lens group and restricting a ray emitted in a direction closest to the optical axis among the light bundles emitted from the off-axis object point using a vertex of the ray with a maximum numerical aperture emitted from the on-axis object point and an appropriate surface in the third lens group.

In addition, if f denotes a focal length of the entire system and f2 denotes a focal length of the second lens group, then such a microscope objective lens preferably satisfies a condition expressed by $$30 \leq |f2/f|.$$

Furthermore, if N denotes the number of diffractive grating grooves of a diffractive optical surface of a diffractive optical element and H denotes an effective radius of the diffractive optical surface, then such a microscope objective lens preferably satisfies a condition expressed by $$2 \leq N/H \leq 10.$$

However, the effective radius H is to be determined by an outermost ray of a light bundle determined when restricting a ray with a maximum numerical aperture emitted from an on-axis object point and a ray emitted in a direction most separated from an optical axis among light bundles emitted from an off-axis object point using a vertex of the ray with a maximum numerical aperture emitted from the on-axis object point and an appropriate surface in the first lens group and restricting a ray emitted in a direction closest to the optical axis among the light bundles emitted from the off-axis object point using a vertex of the ray with a maximum numerical aperture emitted from the on-axis object point and an appropriate surface in the third lens group.

In addition, in order to solve the problems described above, a microscope objective lens according to a second aspect of the present invention comprises, in order from the object side: a first lens group having a positive refractive power, a second lens group having a positive refractive power, and a third lens group having a negative refractive power, wherein the first lens group includes a positive lens component having a lens surface positioned nearest to the object side and having a negative refractive power and at least one cemented lens component having a combined positive refractive power, the second lens group includes a diffractive optical element that joins two diffractive element components respectively made from different optical materials and which has a diffractive optical surface on which diffractive grating grooves are formed on the bonded surface of the two diffractive element components, and at least one cemented lens component, and the third lens group includes at least one achromatic lens component having a combined negative refractive power and a lens surface of the third lens group nearest to the image side is arranged so that a concave surface of the lens surface faces the image side. Moreover, the microscope objective lens is configured such that if r denotes a curvature radius of the surface having a negative refractive power of the positive lens component provided in the first lens group, n1 denotes a refractive index of an object-side medium of the surface having a negative refractive power with respect to the d line, n2 denotes a refractive index of an image-side medium with respect to the d line, and d0 denotes a distance on an optical axis from a vertex of the surface having a negative refractive power to the object, then the microscope objective lens satisfies a condition expressed by $|(n2-n1)/(r \cdot d0)| < 0.01$, and if f denotes a focal length of the entire system and h denotes a height from an optical axis of a principal ray of a light bundle passing through the diffractive optical surface and corresponding to a maximum field angle, then the microscope objective lens satisfies a condition expressed by $0.05 < |h/f|$.

However, a principal ray of a light bundle emitted from an off-axis object point is assumed to be a central ray of a light bundle resulting from restricting a ray emitted in a direction most separated from an optical axis among light bundles emitted from the off-axis object point using a vertex of a ray with a maximum numerical aperture (NA) emitted from an on-axis object point and an appropriate surface in the first lens group and restricting a ray emitted in a direction closest to the optical axis among the light bundles emitted from the off-axis object point using a vertex of the ray with a maximum numerical aperture emitted from the on-axis object point and an appropriate surface in the third lens group.

With such a microscope objective lens, if f denotes a focal length of the entire system and f12 denotes a combined focal length of the first lens group and the second lens group, then the microscope objective lens satisfies a condition expressed by $1.5 \leq |f12/f| \leq 4$, and if f denotes a focal length of the entire system and f3 denotes a focal length of the third lens group, then the microscope objective lens preferably satisfies a condition expressed by $1 \leq |f3/f| \leq 3.5$.

In addition, if f denotes a focal length of the entire system and f2 denotes a focal length of the second lens group, then such a microscope objective lens preferably satisfies a condition expressed by $5 \leq |f2/f|$.

Furthermore, if N denotes the number of diffractive grating grooves of a diffractive optical surface of a diffractive optical element and H denotes an effective radius of the diffractive optical surface, then such a microscope objective lens preferably satisfies a condition expressed by $2 \leq N/H \leq 10$.

However, the effective radius H is to be determined by an outermost ray of a light bundle determined when restricting a ray with a maximum numerical aperture emitted from an on-axis object point and a ray emitted in a direction most separated from an optical axis among light bundles emitted from an off-axis object point using a vertex of the ray with a maximum numerical aperture emitted from the on-axis object point and an appropriate surface in the first lens group and restricting a ray emitted in a direction closest to the optical axis among the light bundles emitted from the off-axis object point using a vertex of the ray with a maximum numerical aperture emitted from the on-axis object point and an appropriate surface in the third lens group.

Furthermore, in order to solve the problems described above, a microscope objective lens according to a third aspect of the present invention comprises, in order from the object side: a first lens group having a positive refractive power, a second lens group, and a third lens group having a negative refractive power, wherein the first lens group includes a positive lens component having a lens surface positioned nearest to the object side and having a negative refractive power, the second lens group includes a diffractive optical element that joins two diffractive element components respectively made from different optical materials and which has a diffractive optical surface on which diffractive grating grooves are formed on the bonded surface of the two diffractive element components, and the third lens group includes at least one achromatic lens component having a negative refractive power and a lens surface of the third lens group nearest to the image side is arranged so that a concave surface of the lens surface faces the image side. In addition, if r denotes a curvature radius of the lens surface positioned nearest to the object side and having a negative refractive power among the lens surfaces having a negative refractive power included in the positive lens component provided in the first lens group, n1 denotes a refractive index of an object-side medium of the lens surface having a negative refractive power with respect to the d line, n2 denotes a refractive index of an image-side medium with respect to the d line, and d0 denotes a distance on an optical axis from a vertex of the lens surface having a negative refractive power to the object, then the microscope objective lens satisfies a condition expressed by $|(n2-n1)/(r \cdot d0)| \leq 0.1$, and if f denotes a focal length of the entire system and h denotes a height from an optical axis of a principal ray of a light bundle passing through the diffractive optical surface and corresponding to a maximum field angle, then the microscope objective lens satisfies a condition expressed by $$0.01 \leq |h/f| \leq 0.04.$$

However, a principal ray of a light bundle emitted from an off-axis object point is assumed to be a central ray of a light bundle resulting from restricting a ray emitted in a direction most separated from an optical axis among light bundles emitted from the off-axis object point using a vertex of a ray with a maximum numerical aperture (NA) emitted from an on-axis object point and an appropriate surface in the first lens group and restricting a ray emitted in a direction closest to the optical axis among the light bundles emitted from the off-axis object point using a vertex of the ray with a maximum numerical aperture emitted from the on-axis object point and an appropriate surface in the third lens group.

With such a microscope objective lens, if f12 denotes a combined focal length of the first lens group and the second lens group, then the microscope objective lens preferably satisfies a condition expressed by $$1 \leq |f12/f| \leq 1.5.$$

In addition, if f2 denotes a focal length of the second lens group, then such a microscope objective lens preferably satisfies a condition expressed by $$10 \leq |f2/f|.$$

Furthermore, if N denotes the number of diffractive grating grooves of a diffractive optical surface of a diffractive optical element and H denotes an effective radius of the diffractive optical surface, then such a microscope objective lens preferably satisfies a condition expressed by $$2 \leq N/H \leq 5.$$

However, the effective radius H is to be determined by an outermost ray of a light bundle determined when restricting a ray with a maximum numerical aperture emitted from an on-axis object point and a ray emitted in a direction most separated from an optical axis among light bundles emitted from an off-axis object point using a vertex of the ray with a maximum numerical aperture emitted from the on-axis object point and an appropriate surface in the first lens group and restricting a ray emitted in a direction closest to the optical axis among the light bundles emitted from the off-axis object point using a vertex of the ray with a maximum numerical aperture emitted from the on-axis object point and an appropriate surface in the third lens group.

Moreover, if nd1, nF1, and nC1 respectively denote refractive indexes of a material of a diffractive element component whose refractive index and Abbe's number are smaller among the two diffractive element components of the diffractive optical element with respect to the d line, the F line, and the C line, and nd2, nF2, and nC2 respectively denote refractive indexes of a material of a diffractive element component whose refractive index and Abbe's number are greater among the two diffractive element components of the diffractive optical element with respect to the d line, the F line, and the C line, then such a microscope objective lens preferably satisfies conditions expressed by $$nd1 \leq 1.54,$$

$$0.0145 \leq nF1 - nC1,$$

$$1.55 \leq nd2, \text{ and}$$

$$nF2 - nC2 \leq 0.013.$$

Advantages of the Invention

By configuring a microscope objective lens according to the present invention as described above, a microscope objective lens capable of sufficiently correcting chromatic aberration while offering a sufficient visual field range in which various aberrations are favorably corrected can be provided.

DESCRIPTION OF SYMBOLS

OL(OL1 to OL12) microscope objective lens
G1 first lens group
G2 second lens group
G3 third lens group
GD diffractive optical element

BEST MODE FOR CARRYING OUT THE INVENTION

First Embodiment

Figure 1:
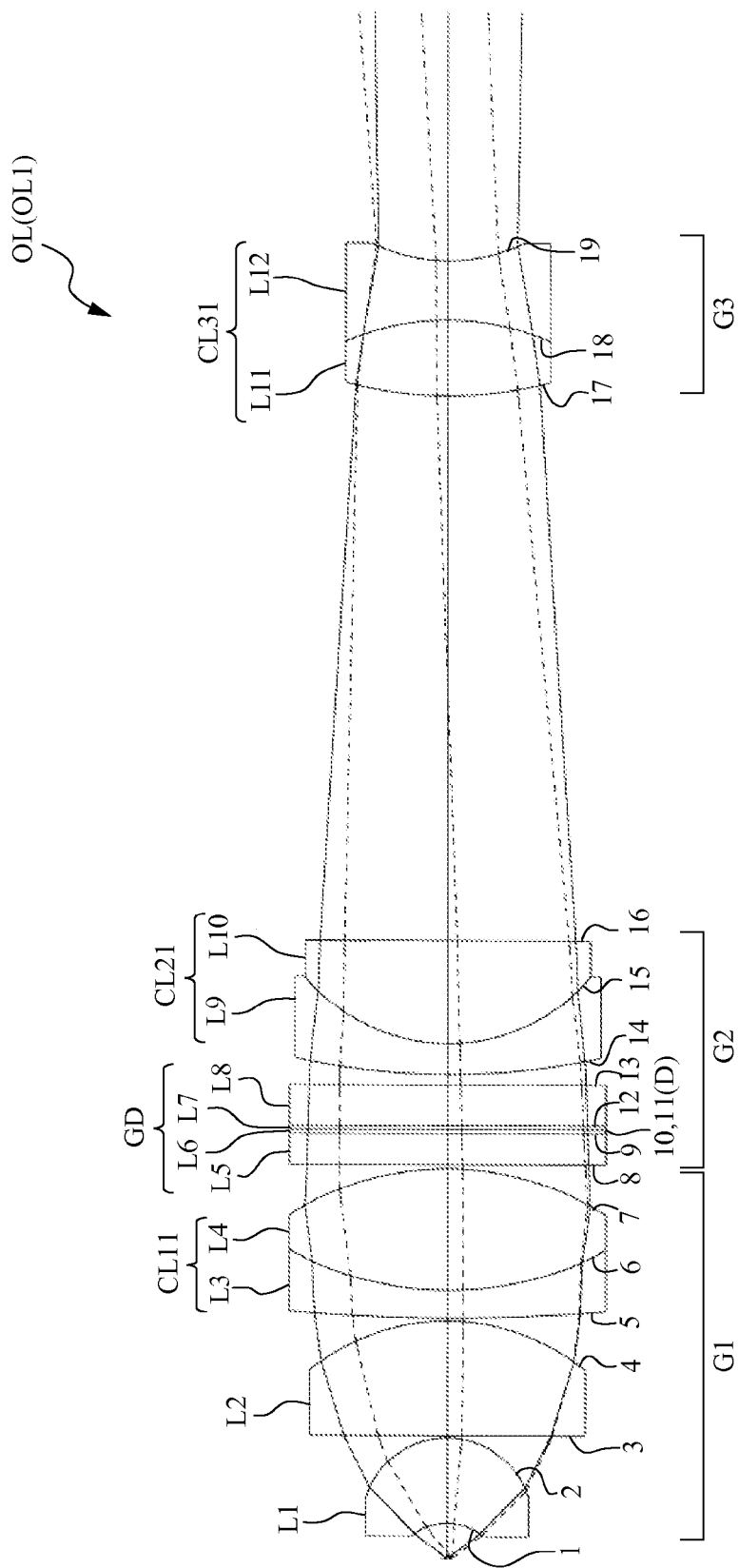
FIG. 1 is a lens configuration diagram of a microscope objective lens according to a first example.

Hereinafter, preferred embodiments of the present invention will be described with reference to the drawings. First, a high-magnification microscope objective lens will be described. FIG. 1 illustrates a microscope objective lens OL according to a first embodiment comprising, in order from the object side, a first lens group G1 having a positive refractive power, a second lens group G2, and a third lens group G3 having a negative refractive power.

In the microscope objective lens OL described above, the first lens group G1 is a lens group for approximating a divergent light bundle from an object to a parallel light bundle. To this end, the first lens group G1 is configured so as to include a positive lens component (for example, a positive meniscus lens L1 illustrated in FIG. 1) having a lens surface with a negative refractive power, and at least one achromatizing lens component (a cemented lens CL11 illustrated in FIG. 1) that joins a positive lens and a negative lens. The positive lens component may be configured using a single lens or a cemented lens. If r denotes a curvature radius of the lens surface (for example, a first surface illustrated in FIG. 1) having a negative refractive power included in the positive lens component, n1 denotes a refractive index of an object-side medium of the lens surface with respect to the d line, n2 denotes a refractive index of an image-side medium of the lens surface with respect to the d line, and dR denotes an optical path length from the object to a vertex of a lens surface (in other words, the first surface illustrated in FIG. 1) nearest to the object side, then the following conditional expression (1) is satisfied.

$$|(n2-n1)/(r \cdot dR)| \leq 0.5 \quad (1)$$

The conditional expression (1) defines a refractive power of the aforementioned lens surface having a negative refractive power included in the positive lens component provided in the first lens group G1. When an upper limit of the conditional expression (1) is exceeded, correction of a Petzval sum becomes difficult, in turn making it difficult to secure field flatness up to large angles of view. Further preferably, the correction of a Petzval sum can be performed more favorably by setting the upper limit of the conditional expression (1) to 0.4.

In addition, the second lens group G2 is a lens group that receives an approximately parallel light bundle emitted from the first lens group G1 and corrects spherical aberration and chromatic aberration, and is provided with a diffractive optical element GD for correcting, in particular, chromatic aberration. The diffractive optical element GD includes a diffractive optical surface D on which a grid structure with several to several hundreds of fine grooves or slits per 1 mm are concentrically formed, and characteristically refracts light incident to the diffractive optical surface D to a direction determined by a grid pitch (spacing of the diffractive grating grooves) and a wavelength of the incident light. In addition, since the diffractive optical element GD (diffractive optical surface D) has a negative dispersion value (in the examples of the present application, Abbe's number=−3.453), has a large dispersion, and has high anomalous dispersibility (in the examples of the present application, partial dispersion ratio (ng−nF)/(nF−nC)=0.2956), the diffractive optical element GD (diffractive optical surface D) has strong chromatic aberration-correcting capabilities. While the Abbe's number of optical glass typically ranges from 30 to 80, the Abbe's number of the diffractive optical element has a negative value. In other words, the dispersion characteristics of the diffractive optical surface D of the diffractive optical element GD are the opposite of ordinary glass (refractive optical elements) in that the refractive index becomes smaller as the wavelength of light becomes shorter, and the longer the wavelength of light, the greater the light is bent. Therefore, a significant achromatizing effect can be obtained by combining the diffractive optical element GD with an ordinary refractive optical element. Accordingly, the use of the diffractive optical element GD enables chromatic aberration to be favorably corrected.

The diffractive optical element GD according to the present embodiment is a so-called "bonded-multilayer diffractive optical element" in which two diffractive element components (for example, in the case of FIG. 1, optical members L6 and L7) made from different optical materials are joined and diffractive grating grooves are provided on the bonded surface of the two diffractive element components to make up the diffractive optical surface D. Therefore, the diffractive optical element is capable of attaining high diffraction efficiency over a broad wavelength range from the g line to the C line. Accordingly, the microscope objective lens OL according to the present embodiment can be used in a broad wavelength range. When using a primary diffracted light with a transmissive diffractive optical element, a diffraction efficiency indicates a ratio η (=I1/I0×100 [%]) of the intensity I1 of the primary diffracted light to incident intensity I0.

In addition, with a bonded-multilayer diffractive optical element, since the manufacturing process can be simplified in comparison to a so-called separated-multilayer diffractive optical element in which two diffractive element components, on which diffractive grating grooves are formed, are proximally arranged so as to face each other. Therefore, a bonded-multilayer diffractive optical element has a virtue of having high mass production efficiency and a high diffraction efficiency with respect to an angle of incidence of a ray. Consequently, the microscope objective lens OL according to the present invention which uses a bonded-multilayer diffractive optical element can be more readily manufactured and diffraction efficiency can be improved.

If f denotes a focal length of the entire system of the microscope objective lens OL and h denotes a height from an optical axis of a principal ray of a light bundle passing through the diffractive optical surface D and corresponding to a maximum field angle, then the diffractive optical element GD is to be arranged at a position satisfying the following conditional expression (2).

$$0.1 \leq |h/f| \quad (2)$$

However, in the microscope lens OL illustrated in FIG. 1, a principal ray of a light bundle emitted from an off-axis object point is defined as a central ray of an off-axis light bundle determined by restricting a ray emitted in a direction most separated from an optical axis among light bundles emitted from the off-axis object point using a vertex of a ray with a maximum numerical aperture emitted from an on-axis object point and an image-side surface of a lens L2 in the first lens group G1 and restricting a ray emitted in a direction closest to the optical axis among the light bundles emitted from the off-axis object point using a vertex of the ray with a maximum numerical aperture emitted from the on-axis object point and an object-side surface of a lens L11 in the third lens group G3.

By arranging the diffractive optical element GD at a position satisfying the conditional expression (2), the chromatic aberration-correcting capability of the diffractive optical element GD becomes effective for correcting not only on-axis chromatic aberration but lateral chromatic aberration as well. Moreover, primary achromatization must be performed to a certain degree using a refractive lens of the second lens group G2 so as to prevent the minimum pitch of the diffractive grating grooves of the diffractive optical element GD from decreasing. To this end, at least one achromatizing lens component (a cemented lens component CL21 illustrated in FIG.

1) in which a positive lens and a negative lens are joined must be provided in the second lens group G2.

The third lens group G3 is a lens group for approximating a convergent light bundle emitted from the second lens group G2 to a parallel light bundle. The third lens group G3 is configured so as to include at least one achromatic lens component (a cemented lens component CL31 made up of a biconvex lens L11 and a biconcave lens L12 illustrated in FIG. 1) having a negative refractive power. In addition, an image-side surface of a lens positioned nearest to the image side among the third lens group G3 is formed so as to have a concave shape on the image side. Since the first lens group G1 and the second lens group G2 have positive refractive powers, a light bundle incident to the third lens group G3 is a convergent light bundle. The third lens group G3 importantly receives the convergent light bundle and converts the convergent light bundle into a parallel light bundle while suppressing the occurrence of spherical aberration and coma aberration. A surface nearest to the image side among the third lens group G3 is a surface responsible for a substantial portion of the negative refractive power of the third lens group G3. By arranging this surface as a surface that is concave to the image side, an angle of incidence of the convergent rays to the final surface can be reduced and, in particular, occurrences of high-order coma aberration and the like can be reliably suppressed. The achromatic lens component can be arranged not only as a cemented lens but can also be configured using a plurality of lenses positioned separated by air to an extent where the chromatic aberration-correcting capability is not significantly diminished.

Furthermore, if f denotes a focal length of the entire system and f12 denotes a combined focal length of the first lens group G1 and the second lens group G2, then the microscope objective lens OL desirably satisfies a condition expressed by the following conditional expression (3).

$$1.5 \le |f12/f| \le 2.5 \tag{3}$$

The conditional expression (3) represents a condition for securing a large numerical aperture. When falling below a lower limit of the conditional expression (1), the combined focal length f12 of the first and second lens groups G1 and G2 becomes shorter than the focal length f of the entire system. As a result, securing numerical aperture and correcting spherical aberration become difficult. Conversely, when an upper limit of the conditional expression (3) is exceeded, the combined focal length f12 of the first and second lens groups G1 and G2 becomes longer than the focal length f of the entire system. As a result, total length becomes longer due to insufficient convergence of rays, and correction of various aberrations at large angles of view and secondary spectra of chromatic aberration becomes difficult.

In addition, if f denotes a focal length of the entire system and f3 denotes a focal length of the third lens group G3, then the microscope objective lens OL desirably satisfies the following conditional expression (4).

$$10 \le |f3/f| \le 20 \tag{4}$$

The conditional expression (4) represents a condition for favorably correcting spherical aberration including changes due to color and for securing a sufficient visual field. When falling below a lower limit of the conditional expression (4), the focal length f3 of the third lens group G3 becomes shorter than the focal length f of the entire system. As a result, variances in spherical aberration arise from color to color and high-order bending occurs. Conversely, when exceeding an upper limit of the conditional expression (4), the focal length f3 of the third lens group G3 becomes longer than the focal length f of the entire system. As a result, insufficient correction of spherical aberration occurs and securing a sufficient visual field with good image performance becomes difficult.

Meanwhile, since the diffractive optical element GD is as thick as the diffractive grating grooves, even a small change in the angle of incidence results in a significant change in diffraction efficiency. In other words, when the angle of incidence to the diffractive optical surface D becomes large, diffraction efficiency drops significantly and rays of orders not blazed become manifested as flares. Accordingly, if f denotes a focal length of the entire system and f2 denotes a focal length of the second lens group G2, then the microscope objective lens OL desirably satisfies the following conditional expression (5).

$$30 \le |f2/f| \tag{5}$$

The conditional expression (5) represents a condition for controlling an angle of incidence to the diffractive optical element GD using power distribution. When falling below a lower limit of the conditional expression (5), the focal length f2 of the second lens group G2 becomes shorter than the focal length f of the entire system. As a result, a refracting angle of a ray in the second lens group G2 becomes large, in turn increasing the angle of incidence to the diffractive optical element GD. In addition, since a range of the combined focal length f12 of the first and second lens groups G1 and G2 with respect to the focal length f of the entire system is defined by the conditional expression (3) given above, when falling below a lower limit of the conditional expression (5), the power of the first lens group G1 weakens, aberrations occurring at the first lens group G1 is reduced, and aberrations, in particular, spherical aberration occurring at the second lens group G2 becomes larger. As a result, attaining a balance between aberrations of the first lens group G1 and the second lens group G2 becomes difficult.

Furthermore, if N denotes the number of diffractive grating grooves of the diffractive optical surface D of the diffractive optical element GD and H denotes an effective radius of the diffractive optical surface D, then the microscope objective lens OL desirably satisfies the following conditional expression (6).

$$2 \le N/H \le 10 \tag{6}$$

However, in the microscope objective lens OL illustrated in FIG. 1, the effective radius H is to be defined by an outermost ray of a light bundle determined when restricting a ray with a maximum numerical aperture emitted from an on-axis object point and a ray emitted in a direction most separated from an optical axis among light bundles emitted from an off-axis object point using a vertex of the ray with a maximum numerical aperture emitted from the on-axis object point and an image-side surface of the lens L2 in the first lens group G1 and restricting a ray emitted in a direction closest to the optical axis among the light bundles emitted from the off-axis object point using a vertex of the ray with a maximum numerical aperture emitted from the on-axis object point and an object-side surface of the lens L11 in the third lens group G3.

The conditional expression (6) is a conditional expression defining appropriate ranges of the number N of diffractive grating grooves of the diffractive optical surface D and the effective radius H. When falling below a lower limit of the conditional expression (6), when achromatization is performed at the d line and the g line, insufficient achromatization of on-axis chromatic aberration occurs at the C line and the F line (secondary spectrum). On the other hand, when an upper limit of the conditional expression (6) is exceeded, when achromatization is performed at the d line and the g line, excessive achromatization of on-axis chromatic aberration occurs at the C line and the F line (secondary spectrum). In addition, the minimum pitch width of the diffractive grating grooves formed on the diffractive optical element GD decreases, making it difficult to maintain manufacturing accuracy.

Furthermore, if nd1, nF1, and nC1 respectively denote refractive indexes of a material of a diffractive element component whose refractive index and Abbe's number are smaller among the two diffractive element components of the diffractive optical element GD with respect to the d line, the F line, and the C line, and nd2, nF2, and nC2 respectively denote refractive indexes of a material of a diffractive element component whose refractive index and Abbe's number are greater among the two diffractive element components of the diffractive optical element with respect to the d line, the F line, and the C line, then the microscope objective lens OL desirably satisfies the following conditional expressions (7) to (10).

$$nd1 \leq 1.54 \tag{7}$$

$$0.0145 \leq nF1 - nC1 \tag{8}$$

$$1.55 \leq nd2 \tag{9}$$

$$nF2 - nC2 \leq 0.013 \tag{10}$$

The conditional expressions (7) to (10) respectively define refractive indexes and dispersions with respect to the F line and the C line (nF−nC) of the materials of the two diffractive element components that make up the diffractive optical element GD. Satisfying the conditional expressions enables the two different diffractive element components to be appressed and bonded at higher efficiency to form the diffractive optical surface D. Accordingly, diffraction efficiency of 90% or higher can be achieved in a broad wavelength range from the g line to the C line. Examples of resins used as such optical materials are described in Japanese Patent Application No. 2004-367607 and Japanese Patent Application No. 2005-237573. Exceeding an upper limit or falling below a lower limit of each conditional expression (7) to (10) makes it difficult for the diffractive optical element GD in the achromatizing lens system according to the present embodiment to achieve a diffraction efficiency of 90% or higher across a broad wavelength range. As a result, maintaining the advantages of a bonded-multilayer diffractive optical element becomes difficult.

Second Embodiment

Figure 11:
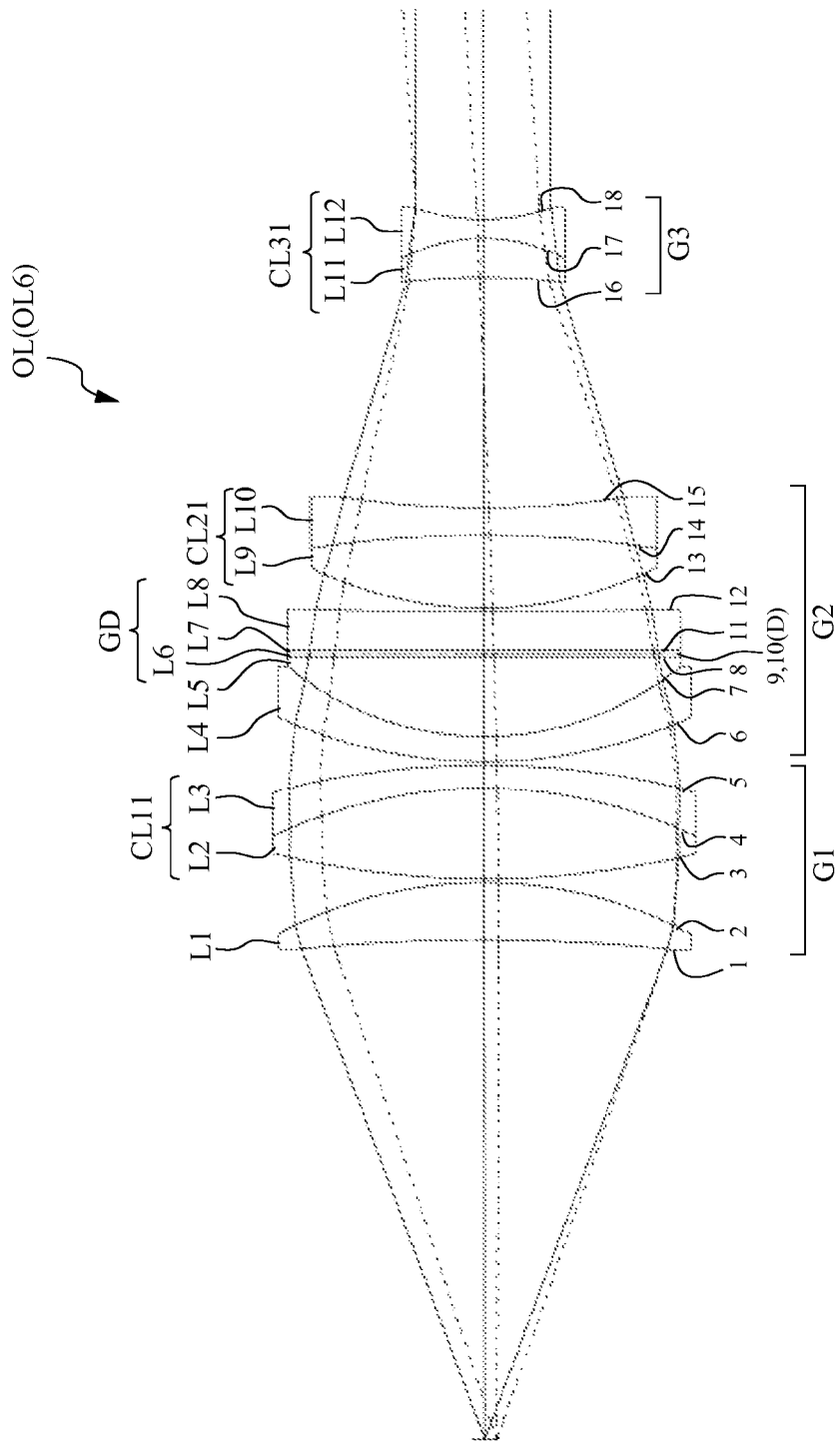
FIG. 11 is a lens configuration diagram of a microscope objective lens according to a sixth example.

Next, a case of a microscope objective lens having a long working distance will be described. FIG. 11 illustrates a microscope objective lens OL according to a second embodiment comprising, in order from the object side, a first lens group G1 having a positive refractive power, a second lens group G2 having a positive refractive power, and a third lens group G3 having a negative refractive power.

In the microscope objective lens OL described above, the first lens group G1 is a lens group for approximating a divergent light bundle from an object to a parallel light bundle. To this end, the first lens group G1 is configured so as to include a positive lens component (for example, a positive meniscus lens L1 illustrated in FIG. 11) having a lens surface with a negative refractive power, and at least one achromatizing lens component (a cemented lens CL11 illustrated in FIG. 11) that joins a positive lens and a negative lens. The positive lens component may be configured using a single lens or a cemented lens. If r denotes a curvature radius of the lens surface (for example, a first surface illustrated in FIG. 11) having a negative refractive power included in the positive lens component, n1 denotes a refractive index of an object-side medium of the lens surface with respect to the d line, n2 denotes a refractive index of an image-side medium of the lens surface with respect to the d line, and d0 denotes a distance on the optical path from the object to a vertex of the lens surface (for example, the first surface that is a lens surface nearest to the object side in FIG. 11), then the following conditional expression (1) is satisfied.

$$|(n2-n1)/(r \cdot d0)| < 0.01 \tag{1}$$

The conditional expression (1) defines a refractive power of the aforementioned lens surface having a negative refractive power included in the positive lens component provided in the first lens group G1. When an upper limit of the conditional expression (1) is exceeded, correction of a Petzval sum becomes difficult, in turn making it difficult to secure field flatness up to large angles of view. In addition, a sufficiently long working distance can no longer be secured. Further preferably, the correction of a Petzval sum can be performed more favorably by setting the upper limit of the conditional expression (1) to 0.008.

In addition, the second lens group G2 is a lens group that receives an approximately parallel light bundle emitted from the first lens group G1 and corrects spherical aberration and chromatic aberration, and is provided with a diffractive optical element GD for correcting, in particular, chromatic aberration.

The diffractive optical element GD according to the present embodiment is a so-called "bonded-multilayer diffractive optical element" in which two diffractive element components (for example, in the case of FIG. 11, optical members L6 and L7) made from different optical materials are joined and diffractive grating grooves are provided on the bonded surface of the two diffractive element components to make up the diffractive optical surface D. Therefore, the diffractive optical element is capable of attaining a high diffraction efficiency over a broad wavelength range from the g line to the C line. Accordingly, the microscope objective lens OL according to the present embodiment can be used in a broad wavelength range. When using a primary diffracted light with a transmissive diffractive optical element, a diffraction efficiency indicates a ratio η (=I1/I0×100 [%]) of the intensity I1 of the primary diffracted light to incident intensity I0.

If f denotes a focal length of the entire system of the microscope objective lens OL and h denotes a height from an optical axis of a principal ray of a light bundle passing through the diffractive optical surface D (a tenth surface illustrated in FIG. 11) and corresponding to a maximum field angle, then the diffractive optical element GD is to be arranged at a position satisfying the following conditional expression (2).

$$0.05 < |h/f| \tag{2}$$

However, in the microscope objective lens OL illustrated in FIG. 11, a principal ray of a light bundle emitted from an off-axis object point is defined as a central ray of an off-axis light bundle determined by restricting a ray emitted in a direction most separated from an optical axis among light bundles emitted from the off-axis object point using a vertex of a ray with a maximum numerical aperture emitted from an on-axis object point and an object-side surface of a lens L1 in the first lens group G1 and restricting a ray emitted in a direction closest to the optical axis among the light bundles emitted from the off-axis object point using a vertex of the ray with a maximum numerical aperture emitted from the on-axis object point and an image-side surface of a lens L12 in the third lens group G3.

By arranging the diffractive optical element GD at a position satisfying the conditional expression (2), the chromatic aberration-correcting capability of the diffractive optical element GD becomes effective for correcting not only on-axis chromatic aberration but lateral chromatic aberration as well. Moreover, primary achromatization must be performed to a certain degree using a refractive lens of the second lens group G2 so as to prevent the minimum pitch of the diffractive grating grooves of the diffractive optical element GD from decreasing. To this end, at least one achromatizing lens component (for example, a cemented lens component CL21 illustrated in FIG. 11) in which a positive lens and a negative lens are joined must be provided in the second lens group G2.

The third lens group G3 is a lens group for approximating a convergent light bundle emitted from the second lens group G2 to a parallel light bundle. The third lens group G3 is configured so as to include at least one achromatic lens component (for example, a cemented lens component CL31 made up of a positive meniscus lens L11 and a biconcave lens L12 illustrated in FIG. 11) having a negative refractive power. In addition, an image-side surface (for example, an eighteenth surface illustrated in FIG. 1) of a lens positioned nearest to the image side among the third lens group G3 is formed so as to have a concave shape on the image side. Since the first lens group G1 and the second lens group G2 have positive refractive powers, a light bundle incident to the third lens group G3 is a convergent light bundle. The third lens group G3 is responsible for receiving the convergent light bundle and converting the convergent light bundle into a parallel light bundle while suppressing the occurrence of spherical aberration and coma aberration. A surface nearest to the image side among the third lens group G3 is a surface responsible for a substantial portion of the negative refractive power of the third lens group G3. By arranging this surface as a surface that is concave to the image side, an angle of incidence of the convergent rays to the final surface can be reduced and, in particular, occurrences of high-order coma aberration and the like can be reliably suppressed. The achromatic lens component can be arranged not only as a cemented lens but can also be configured using a plurality of lenses positioned separated by air to an extent where the chromatic aberration-correcting capability is not significantly diminished.

Furthermore, if f denotes a focal length of the entire system and f12 denotes a combined focal length of the first lens group G1 and the second lens group G2, then the microscope objective lens OL desirably satisfies a condition expressed by the following conditional expression (3).

$$1.5 \leq |f12/f| \leq 4 \tag{3}$$

The conditional expression (3) represents a condition for securing sufficient numerical aperture while securing sufficient working distance. When falling below a lower limit of the conditional expression (3), the combined focal length f12 of the first and second lens groups G1 and G2 becomes shorter than the focal length f of the entire system. As a result, securing numerical aperture and correcting spherical aberration become difficult. Conversely, when an upper limit of the conditional expression (3) is exceeded, the combined focal length f12 of the first and second lens groups G1 and G2 becomes longer than the focal length f of the entire system. As a result, total length becomes longer due to insufficient convergence of rays, and correction of various aberrations at large angles of view and secondary spectra of chromatic aberration becomes difficult.

In addition, if f denotes a focal length of the entire system and f3 denotes a focal length of the third lens group G3, then the microscope objective lens OL desirably satisfies the following conditional expression (4).

$$1 \leq |f3/f| \leq 3.5 \tag{4}$$

The conditional expression (4) represents a condition for favorably correcting spherical aberration including changes due to color and for securing a sufficient visual field. When falling below a lower limit of the conditional expression (4), the focal length f3 of the third lens group G3 becomes shorter than the focal length f of the entire system. As a result, variances in spherical aberration arise from color to color and high-order bending occurs. Conversely, when exceeding an upper limit of the conditional expression (4), the focal length f3 of the third lens group G3 becomes longer than the focal length f of the entire system. As a result, insufficient correction of spherical aberration occurs and securing a sufficient visual field with good imaging performance becomes difficult.

Meanwhile, since the diffractive optical element GD is as thick as the diffractive grating grooves, even a small change in the angle of incidence results in a significant change in diffraction efficiency. In other words, when the angle of incidence to the diffractive optical surface D becomes large, diffraction efficiency drops significantly and rays of orders not blazed become manifested as flares. Accordingly, if f denotes a focal length of the entire system and f2 denotes a focal length of the second lens group G2, then the microscope objective lens OL desirably satisfies the following conditional expression (5).

$$5 \leq |f2/f| \tag{5}$$

The conditional expression (5) represents a condition for controlling an angle of incidence to the diffractive optical element GD using power distribution. When falling below a lower limit of the conditional expression (5), the focal length f2 of the second lens group G2 becomes shorter than the focal length f of the entire system. As a result, a refracting angle of a ray in the second lens group G2 becomes large, in turn increasing the angle of incidence to the diffractive optical element GD. In addition, since a range of the combined focal length f12 of the first and second lens groups G1 and G2 with respect to the focal length f of the entire system is defined by the conditional expression (3) given above, when falling below a lower limit of the conditional expression (5), the power of the first lens group G1 weakens, aberrations occurring at the first lens group G1 is reduced, and aberrations, in particular, spherical aberration occurring at the second lens group G2 becomes larger. As a result, attaining a balance between aberrations of the first lens group G1 and the second lens group G2 becomes difficult.

Furthermore, if N denotes the number of diffractive grating grooves of the diffractive optical surface D of the diffractive optical element GD and H denotes an effective radius of the diffractive optical surface D, then the microscope objective lens OL desirably satisfies the following conditional expression (6).

$$2 \leq N/H \leq 10 \tag{6}$$

However, in the microscope objective lens OL illustrated in FIG. 11, the effective radius H is to be defined by an outermost ray of a light bundle determined when restricting a ray with a maximum numerical aperture emitted from an on-axis object point and a ray emitted in a direction most separated from an optical axis among light bundles emitted from an off-axis object point using a vertex of a ray with a maximum numerical aperture emitted from the on-axis object point and an object-side surface of the lens L1 in the first lens group G1 and restricting a ray emitted in a direction closest to the optical axis among the light bundles emitted from the off-axis object point using a vertex of the ray with a maximum numerical aperture emitted from the on-axis object point and an image-side surface of the lens L12 in the third lens group G3.

The conditional expression (6) is a conditional expression defining appropriate ranges of the number N of diffractive grating grooves of the diffractive optical surface D and the effective radius H. When falling below a lower limit of the conditional expression (6), when achromatization is performed at the d line and the g line, insufficient achromatization of on-axis chromatic aberration occurs at the C line and the F line (secondary spectrum). On the other hand, when an upper limit of the conditional expression (6) is exceeded, when achromatization is performed at the d line and the g line, excessive achromatization of on-axis chromatic aberration occurs at the C line and the F line (secondary spectrum). In addition, the minimum pitch width of the diffractive grating grooves formed on the diffractive optical element GD decreases, making it difficult to maintain manufacturing accuracy.

Furthermore, if nd1, nF1, and nC1 respectively denote refractive indexes of a material of a diffractive element component whose refractive index and Abbe's number are smaller among the two diffractive element components of the diffractive optical element GD with respect to the d line, the F line, and the C line, and nd2, nF2, and nC2 respectively denote refractive indexes of a material of a diffractive element component whose refractive index and Abbe's number are greater among the two diffractive element components of the diffractive optical element with respect to the d line, the F line, and the C line, then the microscope objective lens OL desirably satisfies the following conditional expressions (7) to (10).

$$nd1 \leq 1.54 \quad (7)$$

$$0.0145 \leq nF1-nC1 \quad (8)$$

$$1.55 \leq nd2 \quad (9)$$

$$nF2-nC2 \leq 0.013 \quad (10)$$

The conditional expressions (7) to (10) respectively define refractive indexes and dispersions with respect to the F line and the C line (nF−nC) of the materials of the two diffractive element components that make up the diffractive optical element GD. Satisfying the conditional expressions enables the two different diffractive element components to be appressed and bonded at higher efficiency to form the diffractive optical surface D. Accordingly, diffraction efficiency of 90% or higher can be achieved in a broad wavelength range from the g line to the C line. Exceeding an upper limit or falling below a lower limit of each conditional expression (7) to (10) makes it difficult for the diffractive optical element GD in the achromatizing lens system according to the present embodiment to achieve a diffraction efficiency of 90% or higher across a broad wavelength range. As a result, maintaining the advantages of a bonded-multilayer diffractive optical element becomes difficult.

Third Embodiment

Figure 19:
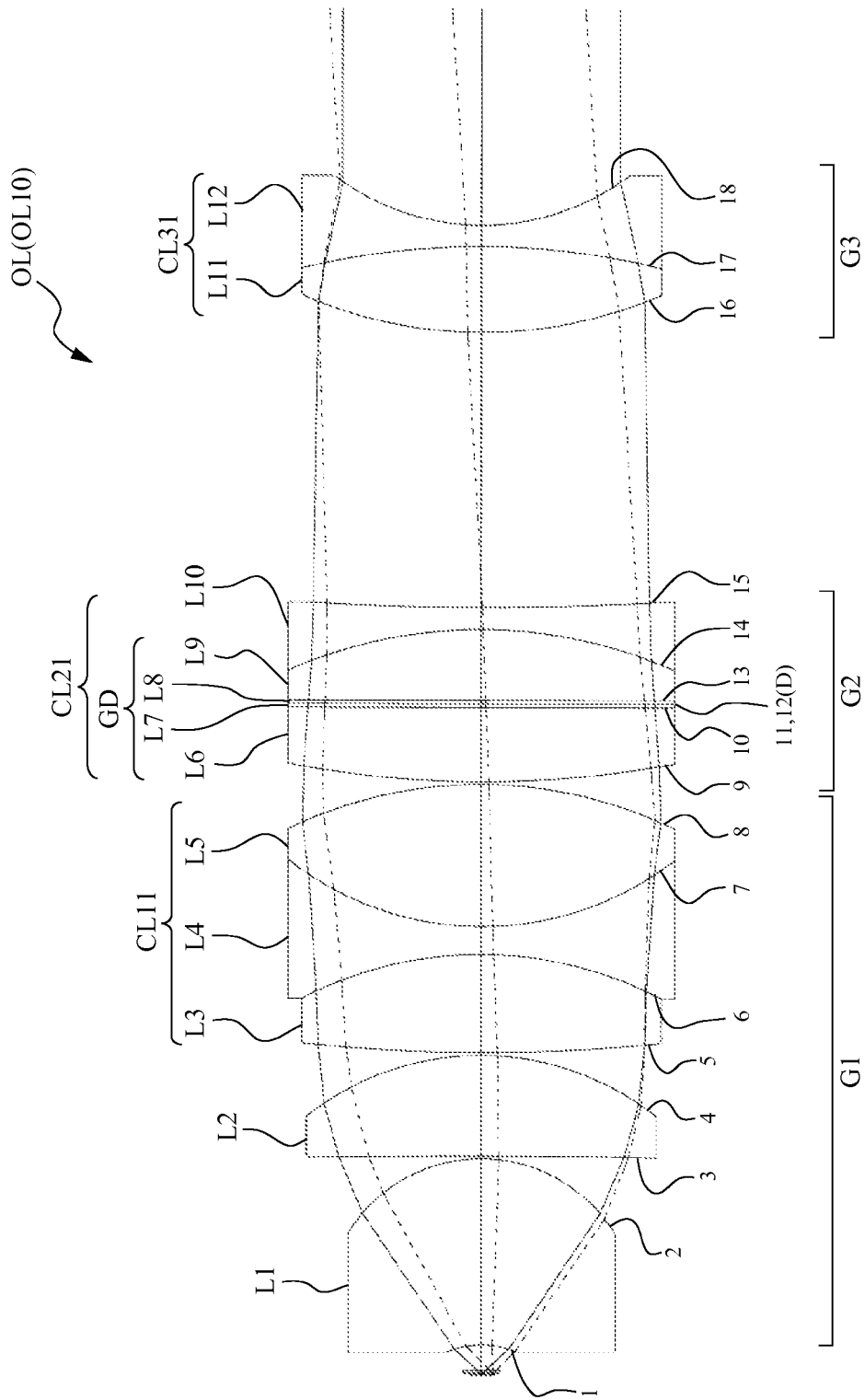
FIG. 19 is a lens configuration diagram of a microscope objective lens according to a tenth example.

Finally, a low-magnification microscope objective lens will be described. FIG. 19 illustrates a microscope objective lens OL according to a third embodiment comprising, in order from the object side, a first lens group G1 having a positive refractive power, a second lens group G2, and a third lens group G3 having a negative refractive power.

In the microscope objective lens OL described above, the first lens group G1 is a lens group for approximating a divergent light bundle from an object to a parallel light bundle. To this end, the first lens group G1 is configured so as to include a positive lens component (for example, a positive meniscus lens L1 illustrated in FIG. 19) positioned nearest to the object side and having a lens surface with a negative refractive power. The positive lens component may be configured using a single lens or a cemented lens. If r denotes a curvature radius of the lens surface (for example, a first surface illustrated in FIG. 19) having a negative refractive power and positioned nearest to the object side among lens surfaces having a negative refractive power included in the positive lens component, n1 denotes a refractive index of an object-side medium of the lens surface with respect to the d line, n2 denotes a refractive index of an image-side medium of the lens surface with respect to the d line, and d0 denotes a distance on an optical axis from the object to a vertex of the lens surface, then the following conditional expression (1) is satisfied.

$$|(n2-n1)/(r \cdot d0)| \leq 0.1 \quad (1)$$

The conditional expression (1) defines a refractive power of the lens surface having a negative refractive power included in the aforementioned positive lens component provided in the first lens group G1. When an upper limit of the conditional expression (1) is exceeded, correction of a Petzval sum becomes difficult, in turn making it difficult to secure field flatness up to large angles of view.

In addition, the second lens group G2 is a lens group that receives an approximately parallel light bundle emitted from the first lens group G1 and corrects chromatic aberration, and is provided with a diffractive optical element GD for correcting the chromatic aberration.

The diffractive optical element GD according to the present embodiment is a so-called "bonded-multilayer diffractive optical element" in which two diffractive element components (for example, in the case of FIG. 19, optical members L7 and L8) made from different optical materials are joined and diffractive grating grooves are provided on the bonded surface of the two diffractive element components to make up the diffractive optical surface D. Therefore, the diffractive optical element is capable of attaining a high diffraction efficiency over a broad wavelength range from the g line to the C line. Accordingly, the microscope objective lens OL according to the present embodiment can be used in a broad wavelength range. When using a primary diffracted light with a transmissive diffractive optical element, a diffraction efficiency indicates a ratio η (=I1/I0×100 [%]) of the intensity I1 of the primary diffracted light to incident intensity I0.

If f denotes a focal length of the entire system of the microscope objective lens OL and h denotes a height from an optical axis of a principal ray of a light bundle passing through the diffractive optical surface D (a twelfth surface illustrated in FIG. 19) and corresponding to a maximum field angle, then the diffractive optical element GD is to be arranged at a position satisfying the following conditional expression (2).

$$0.01 \leq |h/f| \leq 0.04 \quad (2)$$

However, in the microscope objective lens OL illustrated in FIG. 19, a principal ray of a light bundle emitted from an off-axis object point is defined as a central ray of an off-axis light bundle determined by restricting a ray emitted in a direction most separated from an optical axis among light bundles emitted from the off-axis object point using a vertex of a ray with a maximum numerical aperture emitted from an on-axis object point and an object-side surface of a lens L3 in the first lens group G1 and restricting a ray emitted in a direction closest to the optical axis among the light bundles emitted from the off-axis object point using a vertex of the ray with a maximum numerical aperture emitted from the on-axis object point and an object-side surface of a lens L11 in the third lens group G3.

By arranging the diffractive optical element GD at a position satisfying the conditional expression (2), the chromatic aberration-correcting capability of the diffractive optical element GD becomes effective for correcting not only on-axis chromatic aberration but lateral chromatic aberration as well. However, since correction of lateral chromatic aberration is not difficult at low magnification, it is important that a balance is achieved between greater effectiveness in correcting on-axis chromatic aberration and providing moderate assistance to the correction of lateral chromatic aberration. The conditional expression (2) represents a range that takes such concerns into consideration.

The third lens group G3 is a lens group for approximating a convergent light bundle emitted from the second lens group G2 to a parallel light bundle. The third lens group G3 is configured so as to include at least one achromatic lens component (for example a cemented lens component CL31 made up of a biconvex lens L11 and a biconcave lens L12 illustrated in FIG. 19) having a negative refractive power. In addition, an image-side surface (for example, an eighteenth surface illustrated in FIG. 19) of a lens positioned nearest to the image side among the third lens group G3 is formed so as to have a concave shape on the image side. Since the first lens group G1 and the second lens group G2 have a combined positive refractive power, a light bundle incident to the third lens group G3 is a convergent light bundle. The third lens group G3 importantly receives the convergent light bundle and converts the convergent light bundle into a parallel light bundle while suppressing the occurrence of spherical aberration and coma aberration. A surface nearest to the image side among the third lens group G3 is a surface responsible for a substantial portion of the negative refractive power of the third lens group G3. By arranging this surface as a surface that is concave to the image side, an angle of incidence of the convergent rays to the final surface can be reduced and, in particular, occurrences of high-order coma aberration and the like can be reliably suppressed. The achromatic lens component can be arranged not only as a cemented lens but can also be configured using a plurality of lenses positioned separated by air to an extent where the chromatic aberration-correcting capability is not significantly diminished.

Furthermore, if f denotes a focal length of the entire system and f12 denotes a combined focal length of the first lens group G1 and the second lens group G2, then the microscope objective lens OL desirably satisfies a condition expressed by the following conditional expression (3).

$$1 \le |f12/f| \le 1.5 \tag{3}$$

The conditional expression (3) represents a condition for securing sufficient numerical aperture (NA) while securing sufficient working distance. When falling below a lower limit of the conditional expression (3), the combined focal length f12 of the first and second lens groups G1 and G2 becomes shorter than the focal length f of the entire system. As a result, securing sufficient numerical aperture and correcting spherical aberration become difficult. Conversely, when an upper limit of the conditional expression (3) is exceeded, the combined focal length f12 of the first and second lens groups G1 and G2 becomes longer than the focal length f of the entire system. As a result, total length becomes longer due to insufficient convergence of rays, and correction of various aberrations at large angles of view and secondary spectra of chromatic aberration becomes difficult.

Meanwhile, since the diffractive optical element GD is as thick as the diffractive grating grooves, even a small change in the angle of incidence results in a significant change in diffraction efficiency. In other words, when the angle of incidence to the diffractive optical surface D becomes large, diffraction efficiency drops significantly and rays of orders not blazed become manifested as flares. Accordingly, if f denotes a focal length of the entire system and f2 denotes a focal length of the second lens group G2, then the microscope objective lens OL desirably satisfies the following conditional expression (5).

$$10 \le |f2/f| \tag{5}$$

The conditional expression (5) represents a condition for controlling an angle of incidence to the diffractive optical element GD using power distribution. When falling below a lower limit of the conditional expression (5), the focal length f2 of the second lens group G2 becomes shorter than the focal length f of the entire system. As a result, a refracting angle of a ray in the second lens group G2 becomes large, in turn increasing the angle of incidence to the diffractive optical element GD. In addition, since a range of the combined focal length f12 of the first and second lens groups G1 and G2 with respect to the focal length f of the entire system is defined by the conditional expression (3) given above, when falling below a lower limit of the conditional expression (5), the power of the first lens group G1 weakens, aberrations occurring at the first lens group G1 is reduced, and aberrations, in particular, spherical aberration occurring at the second lens group G2 becomes larger. As a result, attaining a balance between aberrations of the first lens group G1 and the second lens group G2 becomes difficult.

Furthermore, if N denotes the number of diffractive grating grooves of the diffractive optical surface D of the diffractive optical element GD and H denotes an effective radius of the diffractive optical surface D, then the microscope objective lens OL desirably satisfies the following conditional expression (6).

$$2 \le N/H \le 5 \tag{6}$$

However, in the microscope objective lens OL illustrated in FIG. 19, the effective radius H is to be defined by an outermost ray of a light bundle determined when restricting a ray with a maximum numerical aperture emitted from an on-axis object point and a ray emitted in a direction most separated from an optical axis among light bundles emitted from an off-axis object point using a vertex of the ray with a maximum numerical aperture emitted from the on-axis object point and an object-side surface of the lens L3 in the first lens group G1 and restricting a ray emitted in a direction closest to the optical axis among the light bundles emitted from the off-axis object point using a vertex of the ray with a maximum numerical aperture emitted from the on-axis object point and an object-side surface of the lens L11 in the third lens group G3.

The conditional expression (6) is a conditional expression defining appropriate ranges of the number N of diffractive grating grooves of the diffractive optical surface D and the effective radius H. When falling below a lower limit of the conditional expression (6), when achromatization is performed on the d line and the g line, insufficient achromatization of on-axis chromatic aberration occurs at the C line and the F line (secondary spectrum). On the other hand, when an upper limit of the conditional expression (6) is exceeded, when achromatization is performed on the d line and the g line, excessive achromatization of on-axis chromatic aberration occurs at the C line and the F line (secondary spectrum). In addition, the minimum pitch width of the diffractive grating grooves formed on the diffractive optical element GD decreases, making it difficult to maintain manufacturing accuracy.

Furthermore, if nd1, nF1, and nC1 respectively denote refractive indexes of a material of a diffractive element component whose refractive index and Abbe's number are smaller among the two diffractive element components of the diffractive optical element GD with respect to the d line, the F line, and the C line, and nd2, nF2, and nC2 respectively denote refractive indexes of a material of a diffractive element component whose refractive index and Abbe's number are greater among the two diffractive element components of the diffractive optical element with respect to the d line, the F line, and the C line, then the microscope objective lens OL desirably satisfies the following conditional expressions (7) to (10).

$$nd1 \leq 1.54 \tag{7}$$

$$0.0145 \leq nF1 - nC1 \tag{8}$$

$$1.55 \leq nd2 \tag{9}$$

$$nF2 - nC2 \leq 0.013 \tag{10}$$

The conditional expressions (7) to (10) respectively define refractive indexes and dispersions with respect to the F line and the C line (nF−nC) of the materials of the two diffractive element components that make up the diffractive optical element GD or, in other words, two different ultraviolet curable resins. Satisfying the conditional expressions enables the two different diffractive element components to be appressed and bonded at higher efficiency to form the diffractive optical surface D. Accordingly, diffraction efficiency of 90% or higher can be achieved in a broad wavelength range from the g line to the C line. Exceeding an upper limit or falling below a lower limit of each conditional expression (7) to (10) makes it difficult for the diffractive optical element GD in the achromatizing lens system according to the present embodiment to achieve a diffraction efficiency of 90% or higher across a broad wavelength range. As a result, maintaining the advantages of a bonded-multilayer diffractive optical element becomes difficult.

EXAMPLES

Hereinafter, twelve examples of the microscope objective lens OL according to the present embodiment will be presented, wherein first to fifth examples correspond to the first embodiment, sixth to ninth examples correspond to the second embodiment, and tenth to twelfth examples correspond to the third embodiment. In the respective examples described below, a phase difference of a diffractive optical surface D formed on a diffractive optical element GD is calculated by a ultra-high index method that uses an ordinary refractive index and an aspherical surface formula (11) to be described later. The ultra-high index method utilizes a certain equivalence relationship that exists between an aspherical shape and a grid pitch of a diffractive optical surface. In the present example, the diffractive optical surface D is expressed as data of the ultra-high index method or, in other words, expressed by the aspherical surface formula (11) to be described later and a coefficient thereof. In the present example, the d line, the C line, the F line, and the g line are selected as objects of calculating aberration characteristics. Table 1 below presents wavelengths of the d line, the C line, the F line, and the g line used in the present example and values of refractive indexes set for the respective spectrum lines to be used for calculations according to the ultra-high index method.

TABLE 1

| | wavelength | refractive index (by ultra-high index method) |
|---|---|---|
| d line | 587.562 nm | 10001.0000 |
| C line | 656.273 nm | 11170.4255 |
| F line | 486.133 nm | 8274.7311 |
| g line | 435.835 nm | 7418.6853 |

In the respective examples, if y denotes a height in a direction perpendicular to an optical axis, S(y) denotes a distance (sag amount) along the optical axis from a tangent plane of a vertex of each aspheric surface to each aspheric surface for a height y, r denotes a curvature radius (curvature radius of vertex) of a reference spherical surface, κ denotes a conical constant, and An denotes an nth order aspherical surface coefficient, then an aspheric surface may be expressed by the following expression (11). Note that in the following examples, "E-n" denotes "×10$^{-n}$".

$$S(y) = (y^2/r)/\{1 + (1 - \kappa \times y^2/r^2)^{1/2}\} + A2 \times y^2 + A4 \times y^4 + A6 \times y^6 + A8 \times y^8 + A10 \times y^{10} \tag{11}$$

Moreover, in the respective examples, a lens surface on which is formed a diffractive optical surface is denoted by an asterisk attached to the right side of a surface number in the tables. The aspherical surface formula (11) represents specifications of the characteristics of the diffractive optical surface.

Figure 25:
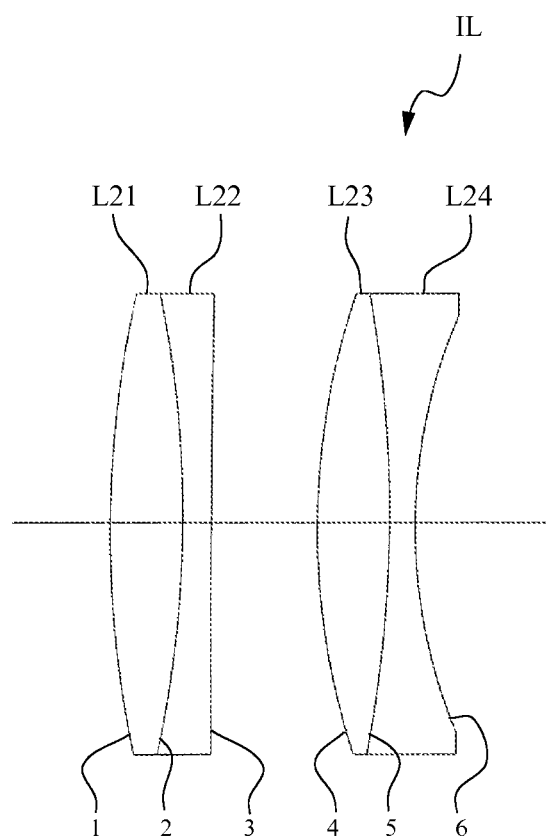
FIG. 25 is a lens configuration diagram of an imaging lens used together with the microscope objective lens.

In addition, microscope objective lenses OL1 to OL12 in the respective examples described below are infinity-corrected lenses, and are to be used together with an imaging lens IL configured as illustrated in FIG. 25 whose specifications are presented in Table 2. In Table 2, a first field m represents the number of each optical surface from the object side, a second field r represents a curvature radius of each optical surface, a third field d represents a distance (surface separation) on an optical axis from each optical surface to a next optical surface, a fourth field nd represents a refractive index with respect to the d line, and a fifth field vd represents an Abbe's number. The refractive index 1.00000 of air has been omitted. The description of the specification table also applies to subsequent examples.

TABLE 2

| m | r | d | nd | vd |
|---|---|---|---|---|
| 1 | 75.043 | 5.1 | 1.62280 | 57.0 |
| 2 | −75.043 | 2.0 | 1.74950 | 35.2 |
| 3 | 1600.580 | 7.5 | | |
| 4 | 50.256 | 5.1 | 1.66755 | 42.0 |
| 5 | −84.541 | 1.8 | 1.61266 | 44.4 |
| 6 | 36.911 | | | |

The imaging lens IL comprises, in order from the object side, a cemented lens that joins a biconvex lens L21 and a biconcave lens L22, and a cemented lens that joins a biconvex lens L23 and a biconcave lens L24.

First Example

FIG. 1 referred to in the above description illustrates a microscope objective lens OL1 according to a first example. The microscope objective lens OL1 is a dry objective lens and comprises, in order from the object side, a first lens group G1 having a positive refractive power, a second lens group G2 having a positive refractive power, and a third lens group G3 having a negative refractive power. The first lens group G1 comprises, in order from the object side, a positive meniscus lens L1 whose concave surface faces the object side, a biconvex lens L2, and a cemented lens component (achromatizing lens component) CL11 that joins a negative meniscus lens L3 whose convex surface faces the object side and a biconvex lens L4. In addition, the second lens group G2 comprises, in order from the object side, a diffractive optical element GD including a diffractive optical surface D, and a cemented lens component (achromatizing lens component) CL21 that joins a negative meniscus lens L9 whose convex surface faces the object side and a biconvex lens L10. Furthermore, the third lens group G3 comprises a cemented lens component CL31 that joins, in order from the object side, a biconvex lens L11 and a biconcave lens L12. As shown, in the present first example, the achromatic lens component CL31 comprising the third lens group G3 is configured as a cemented lens component that joins two lenses.

In addition, the diffractive optical element GD joins a plate-like piece of optical glass L5, two plate-like optical members L6 and L7 respectively formed from different resin materials, and a plate-like piece of optical glass L8, in this order. Diffractive grating grooves (diffractive optical surface D) are formed on a bonded surface of the optical members L6 and L7. In other words, the diffractive optical element GD is a bonded-multilayer diffractive optical element.

Specifications of the microscope objective lens OL1 according to the first example and illustrated in FIG. 1 are presented in Table 3. In Table 3, f represents a focal length of the entire system of the microscope objective lens OL1, NA represents numerical aperture, and β represents magnification. In addition, in the present first example, the second example, the third example, and the sixth and subsequent examples, d0 represents a distance on an optical axis from a specimen to a vertex of a lens surface (first surface) nearest to the object side of a first lens (lens L1) that is nearest to the object side. Furthermore, dR represents an optical path length from a vertex of a lens surface positioned nearest to the object side and having a negative refractive power among the first lens group G1 to the object. In the first example, the second example, the third example, and the sixth and subsequent examples, the lens surface having a negative refractive power is the first surface. Moreover, h represents a height of a primary ray of a light bundle corresponding to a maximum field angle passing through the diffractive optical surface D from the optical axis, f1 represents a focal length of the first lens group G1, f2 represents a focal length of the second lens group G2, f12 represents a combined focal length of the first and second lens groups G1 and G2, f3 represents a focal length of the third lens group G3, N represents the number of diffractive grating grooves of the diffractive optical surface D in the diffractive optical element GD, and H represents an effective radius of the diffractive optical surface. In addition, as described earlier, the lens surfaces that restrict an off-axis light bundle that determines an off-axis principal ray and an effective radius in the present first example are an image-side surface (fourth surface) of the biconvex lens L2 and an object-side surface (seventeenth surface) of the biconvex lens L11.

Furthermore, the numbers of the respective optical surfaces presented in the first field m (asterisks on the right-hand side indicate lens surfaces formed as diffractive optical surfaces) correspond to the surface numbers 1 to 19 illustrated in FIG. 1. Moreover, in the second field r, a curvature radius of 0.000 represents a planar surface. In addition, in the case of a diffractive optical surface, a curvature radius of a spherical surface to be used as a reference of an aspheric surface that acts as a base is presented in the second field r. Data to be used by the ultra-high index method is presented in the specification table as aspheric surface data. Moreover, Table 3 also presents values corresponding to the conditional expressions (1) to (10) given above or, in other words, condition-corresponding values. The above description of the specification table also applies to subsequent examples.

While "mm" is generally used as a unit of lengths including the curvature radius r, the surface separation d, and the focal length f of an entire system described in all specifications presented below unless otherwise specified, since optical systems provide equivalent optical performances even when proportionally magnified or proportionally reduced, the unit of lengths need not be limited to "mm" and other appropriate units can be used.

TABLE 3 f = 4.005
NA = 0.8
β = 50x
d0 = 1.71
dR = 1.71
h = 0.69
f1 = 7.862
f2 = 140.481
f12 = 7.456
f3 = −45.026
N = 41
H = 6.89

| m | r | d | nd | vd |
|---|---|---|---|---|
| 1 | −2.740 | 4.1 | 1.83481 | 42.7 |
| 2 | −4.212 | 0.1 | | |
| 3 | 22967.611 | 5.5 | 1.49782 | 82.5 |
| 4 | −10.771 | 0.2 | | |
| 5 | 92.682 | 1.3 | 1.79504 | 28.7 |
| 6 | 16.210 | 5.9 | 1.49782 | 82.5 |
| 7 | −14.459 | 0.2 | | |
| 8 | 0.000 | 1.5 | 1.51680 | 64.1 |
| 9 | 0.000 | 0.2 | 1.55690 | 50.2 |
| 10 | 0.000 | 0.0 | 10001.00000 | −3.5 |
| 11* | 0.000 | 0.2 | 1.52760 | 34.7 |
| 12 | 0.000 | 2.0 | 1.51680 | 64.1 |
| 13 | 0.000 | 0.5 | | |
| 14 | 34.600 | 1.5 | 1.74950 | 35.3 |
| 15 | 9.130 | 5.0 | 1.60300 | 65.5 |
| 16 | −2824.563 | 26.5 | | |
| 17 | 19.407 | 3.7 | 1.84666 | 23.8 |
| 18 | −12.700 | 2.9 | 1.75692 | 31.6 |
| 19 | 8.699 | | | |

Diffractive optical surface data

Eleventh surface

κ = 1.0000 A2 = −4.99472E−08 A4 = 1.32542E−13
A6 = −2.23241E−16 A8 = −1.44998E−18
A10 = 0.00000E−00

Condition-corresponding values

| (1) | $|(n2 − n1)/(r \cdot dR)| = 0.178$ |
| (2) | $|h/f| = 0.17$ |
| (3) | $|f12/f| = 1.86$ |
| (4) | $|f3/f| = 11.2$ |
| (5) | $|f2/f| = 35.1$ |

TABLE 3-continued

| | |
|---|---|
| (6) | N/H = 6.0 |
| (7) | nd1 = 1.528 |
| (8) | nF1 − nC1 = 0.0152 |
| (9) | nd2 = 1.557 |
| (10) | nF2 − nC2 = 0.0111 |

Figure 2:
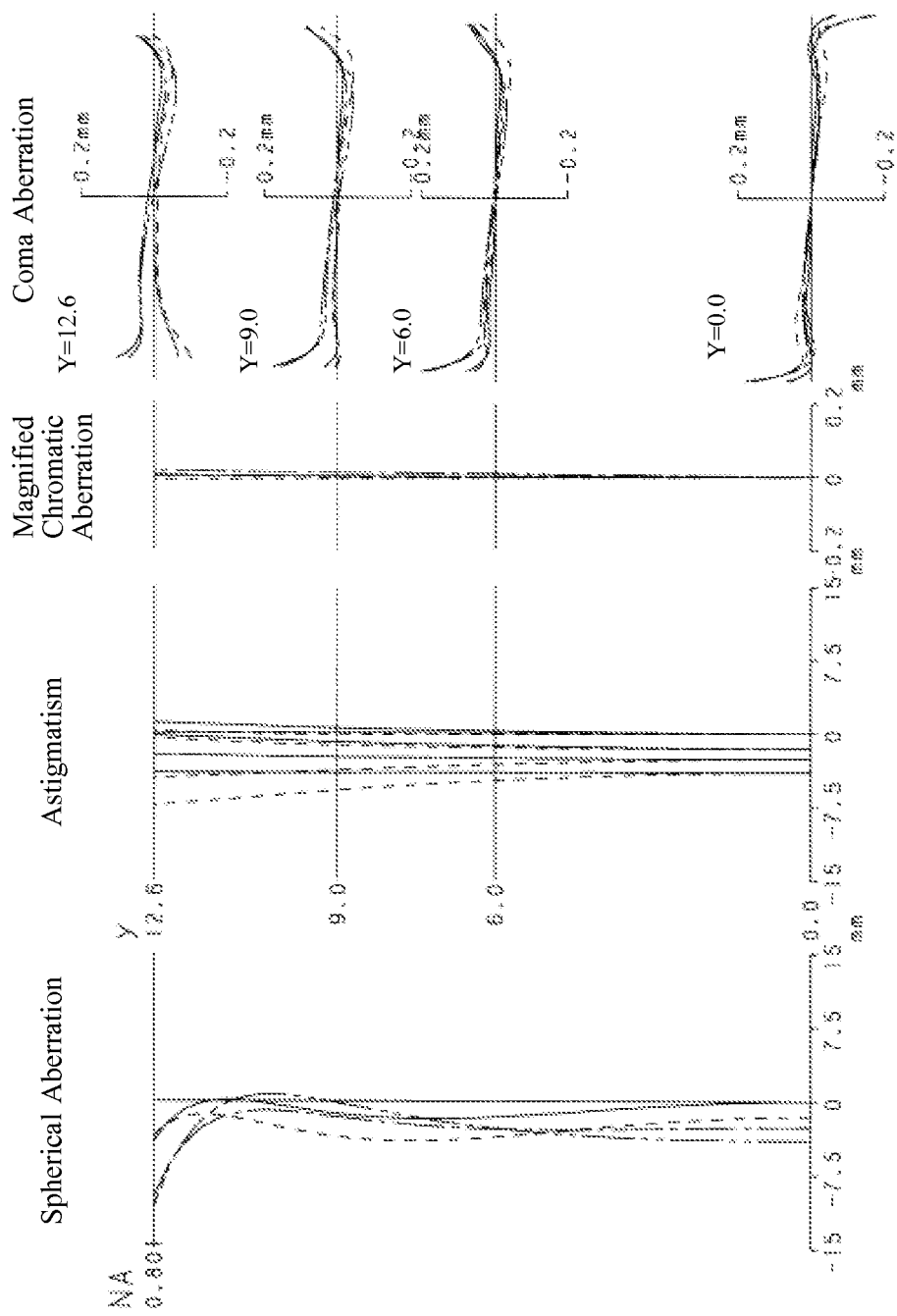
FIG. 2 presents various aberration diagrams of the microscope objective lens according to the first example.

Among the condition-corresponding values presented in Table 3, the conditional expression (1) is a value calculated from a curvature radius r of the first surface and refractive indexes n1 and n2 of mediums anterior and posterior to the first surface with respect to the d line. In addition, the conditional expressions (7) and (8) correspond to values of the eleventh surface and the conditional expressions (9) and (10) correspond to values of the ninth surface. As shown, all of the conditional expressions (1) to (10) given above are satisfied in the first example. FIG. 2 illustrates various aberration diagrams of spherical aberration, astigmatism, lateral chromatic aberration, and coma aberration with respect to rays of the d line, the C line, the F line, and the g line according to the first example. Among the aberration diagrams, the spherical aberration diagram illustrates an aberration amount with respect to a numerical aperture NA, the astigmatism diagram and the lateral chromatic aberration diagram illustrate an aberration amount with respect to an image height Y, and the coma aberration diagram illustrate aberration amounts when the image height Y is set to 12.6 mm, to 9.0 mm, to 6.0 mm, and to 0 mm. In addition, in the spherical aberration diagram, the lateral chromatic aberration diagram, and the coma aberration diagram, solid lines represent the d line, dotted lines represent the C line, dashed-dotted lines represent the F line, and dashed-two dotted lines represent the g line. Furthermore, in the astigmatism diagram, the solid line represents a sagittal image surface corresponding to each wavelength and the dashed line represents a meridional image surface corresponding to each wavelength. The above description of the various aberration diagrams also applies to subsequent examples. As is apparent from the various aberration diagrams illustrated in FIG. 2, in the first example, various aberrations are favorably corrected and superior imaging performance is ensured.

Second Example

Figure 3:
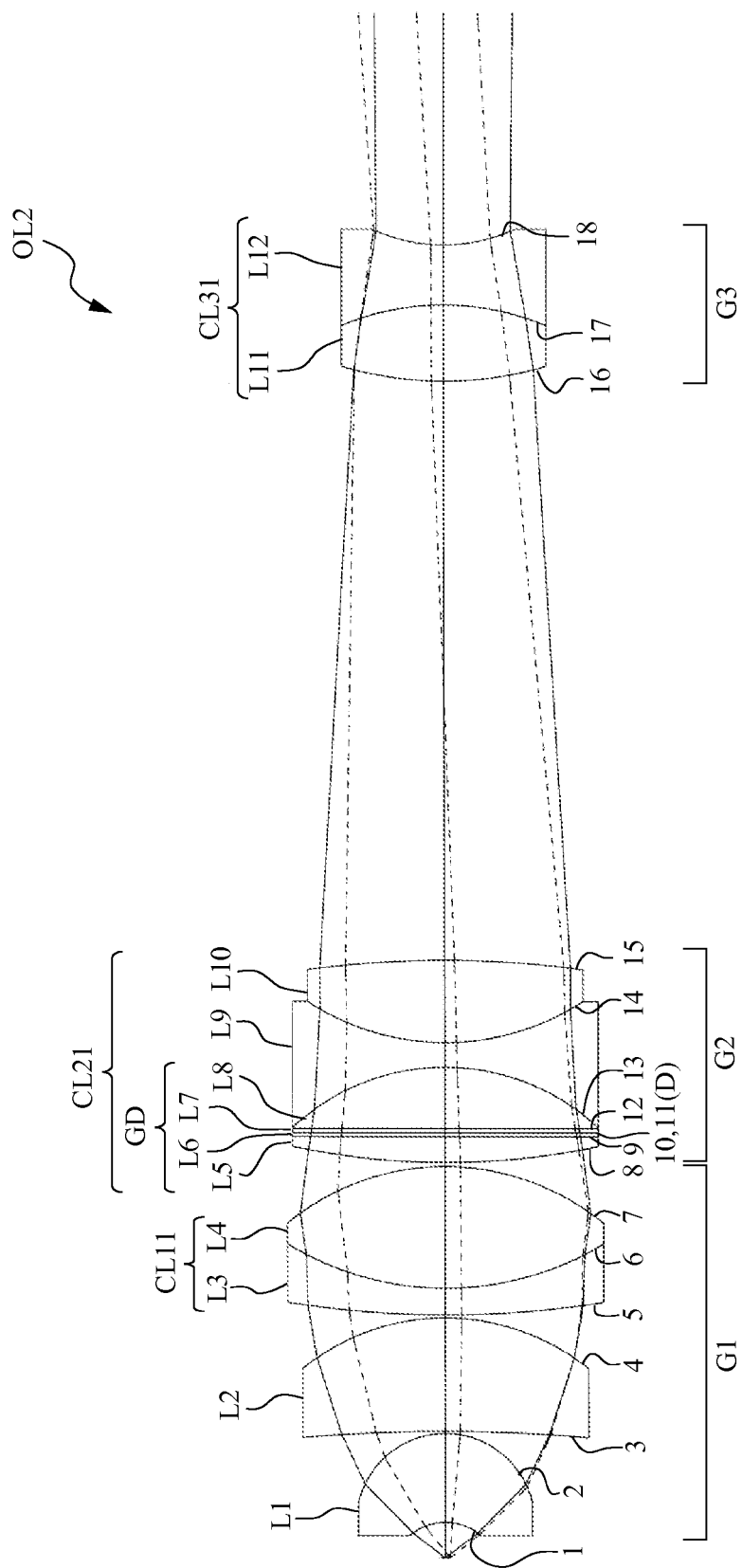
FIG. 3 is a lens configuration diagram of a microscope objective lens according to a second example.

Next, a microscope objective lens OL2 illustrated in FIG. 3 will be described as a second example. The microscope objective lens OL2 illustrated in FIG. 3 is also a dry objective lens and comprises, in order from the object side, a first lens group G1 having a positive refractive power, a second lens group G2 having a negative refractive power, and a third lens group G3 having a negative refractive power. The first lens group G1 comprises, in order from the object side, a positive meniscus lens L1 whose concave surface faces the object side, a positive meniscus lens L2 whose concave surface faces the object side, and a cemented lens component (achromatizing lens component) CL11 that joins a negative meniscus lens L3 whose convex surface faces the object side and a biconvex lens L4. In addition, the second lens group G2 comprises a cemented lens component (achromatizing lens component) CL21 that joins, in order from the object side, a diffractive optical element GD that includes a diffractive optical surface D and having a biconvex lens-shape, a biconcave lens L9, and a biconvex lens L10. Furthermore, the third lens group G3 comprises a cemented lens component CL31 that joins, in order from the object side, a biconvex lens L11 and a biconcave lens L12. As shown, in the present second example, the achromatic lens component CL31 comprising the third lens group G3 is configured as a cemented lens component that joins two lenses. The second lens group G2 in the present second example is arranged so as to have a negative refractive power because the positive refractive power of the first lens group G1 is sufficiently strong and a light bundle emitted from the first lens group G1 is sufficiently convergent. In addition, the lens surfaces that restrict an off-axis light bundle that determines an off-axis principal ray and an effective radius in the present second example are an image-side surface (fourth surface) of the positive meniscus lens L2 and an object-side surface (sixteenth surface) of the biconvex lens L11.

In addition, the diffractive optical element GD according to the present second example is also a bonded-multilayer diffractive optical element and joins a planoconvex lens L5 whose convex surface faces the object side, two optical members L6 and L7 respectively formed from different resin materials, and a planoconvex lens L8 whose convex surface faces the image side, in this order. Diffractive grating grooves (diffractive optical surface D) are formed on a bonded surface of the optical members L6 and L7.

Specifications of the microscope objective lens OL2 according to the second example and illustrated in FIG. 3 are presented in Table 4. The surface numbers presented in Table 4 match the surface numbers 1 to 18 illustrated in FIG. 3.

TABLE 4 f = 3.967
NA = 0.8
β = 50x
d0 = 1.71
dR = 1.71
h = 0.71
f1 = 7.289
f2 = −306.768
f12 = 7.265
f3 = −50.628
N = 22
H = 6.62

| m | r | d | nd | vd |
|---|---|---|---|---|
| 1 | −2.722 | 4.3 | 1.90265 | 35.7 |
| 2 | −4.398 | 0.1 | | |
| 3 | −79.653 | 5.5 | 1.49782 | 82.5 |
| 4 | −11.202 | 0.2 | | |
| 5 | 49.789 | 1.3 | 1.79504 | 28.7 |
| 6 | 15.062 | 5.9 | 1.49782 | 82.5 |
| 7 | −12.303 | 0.2 | | |
| 8 | 36.594 | 1.3 | 1.51680 | 64.1 |
| 9 | 0.000 | 0.2 | 1.55690 | 50.2 |
| 10 | 0.000 | 0.0 | 10001.00000 | −3.5 |
| 11* | 0.000 | 0.2 | 1.52760 | 34.7 |
| 12 | 0.000 | 3.0 | 1.49782 | 82.5 |
| 13 | −10.999 | 1.2 | 1.66755 | 42.0 |
| 14 | 12.389 | 4.0 | 1.49782 | 82.5 |
| 15 | −49.958 | 28.2 | | |
| 16 | 17.770 | 3.7 | 1.84666 | 23.8 |
| 17 | −13.000 | 2.9 | 1.75692 | 31.6 |
| 18 | 8.383 | | | |

Diffractive optical surface data

Eleventh surface

κ = 1.0000 A2 = −2.92088E−08 A4 = 1.20938E−13
A6 = −1.83902E−16 A8 = −3.40027E−19
A10 = 0.00000E−00

Condition-corresponding values

| | |
|---|---|
| (1) | |(n2 − n1)/(r · dR)| = 0.194 |
| (2) | |h/f| = 0.18 |

TABLE 4-continued

| | |
|---|---|
| (3) | $|f12/f| = 1.83$ |
| (4) | $|f3/f| = 12.8$ |
| (5) | $|f2/f| = 77.3$ |
| (6) | N/H = 3.3 |
| (7) | nd1 = 1.528 |
| (8) | nF1 − nC1 = 0.0152 |
| (9) | nd2 = 1.557 |
| (10) | nF2 − nC2 = 0.0111 |

Figure 4:
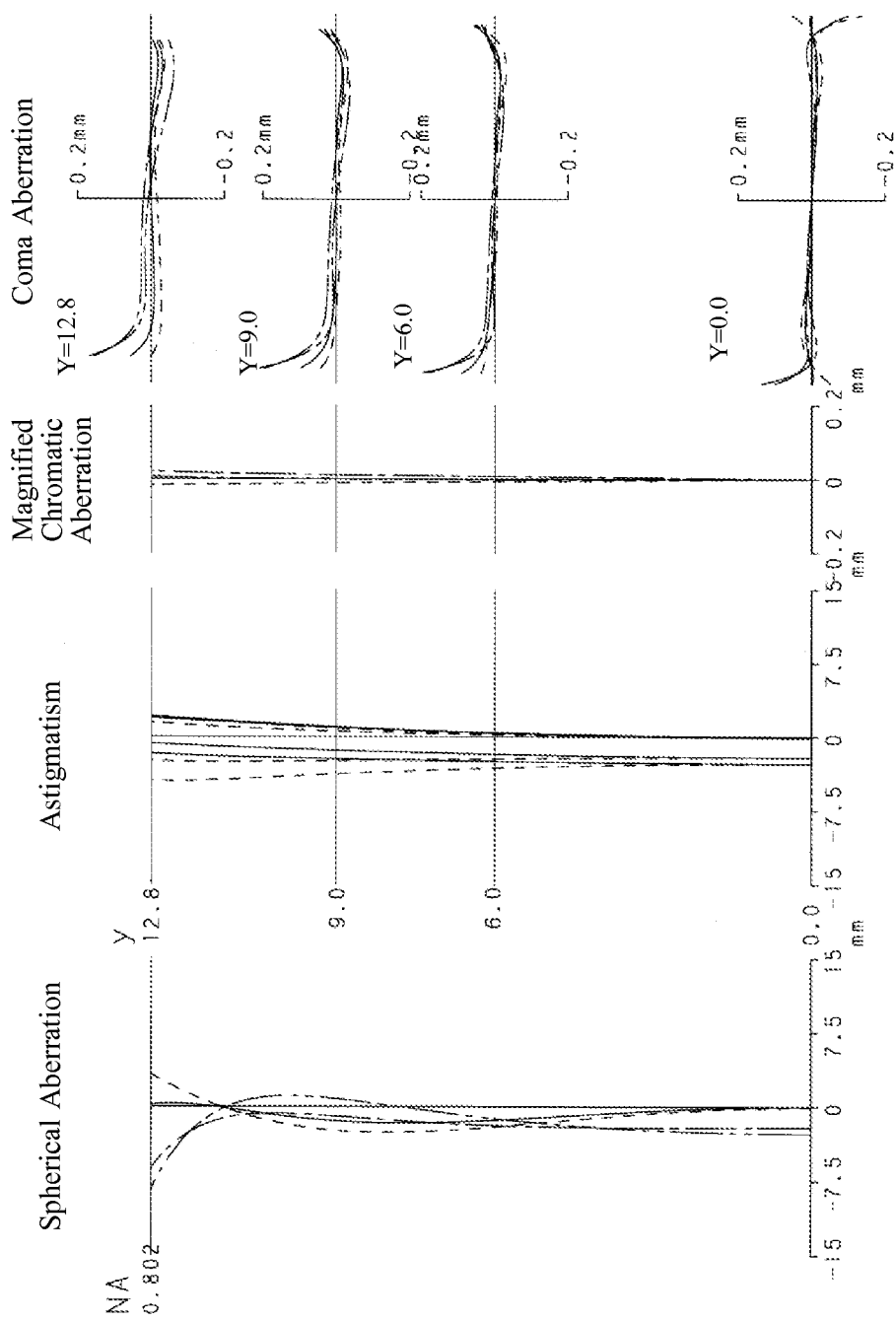
FIG. 4 presents various aberration diagrams of the microscope objective lens according to the second example.

Among the condition-corresponding values presented in Table 4, the conditional expression (1) is a value calculated from a curvature radius r of the first surface and refractive indexes n1 and n2 of mediums anterior and posterior to the first surface with respect to the d line. In addition, the conditional expressions (7) and (8) correspond to values of the eleventh surface and the conditional expressions (9) and (10) correspond to values of the ninth surface. As shown, all of the conditional expressions (1) to (10) given above are satisfied in the second example. FIG. 4 illustrates various aberration diagrams of spherical aberration, astigmatism, lateral chromatic aberration, and coma aberration of the microscope objective lens OL2 according to the present second example. The coma aberration diagram in FIG. 4 illustrates aberration amounts when the image height Y is set to 12.8 mm, to 9.0 mm, to 6.0 mm, and to 0 mm. As is apparent from the various aberration diagrams, similarly in the present second example, aberrations are favorably corrected and superior imaging performance is ensured.

Third Example

Figure 5:
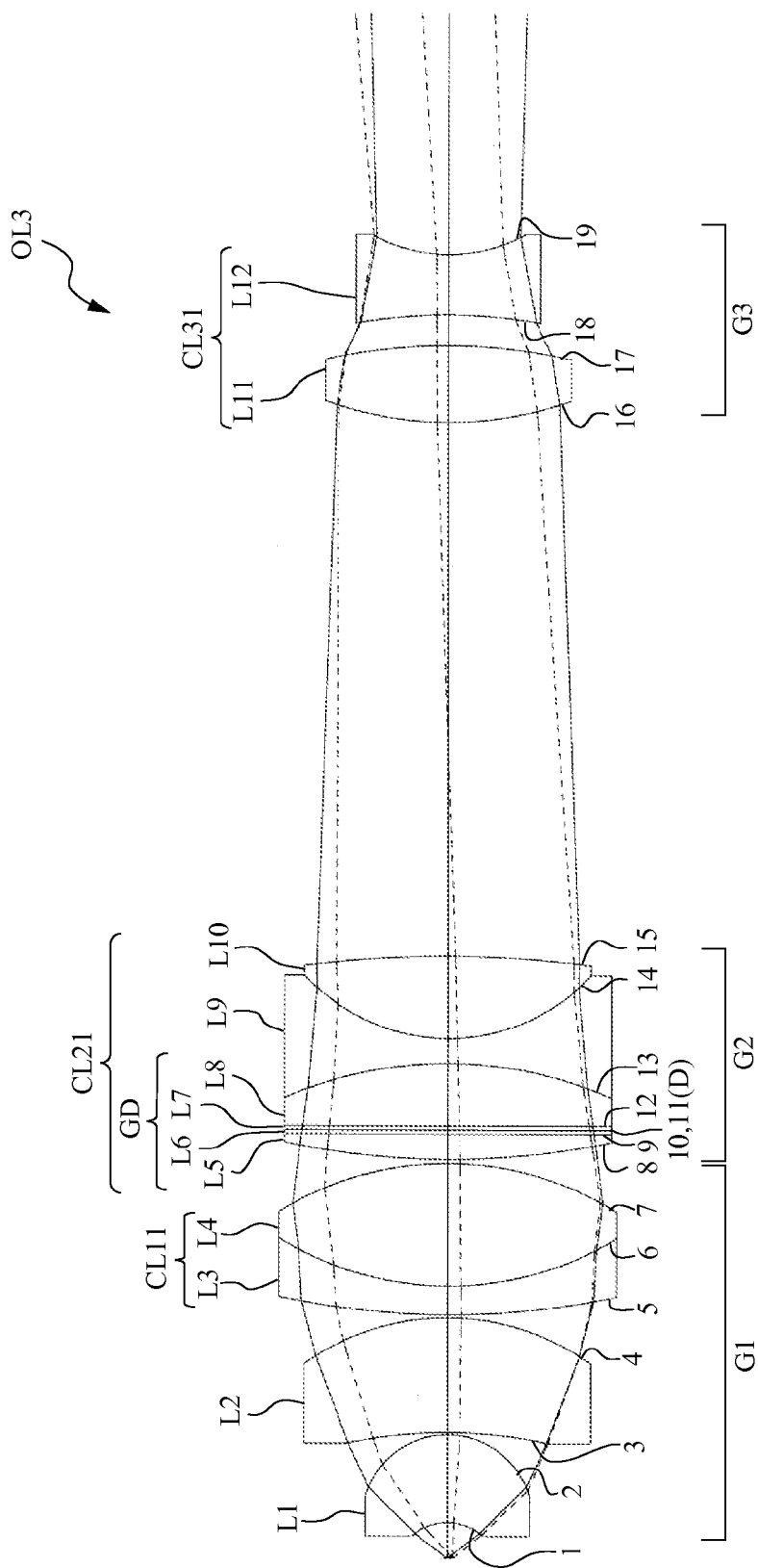
FIG. 5 is a lens configuration diagram of a microscope objective lens according to a third example.

Next, a microscope objective lens OL3 illustrated in FIG. 5 will be described as a third example. The microscope objective lens OL3 illustrated in FIG. 5 is also a dry objective lens and comprises, in order from the object side, a first lens group G1 having a positive refractive power, a second lens group G2 having a negative refractive power, and a third lens group G3 having a negative refractive power. The first lens group G1 comprises, in order from the object side, a positive meniscus lens L1 whose concave surface faces the object side, a positive meniscus lens L2 whose concave surface faces the object side, and a cemented lens component (achromatizing lens component) CL11 that joins a negative meniscus lens L3 whose convex surface faces the object side and a biconvex lens L4. In addition, the second lens group G2 comprises a cemented lens component (achromatizing lens component) CL21 that joins, in order from the object side, a diffractive optical element GD that includes a diffractive optical surface D and having a biconvex lens-shape, a biconcave lens L9, and a biconvex lens L10. Furthermore, the third lens group G3 comprises, in order from the object side, a biconvex lens L11 and a biconcave lens L12. As shown, in the present third example, the achromatic lens component CL31 comprising the third lens group G3 is made up of two lenses with an air separation between the lenses. The second lens group G2 according to the present third example is arranged so as to have a negative refractive power for the same reason as in the second example. In addition, the lens surfaces that restrict an off-axis light bundle that determines an off-axis principal ray and an effective radius in the present third example are an image-side surface (fourth surface) of the positive meniscus lens L2 and an object-side surface (eighteenth surface) of the biconcave lens L12.

Moreover, the diffractive optical element GD according to the present third example is also a bonded-multilayer diffractive optical element and joins a planoconvex lens L5 whose convex surface faces the object side, two optical members L6 and L7 respectively formed from different resin materials, and a planoconvex lens L8 whose convex surface faces the image side, in this order. Diffractive grating grooves (diffractive optical surface D) are formed on a bonded surface of the optical members L6 and L7.

Specifications of the microscope objective lens OL3 according to the third example and illustrated in FIG. 5 are presented in Table 5. The surface numbers presented in Table 5 match the surface numbers 1 to 19 illustrated in FIG. 5.

TABLE 5 f = 4.018
NA = 0.8
β = 50x
d0 = 1.71
dR = 1.71
h = 0.56
f1 = 7.541
f2 = −243.716
f12 = 7.545
f3 = −60.190
N = 63
H = 7.16

| m | r | d | nd | νd |
|---|---|---|---|---|
| 1 | −2.674 | 4.3 | 1.83481 | 42.7 |
| 2 | −4.201 | 0.1 | | |
| 3 | −23.463 | 5.6 | 1.49782 | 82.5 |
| 4 | −12.063 | 0.2 | | |
| 5 | 39.359 | 1.4 | 1.79504 | 28.7 |
| 6 | 15.762 | 6.0 | 1.60300 | 65.5 |
| 7 | −15.718 | 0.2 | | |
| 8 | 38.466 | 1.2 | 1.51680 | 64.1 |
| 9 | 0.000 | 0.2 | 1.55690 | 50.2 |
| 10 | 0.000 | 0.0 | 10001.00000 | −3.5 |
| 11* | 0.000 | 0.2 | 1.52760 | 34.7 |
| 12 | 0.000 | 3.0 | 1.56384 | 60.7 |
| 13 | −19.843 | 1.2 | 1.72342 | 37.9 |
| 14 | 9.484 | 4.0 | 1.51680 | 64.1 |
| 15 | −53.877 | 26.0 | | |
| 16 | 17.590 | 3.7 | 1.74950 | 35.3 |
| 17 | −26.797 | 1.5 | | |
| 18 | −25.258 | 2.9 | 1.67000 | 57.4 |
| 19 | 7.691 | | | |

Diffractive optical surface data

Eleventh surface

κ = 1.0000  A2 = −7.15155E−08  A4 = 2.36388E−14
A6 = −3.33620E−16  A8 = −2.96788E−19
A10 = 0.00000E−00

Condition-corresponding values

| | |
|---|---|
| (1) | $|(n2 − n1)/(r \cdot dR)| = 0.183$ |
| (2) | $|h/f| = 0.14$ |
| (3) | $|f12/f| = 1.88$ |
| (4) | $|f3/f| = 15.0$ |
| (5) | $|f2/f| = 60.7$ |
| (6) | N/H = 8.8 |
| (7) | nd1 = 1.528 |
| (8) | nF1 − nC1 = 0.0152 |
| (9) | nd2 = 1.557 |
| (10) | nF2 − nC2 = 0.0111 |

Figure 6:
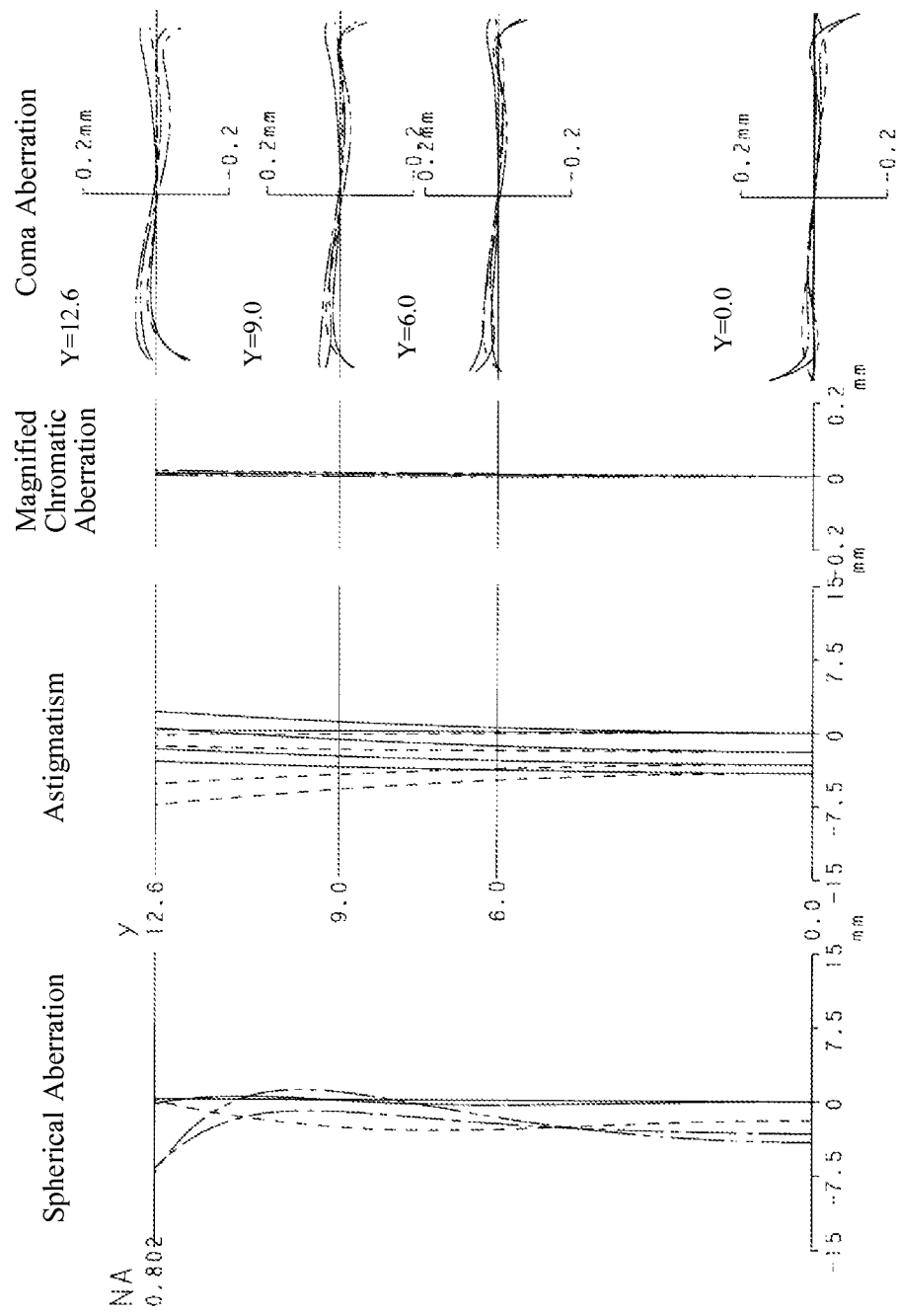
FIG. 6 presents various aberration diagrams of the microscope objective lens according to the third example.

Among the condition-corresponding values presented in Table 5, the conditional expression (1) is a value calculated from a curvature radius r of the first surface and refractive indexes n1 and n2 of mediums anterior and posterior to the first surface with respect to the d line. In addition, the conditional expressions (7) and (8) correspond to values of the eleventh surface and the conditional expressions (9) and (10) correspond to values of the ninth surface. As shown, all of the conditional expressions (1) to (10) given above are satisfied in the third example. FIG. 6 illustrates various aberration diagrams of spherical aberration, astigmatism, lateral chromatic aberration, and coma aberration of the microscope objective lens OL3 according to the present third example. The coma aberration diagram in FIG. 6 illustrates aberration amounts when the image height Y is set to 12.8 mm, to 9.0 mm, to 6.0 mm, and to 0 mm. As is apparent from the various aberration diagrams, similarly in the present third example, various aberrations are favorably corrected and superior imaging performance is ensured.

Fourth Example

Figure 7:
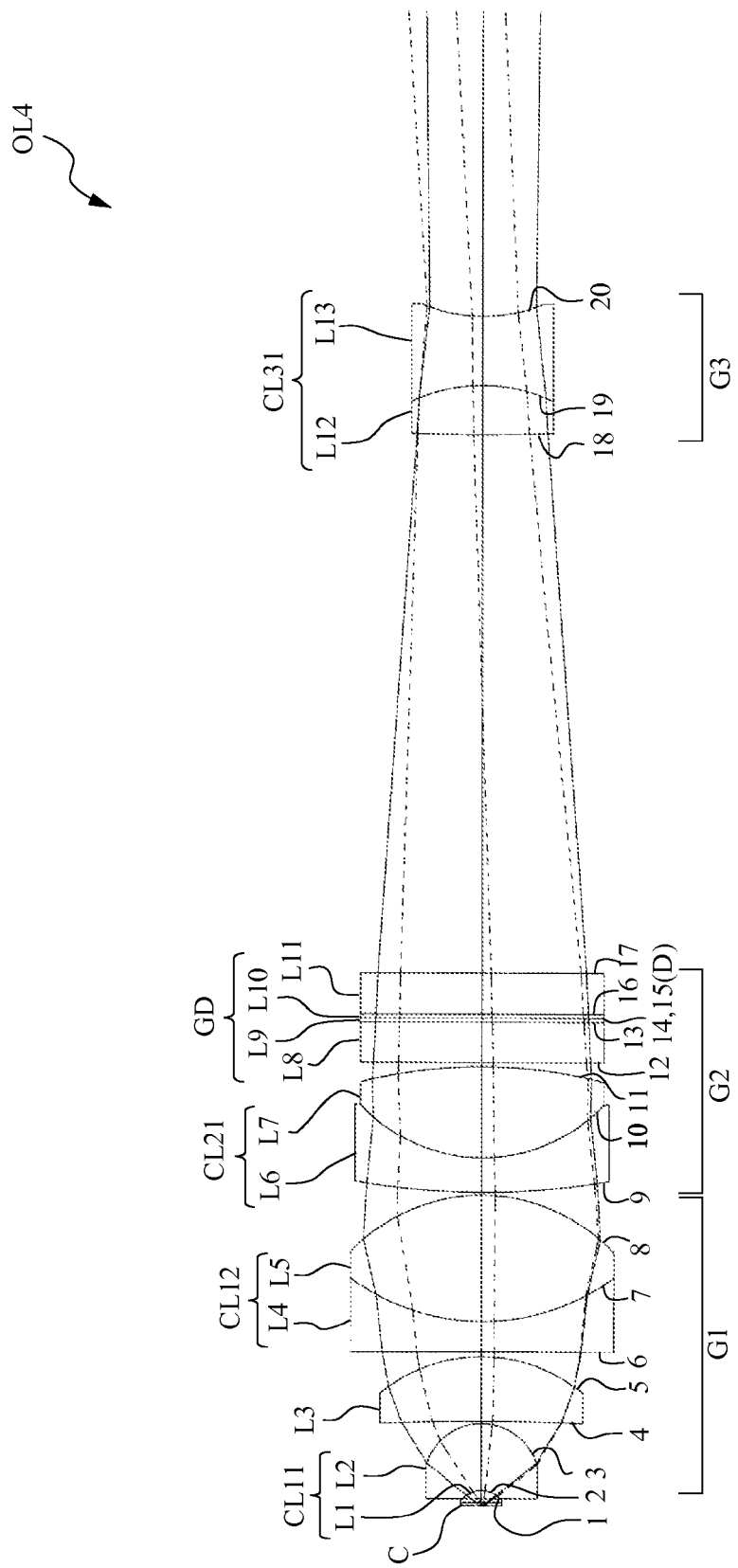
FIG. 7 is a lens configuration diagram of a microscope objective lens according to a fourth example.

Next, a microscope objective lens OL4 illustrated in FIG. 7 will be described as a fourth example. The microscope objective lens OL4 illustrated in FIG. 7 is an immersion objective lens used in a microscope in which a specimen (object) is placed under a cover plate C and the specimen is observed with a distal end of the microscope immersed in an immersion liquid. The microscope objective lens OL4 comprises, in order from the object side, a first lens group G1 having a positive refractive power, a second lens group G2 having a positive refractive power, and a third lens group G3 having a negative refractive power. The first lens group G1 comprises, in order from the object side, a cemented lens component CL11 that joins a planoconvex lens L1 whose object side is planarly formed and a negative meniscus lens L2 whose concave surface faces the object side, a positive meniscus lens L3 whose concave surface faces the object side, and a cemented lens component (achromatizing lens component) CL12 that joins a biconcave lens L4 and a biconvex lens L5. In addition, the second lens group G2 comprises, in order from the object side, a cemented lens component (achromatizing lens component) CL21 that joins a negative meniscus lens L6 whose convex surface faces the object side and a biconvex lens L7, and a diffractive optical element GD including a diffractive optical surface D. Furthermore, the third lens group G3 comprises a cemented lens component CL31 that joins, in order from the object side, a biconvex lens L12 and a biconcave lens L13. As shown, in the present fourth example, the achromatic lens component CL31 comprising the third lens group G3 is configured as a cemented lens component that joins two lenses. In addition, the lens surfaces that restrict an off-axis light bundle that determines an off-axis principal ray and an effective radius in the present fourth example are an image-side surface (fifth surface) of the positive meniscus lens L3 and an object-side surface (eighteenth surface) of the biconvex lens L12.

In addition, the diffractive optical element GD according to the present fourth example is also a bonded-multilayer diffractive optical element and joins a plate-like piece of optical glass L8, two plate-like optical members L9 and L10 respectively formed from different resin materials, and a plate-like piece of optical glass L11, in this order. Diffractive grating grooves (diffractive optical surface D) are formed on a bonded surface of the optical members L9 and L10.

Specifications of the microscope objective lens OL4 according to the fourth example and illustrated in FIG. 7 are presented in Table 6. Moreover, in the present fourth example and the next fifth example which use a cover plate C, d0 represents a distance on an optical axis from the object (specimen) to a vertex of a lens surface (first surface) nearest to the object side of a first lens (lens L1) nearest to the object side and excluding the thickness of the cover plate C, and dR represents an optical path length from a vertex of the second surface to the object excluding the thickness of the cover plate C. In this case, the cover plate C has a thickness of 0.17 mm, a refractive index of 1.52216 with respect to the d line, and an Abbe's number of 58.8, and the immersion liquid has a refractive index of 1.51536 with respect to the d line and an Abbe's number of 41.4. In addition, the surface numbers presented in Table 6 match the surface numbers 1 to 20 illustrated in FIG. 7.

TABLE 6 f = 1.990
NA = 1.25
β = 100x
d0 = 0.174
dR = 0.871
h = 0.46
f1 = 4.374
f2 = 88.548
f12 = 4.672
f3 = −30.152
N = 23
H = 5.27

| m | r | d | nd | νd |
|---|---|---|---|---|
| 1 | 0.000 | 0.4 | 1.51823 | 58.9 |
| 2 | −1.261 | 3.3 | 1.90265 | 35.7 |
| 3 | −2.875 | 0.1 | | |
| 4 | −112.396 | 3.2 | 1.60300 | 65.5 |
| 5 | −7.930 | 0.2 | | |
| 6 | −609.844 | 1.5 | 1.74950 | 35.3 |
| 7 | 10.980 | 6.2 | 1.49782 | 82.5 |
| 8 | −8.898 | 0.1 | | |
| 9 | 36.907 | 1.7 | 1.75692 | 31.6 |
| 10 | 8.144 | 4.5 | 1.49782 | 82.5 |
| 11 | −24.025 | 0.2 | | |
| 12 | 0.000 | 2.0 | 1.51680 | 64.1 |
| 13 | 0.000 | 0.2 | 1.55690 | 50.2 |
| 14 | 0.000 | 0.0 | 10001.00000 | −3.5 |
| 15* | 0.000 | 0.2 | 1.52760 | 34.7 |
| 16 | 0.000 | 2.0 | 1.51680 | 64.1 |
| 17 | 0.000 | 26.5 | | |
| 18 | 105.388 | 2.4 | 1.69895 | 30.1 |
| 19 | −8.220 | 3.4 | 1.51680 | 64.1 |
| 20 | 7.755 | | | |

Diffractive optical surface data

Fifteenth surface

κ = 1.0000 A2 = −5.00000E−08 A4 = 3.64816E−14
A6 = −1.91386E−16 A8 = −5.33683E−19
A10 = 0.00000E−00

Condition-corresponding values

| (1) | $|(n2 - n1)/(r \cdot dR)| = 0.350$ |
| (2) | $|h/f| = 0.23$ |
| (3) | $|f12/f| = 2.35$ |
| (4) | $|f3/f| = 15.2$ |
| (5) | $|f2/f| = 44.5$ |
| (6) | N/H = 4.4 |
| (7) | nd1 = 1.528 |
| (8) | nF1 − nC1 = 0.0152 |
| (9) | nd2 = 1.557 |
| (10) | nF2 − nC2 = 0.0111 |

Figure 8:
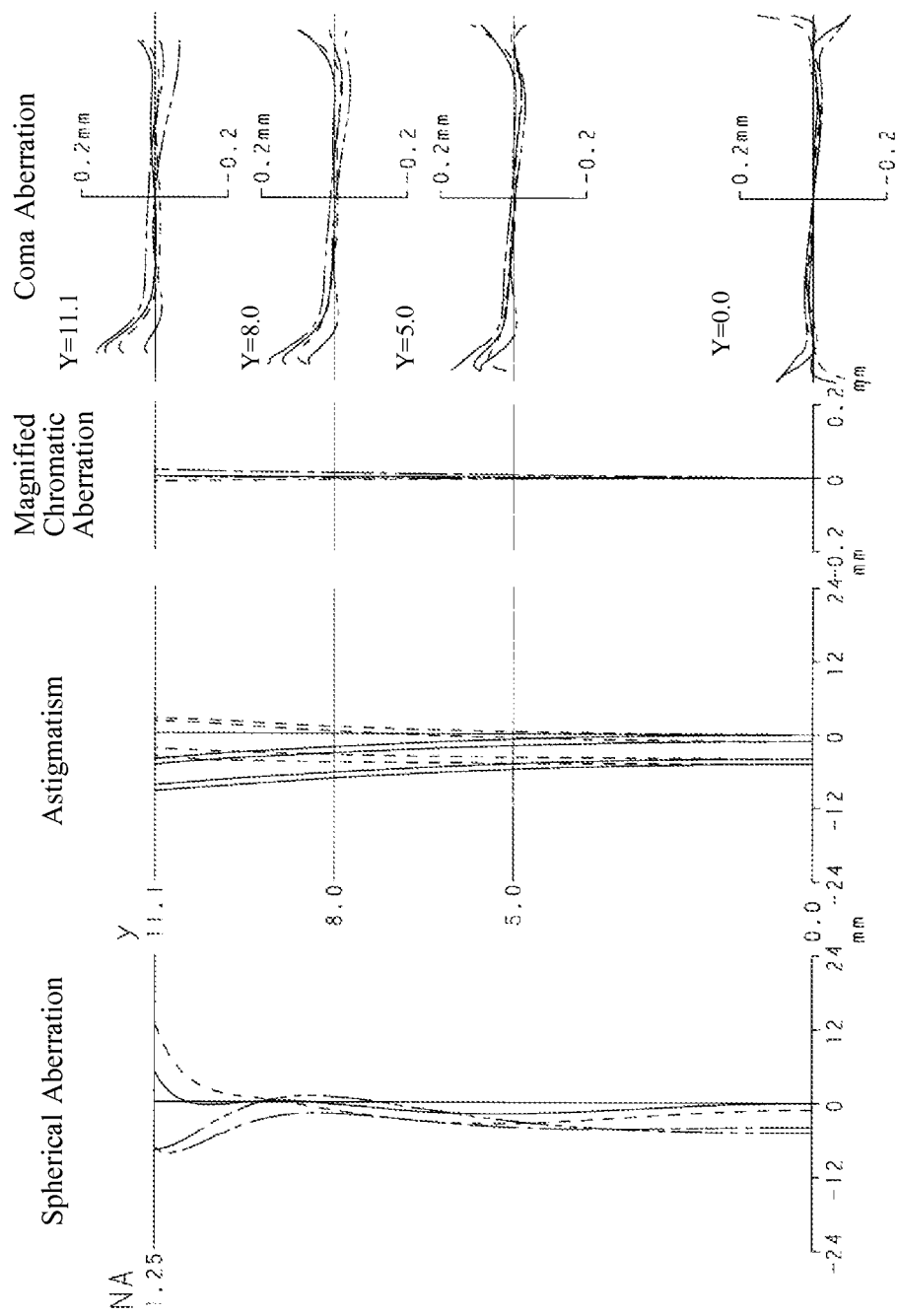
FIG. 8 presents various aberration diagrams of the microscope objective lens according to the fourth example.

Among the condition-corresponding values presented in Table 6, the conditional expression (1) is a value calculated from a curvature radius r of the second surface and refractive indexes n1 and n2 of mediums anterior and posterior to the second surface with respect to the d line. In addition, the conditional expressions (7) and (8) correspond to values of the fifteenth surface and the conditional expressions (9) and (10) correspond to values of the thirteenth surface. As shown, all of the conditional expressions (1) to (10) given above are satisfied in the fourth example. FIG. 8 illustrates various aberration diagrams of spherical aberration, astigmatism, lateral chromatic aberration, and coma aberration of the microscope objective lens OL4 according to the present fourth example. The coma aberration diagram in FIG. 8 illustrates aberration amounts when the image height Y is set to 11.1 mm, to 8.0 mm, to 5.0 mm, and to 0 mm. As is apparent from the various aberration diagrams, similarly in the present fourth example, various aberrations are favorably corrected and superior imaging performance is ensured.

Fifth Example

Figure 9:
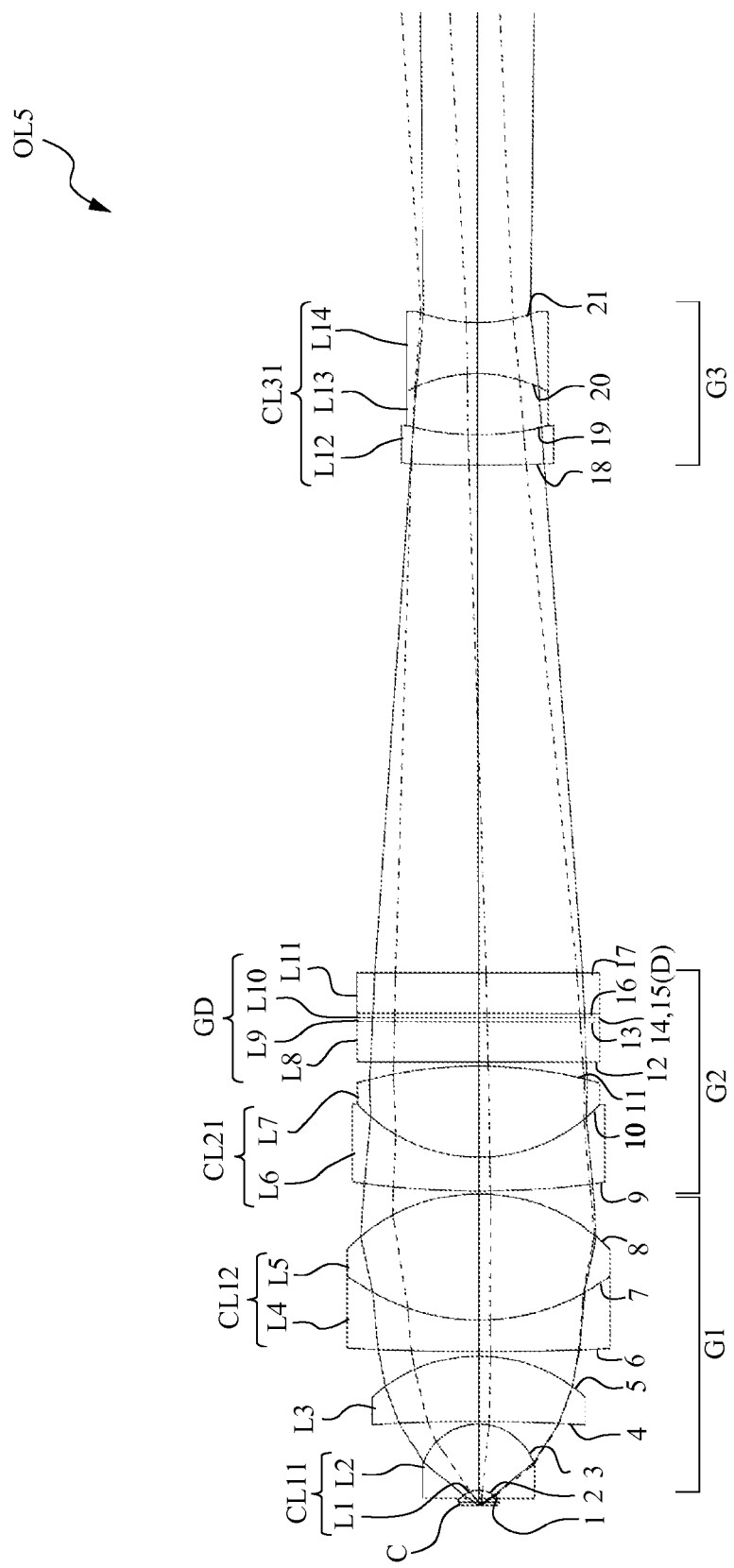
FIG. 9 is a lens configuration diagram of a microscope objective lens according to a fifth example.

Next, a microscope objective lens OL5 illustrated in FIG. 9 will be described as the fifth example. The microscope objective lens OL5 illustrated in FIG. 9 is also an immersion objective lens used in a microscope in which a specimen (object) is placed under a cover plate C and the specimen is observed with a distal end of the microscope immersed in an immersion liquid. The microscope objective lens OL5 comprises, in order from the object side, a first lens group G1 having a positive refractive power, a second lens group G2 having a positive refractive power, and a third lens group G3 having a negative refractive power. The first lens group G1 comprises, in order from the object side, a cemented lens component CL11 that joins a planoconvex lens L1 whose object side is planarly formed and a negative meniscus lens L2 whose concave surface faces the object side, a positive meniscus lens L3 whose concave surface faces the object side, and a cemented lens component (achromatizing lens component) CL12 that joins a negative meniscus lens L4 whose convex surface faces the object side and a biconvex lens L5. In addition, the second lens group G2 comprises, in order from the object side, a cemented lens component (achromatizing lens component) CL21 that joins a negative meniscus lens L6 whose convex surface faces the object side and a biconvex lens L7, and a diffractive optical element GD including a diffractive optical surface D. Furthermore, the third lens group G3 comprises a cemented lens component CL31 that joins, in order from the object side, a negative meniscus lens L12 whose convex surface faces the object side, a biconvex lens L13, and a biconcave lens L14. As shown, in the present fifth example, the achromatic lens component CL31 comprising the third lens group G3 is configured as a cemented lens component that joins three lenses. In addition, the lens surfaces that restrict an off-axis light bundle that determines an off-axis principal ray and an effective radius in the present fifth example are an image-side surface (fifth surface) of the positive meniscus lens L3 and an object-side surface (eighteenth surface) of the negative meniscus lens L12.

In addition, the diffractive optical element GD according to the present fifth example is also a bonded-multilayer diffractive optical element and joins a plate-like piece of optical glass L8, two plate-like optical members L9 and L10 respectively formed from different resin materials, and a plate-like piece of optical glass L11, in this order. Diffractive grating grooves (diffractive optical surface D) are formed on a bonded surface of the optical members L9 and L10.

Specifications of the microscope objective lens OL5 according to the fifth example and illustrated in FIG. 9 are presented in Table 7. The surface numbers presented in Table 7 match the surface numbers 1 to 21 illustrated in FIG. 9.

TABLE 7 f = 1.989
NA = 1.25
β = 100x
d0 = 0.174
dR = 0.871
h = 0.43
f1 = 4.322
f2 = 101.572
f12 = 4.650
f3 = −30.092
N = 25
H = 5.26

| m | r | d | nd | vd |
|---|---|---|---|---|
| 1 | 0.000 | 0.4 | 1.51823 | 58.9 |
| 2 | −1.261 | 3.3 | 1.90265 | 35.7 |
| 3 | −2.889 | 0.1 | | |
| 4 | −86.403 | 3.2 | 1.60300 | 65.5 |
| 5 | −7.861 | 0.2 | | |
| 6 | 140.533 | 1.5 | 1.74950 | 35.3 |
| 7 | 10.780 | 6.2 | 1.49782 | 82.5 |
| 8 | −9.124 | 0.1 | | |
| 9 | 44.249 | 1.7 | 1.75692 | 31.6 |
| 10 | 8.181 | 4.5 | 1.49782 | 82.5 |
| 11 | −22.375 | 0.2 | | |
| 12 | 37663.957 | 2.0 | 1.51680 | 64.1 |
| 13 | 0.000 | 0.2 | 1.55690 | 50.2 |
| 14 | 0.000 | 0.0 | 10001.00000 | −3.5 |
| 15* | 0.000 | 0.2 | 1.52760 | 34.7 |
| 16 | 0.000 | 2.0 | 1.51680 | 64.1 |
| 17 | 0.000 | 25.0 | | |
| 18 | 58.830 | 1.5 | 1.61340 | 44.3 |
| 19 | 14.067 | 3.0 | 1.67270 | 32.1 |
| 20 | −7.152 | 2.5 | 1.56883 | 56.3 |
| 21 | 8.451 | | | |

Diffractive optical surface data

Fifteenth surface

κ = 1.0000 A2 = −5.23715E−08 A4 = 2.66577E−13
A6 = −2.84237E−16 A8 = −3.93947E−18
A10 = 0.00000E−00

Condition-corresponding values

| (1) | $|(n2 - n1)/(r \cdot dR)| = 0.350$ |
| (2) | $|h/f| = 0.22$ |
| (3) | $|f12/f| = 2.34$ |
| (4) | $|f3/f| = 15.1$ |
| (5) | $|f2/f| = 51.1$ |
| (6) | $N/H = 4.8$ |
| (7) | $nd1 = 1.528$ |
| (8) | $nF1 - nC1 = 0.0152$ |
| (9) | $nd2 = 1.557$ |
| (10) | $nF2 - nC2 = 0.0111$ |

Figure 10:
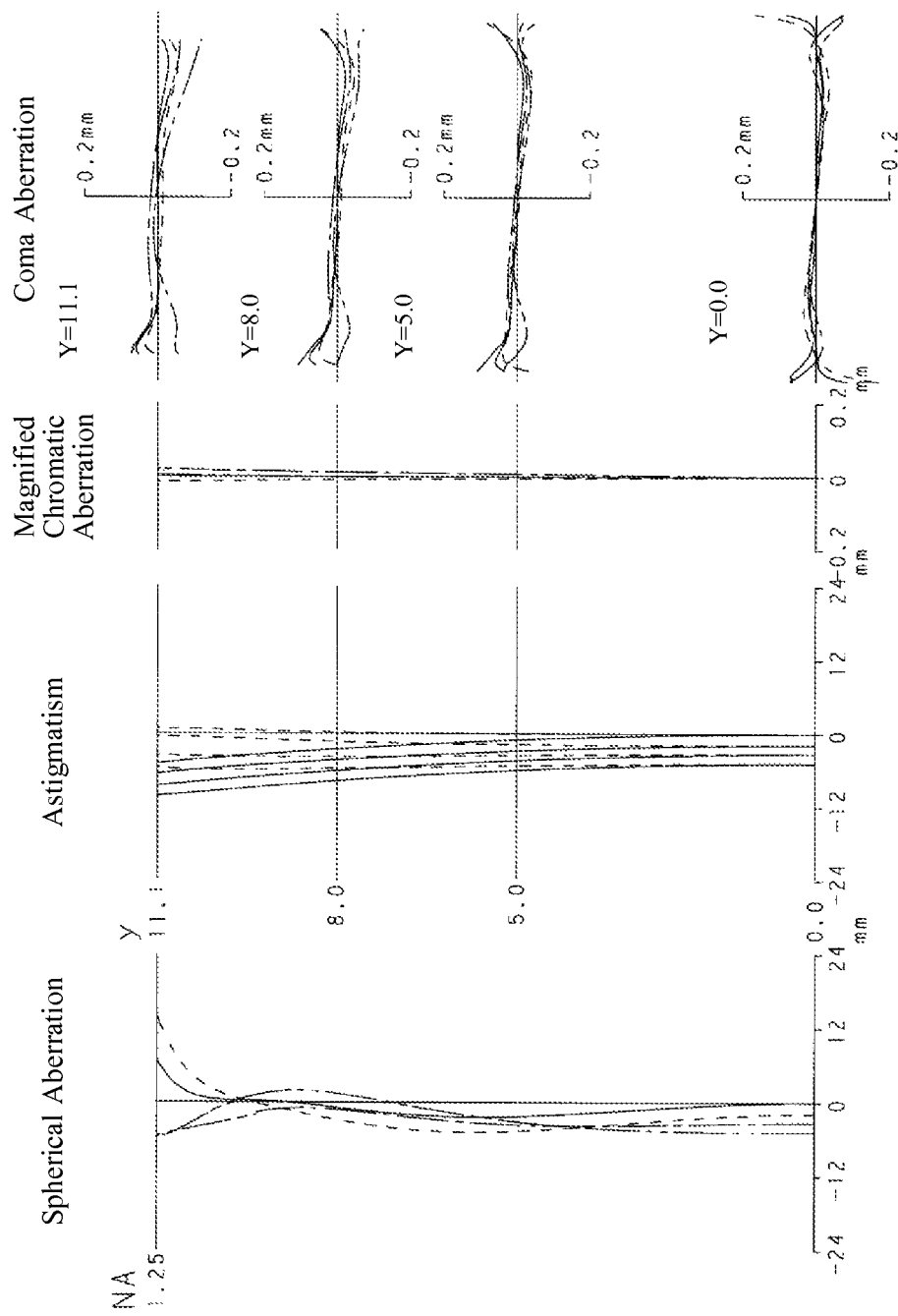
FIG. 10 presents various aberration diagrams of the microscope objective lens according to the fifth example.

Among the condition-corresponding values presented in Table 7, the conditional expression (1) is a value calculated from a curvature radius r of the second surface and refractive indexes n1 and n2 of mediums anterior and posterior to the second surface with respect to the d line. In addition, the conditional expressions (7) and (8) correspond to values of the fifteenth surface and the conditional expressions (9) and (10) correspond to values of the thirteenth surface. As shown, all of the conditional expressions (1) to (10) given above are satisfied in the fifth example. FIG. 10 illustrates various aberration diagrams of spherical aberration, astigmatism, lateral chromatic aberration, and coma aberration of the microscope objective lens OL5 according to the present fifth example. The coma aberration diagram in FIG. 10 illustrates aberration amounts when the image height Y is set to 11.1 mm, to 8.0 mm, to 5.0 mm, and to 0 mm. As is apparent from the various aberration diagrams, similarly in the present fifth example, various aberrations are favorably corrected and superior imaging performance is ensured.

Sixth Example

Next, a microscope objective lens OL6 illustrated in FIG. 11 will be described as a sixth example. The microscope objective lens OL6 is a dry objective lens and comprises, in order from the object side, a first lens group G1 having a positive refractive power, a second lens group G2 having a positive refractive power, and a third lens group G3 having a negative refractive power. The first lens group G1 comprises, in order from the object side, a positive meniscus lens L1 whose concave surface faces the object side, and a cemented lens component (achromatizing lens component) CL11 that joins a biconvex lens L2 and a negative meniscus lens L3 whose concave surface faces the object side. In addition, the second lens group G2 comprises, in order from the object side, a negative meniscus lens L4 whose convex surface faces the object side, a diffractive optical element GD including a diffractive optical surface D and having a positive meniscus lens-shape whose convex surface faces the object side, and a cemented lens component (achromatizing lens component) CL21 that joins a biconvex lens L9 and a biconcave lens L10. Furthermore, the third lens group G3 comprises a cemented lens component CL31 that joins, in order from the object side, a positive meniscus lens L11 whose concave surface faces the object side and a biconcave lens L12. As shown, in the present sixth example, the achromatic lens component CL31 comprising the third lens group G3 is configured as a cemented lens component that joins two lenses. In addition, the lens surfaces that restrict an off-axis light bundle that determines an off-axis principal ray and an effective radius in the present sixth example are an object-side surface (first surface) of the positive meniscus lens L1 and an image-side surface (eighteenth surface) of the biconcave lens L12.

Furthermore, the diffractive optical element GD joins a planoconvex lens L5 whose convex surface faces the object side, two optical members L6 and L7 respectively formed from different resin materials, and a planoconcave lens L8 whose concave surface faces the image side, in this order. Diffractive grating grooves (diffractive optical surface D) are formed on a bonded surface of the optical members L6 and L7. In other words, the diffractive optical element GD is a bonded-multilayer diffractive optical element.

Specifications of the microscope objective lens OL6 according to the sixth example and illustrated in FIG. 11 are presented in Table 8. The surface numbers presented in Table 8 correspond to the surface numbers 1 to 18 illustrated in FIG. 11.

TABLE 8 f = 10.076
NA = 0.35
β = 20x
d0 = 25.95
h = 0.54
f1 = 23.106
f2 = 52.842
f12 = 16.215
f3 = −12.744
N = 39
H = 9.11

| m | r | d | nd | vd |
|---|---|---|---|---|
| 1 | −100.000 | 3.00 | 1.75500 | 52.29 |
| 2 | −22.783 | 0.20 | | |
| 3 | 46.962 | 4.70 | 1.49782 | 82.52 |
| 4 | −25.699 | 1.20 | 1.71736 | 29.52 |
| 5 | −44.046 | 0.20 | | |

TABLE 8-continued

| | | | | |
|---|---|---|---|---|
| 6 | 26.111 | 1.30 | 1.75692 | 31.59 |
| 7 | 16.131 | 4.10 | 1.49782 | 82.52 |
| 8 | 0.000 | 0.20 | 1.55690 | 50.17 |
| 9 | 0.000 | 0.00 | 10001.00000 | −3.45 |
| 10* | 0.000 | 0.20 | 1.52760 | 34.71 |
| 11 | 0.000 | 2.00 | 1.51680 | 64.12 |
| 12 | 316.639 | 0.20 | | |
| 13 | 20.449 | 3.80 | 1.49782 | 82.52 |
| 14 | −58.825 | 1.40 | 1.72342 | 37.94 |
| 15 | 46.452 | 12.00 | | |
| 16 | −35.297 | 2.00 | 1.84666 | 23.78 |
| 17 | −9.400 | 1.00 | 1.72916 | 54.66 |
| 18 | 11.185 | | | |

Diffractive optical surface data

Tenth surface

κ = 1.0000 A2 = −2.77779E−08 A4 = 5.65073E−14
A6 = −2.12592E−16 A8 = −1.96429E−19
A10 = 0.00000E+00

Condition-corresponding values

| (1) | $|(n2 − n1)/(r \cdot d0)| = 0.00029$ |
|---|---|
| (2) | $|h/f| = 0.054$ |
| (3) | $|f12/f| = 1.61$ |
| (4) | $|f3/f| = 1.27$ |
| (5) | $|f2/f| = 5.24$ |
| (6) | $N/H = 4.28$ |
| (7) | $nd1 = 1.52760$ |
| (8) | $nF1 − nC1 = 0.015$ |
| (9) | $nd2 = 1.55690$ |
| (10) | $nF2 − nC2 = 0.011$ |

Figure 12:
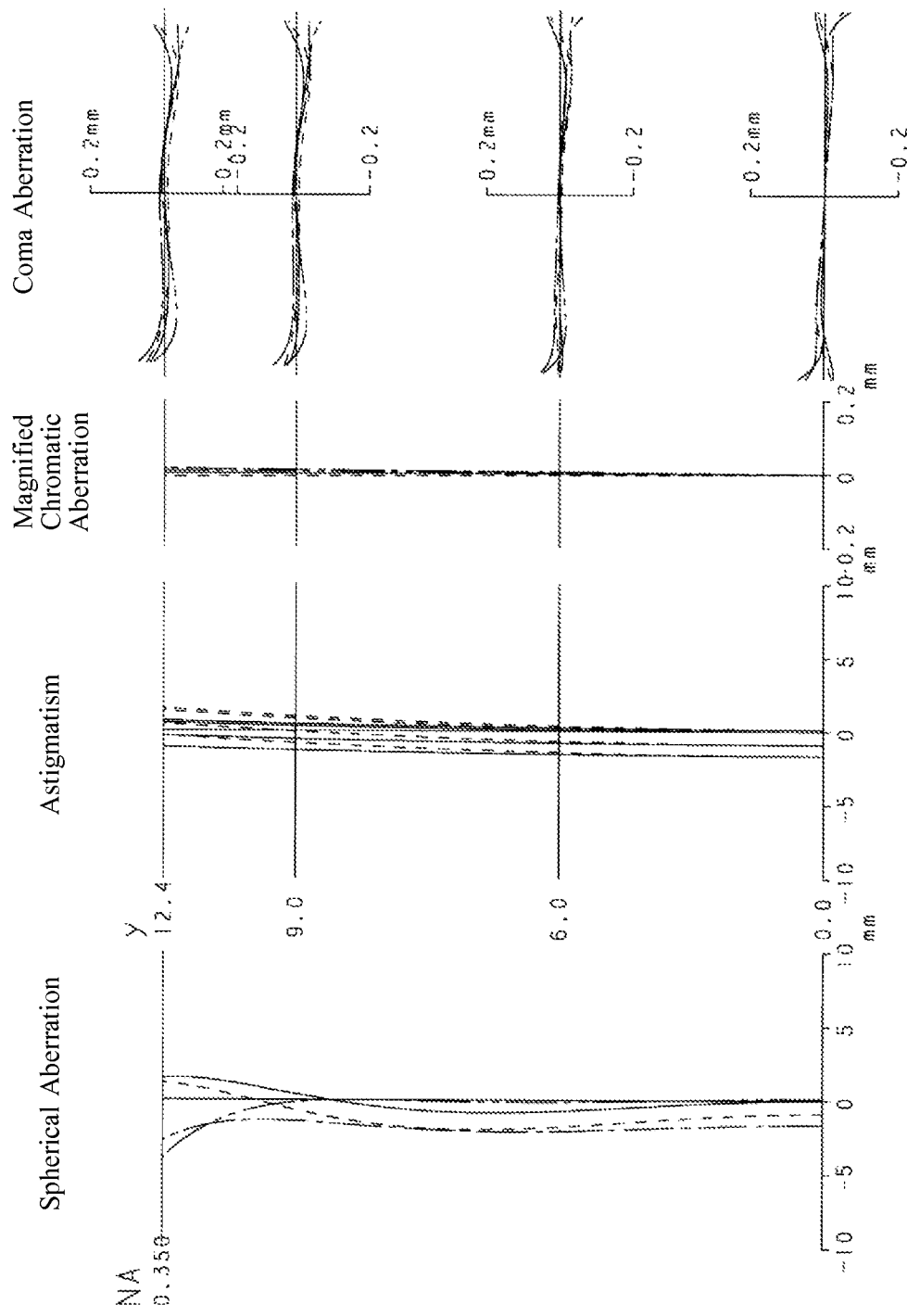
FIG. 12 presents various aberration diagrams of the microscope objective lens according to the sixth example.

Among the condition-corresponding values presented in Table 8, the conditional expression (1) is a value calculated from a curvature radius r of the first surface and refractive indexes n1 and n2 of mediums anterior and posterior to the first surface with respect to the d line. In addition, the conditional expressions (7) and (8) correspond to values of the tenth surface and the conditional expressions (9) and (10) correspond to values of the eighth surface. As shown, all of the conditional expressions (1) to (10) given above are satisfied in the sixth example. FIG. 12 illustrates various aberration diagrams of spherical aberration, astigmatism, lateral chromatic aberration, and coma aberration with respect to rays of the d line, the C line, the F line, and the g line of the microscope objective lens OL6 according to the present sixth example. The coma aberration diagram in FIG. 12 illustrates aberration amounts when the image height Y is set to 12.4 mm, to 9.0 mm, to 6.0 mm, and to 0 mm. As is apparent from the various aberration diagrams, similarly in the present sixth example, various aberrations are favorably corrected and superior imaging performance is ensured.

Seventh Example

Figure 13:
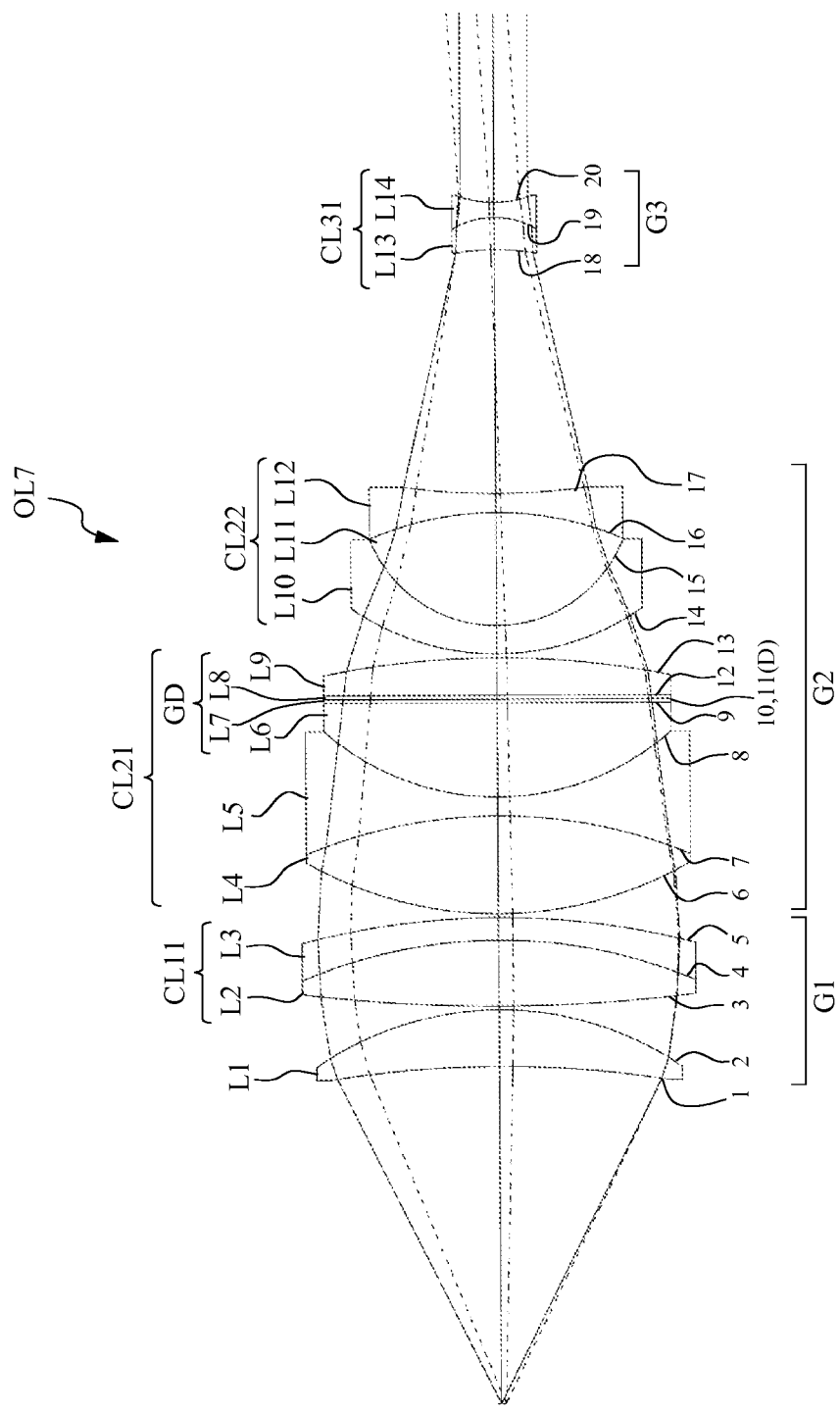
FIG. 13 is a lens configuration diagram of a microscope objective lens according to a seventh example.

Next, a microscope objective lens OL7 illustrated in FIG. 13 will be described as a seventh example. The microscope objective lens OL7 illustrated in FIG. 13 is also a dry objective lens and comprises, in order from the object side, a first lens group G1 having a positive refractive power, a second lens group G2 having a positive refractive power, and a third lens group G3 having a negative refractive power. The first lens group G1 comprises, in order from the object side, a positive meniscus lens L1 whose concave surface faces the object side, and a cemented lens component (achromatizing lens component) CL11 that joins a biconvex lens L2 and a negative meniscus lens L3 whose concave surface faces the object side. In addition, the second lens group G2 comprises, in order from the object side, a cemented lens component (achromatizing lens component) CL21 that joins a biconvex lens L4, a biconcave lens L5, and a diffractive optical element GD including a diffractive optical surface D and having a biconvex lens-shape, and a cemented lens component (achromatizing lens component) CL22 that joins a negative meniscus lens L10 whose convex surface faces the object side, a biconvex lens L11, and a biconcave lens L12. Furthermore, the third lens group G3 comprises a cemented lens component CL31 that joins, in order from the object side, a positive meniscus lens L13 whose concave surface faces the object side and a biconcave lens L14. As shown, in the present second example, the achromatic lens component CL31 comprising the third lens group G3 is configured as a cemented lens component that joins two lenses. In addition, the lens surfaces that restrict an off-axis light bundle that determines an off-axis principal ray and an effective radius in the present seventh example are an image-side surface (second surface) of the positive meniscus lens L1 and an object-side surface (eighteenth surface) of the positive meniscus lens L13.

Moreover, the diffractive optical element GD according to the present seventh example is also a bonded-multilayer diffractive optical element and joins a planoconvex lens L6 whose convex surface faces the object side, two optical members L7 and L8 respectively formed from different resin materials, and a planoconvex lens L9 whose convex surface faces the image side, in this order. Diffractive grating grooves (diffractive optical surface D) are formed on a bonded surface of the optical members L7 and L8.

Specifications of the microscope objective lens OL7 according to the seventh example and illustrated in FIG. 13 are presented in Table 9. The surface numbers presented in Table 9 match the surface numbers 1 to 20 illustrated in FIG. 13.

TABLE 9 f = 4.005
NA = 0.45
β = 50x
d0 = 17.83
h = 0.54
f1 = 19.146
f2 = 51.432
f12 = 12.025
f3 = −7.889
N = 25
H = 8.25

| m | r | d | nd | vd |
|---|---|---|---|---|
| 1 | −57.300 | 3.00 | 1.77250 | 49.62 |
| 2 | −17.238 | 0.20 | | |
| 3 | 86.481 | 3.50 | 1.60300 | 65.47 |
| 4 | −27.000 | 1.20 | 1.62374 | 47.04 |
| 5 | −41.645 | 0.20 | | |
| 6 | 20.575 | 5.20 | 1.43385 | 95.25 |
| 7 | −26.714 | 1.00 | 1.61340 | 44.27 |
| 8 | 14.002 | 5.00 | 1.59240 | 68.33 |
| 9 | 0.000 | 0.20 | 1.55690 | 50.17 |
| 10 | 0.000 | 0.00 | 10001.00000 | −3.45 |
| 11* | 0.000 | 0.20 | 1.52760 | 34.71 |
| 12 | 0.000 | 2.00 | 1.60300 | 65.47 |
| 13 | −46.301 | 0.20 | | |
| 14 | 13.584 | 1.50 | 1.62374 | 47.04 |
| 15 | 7.271 | 6.00 | 1.43385 | 95.25 |
| 16 | −16.966 | 1.00 | 1.74950 | 35.27 |
| 17 | 35.143 | 12.90 | | |
| 18 | −12.687 | 1.70 | 1.80810 | 22.76 |
| 19 | −4.450 | 0.80 | 1.60300 | 65.47 |
| 20 | 5.751 | | | |

TABLE 9-continued

Diffractive optical surface data

Eleventh surface

κ = 1.0000 A2 = −2.12762E−08 A4 = 6.05843E−14
A6 = −1.82066E−16 A8 = −1.96429E−19
A10 = 0.00000E+00

Condition-corresponding values

| (1) | \|(n2 − n1)/(r · d0)\| = 0.00076 |
| (2) | \|h/f\| = 0.14 |
| (3) | \|f12/f\| = 3.00 |
| (4) | \|f3/f\| = 1.97 |
| (5) | \|f2/f\| = 12.84 |
| (6) | N/H = 3.03 |
| (7) | nd1 = 1.52760 |
| (8) | nF1 − nC1 = 0.015 |
| (9) | nd2 = 1.55690 |
| (10) | nF2 − nC2 = 0.011 |

Figure 14:
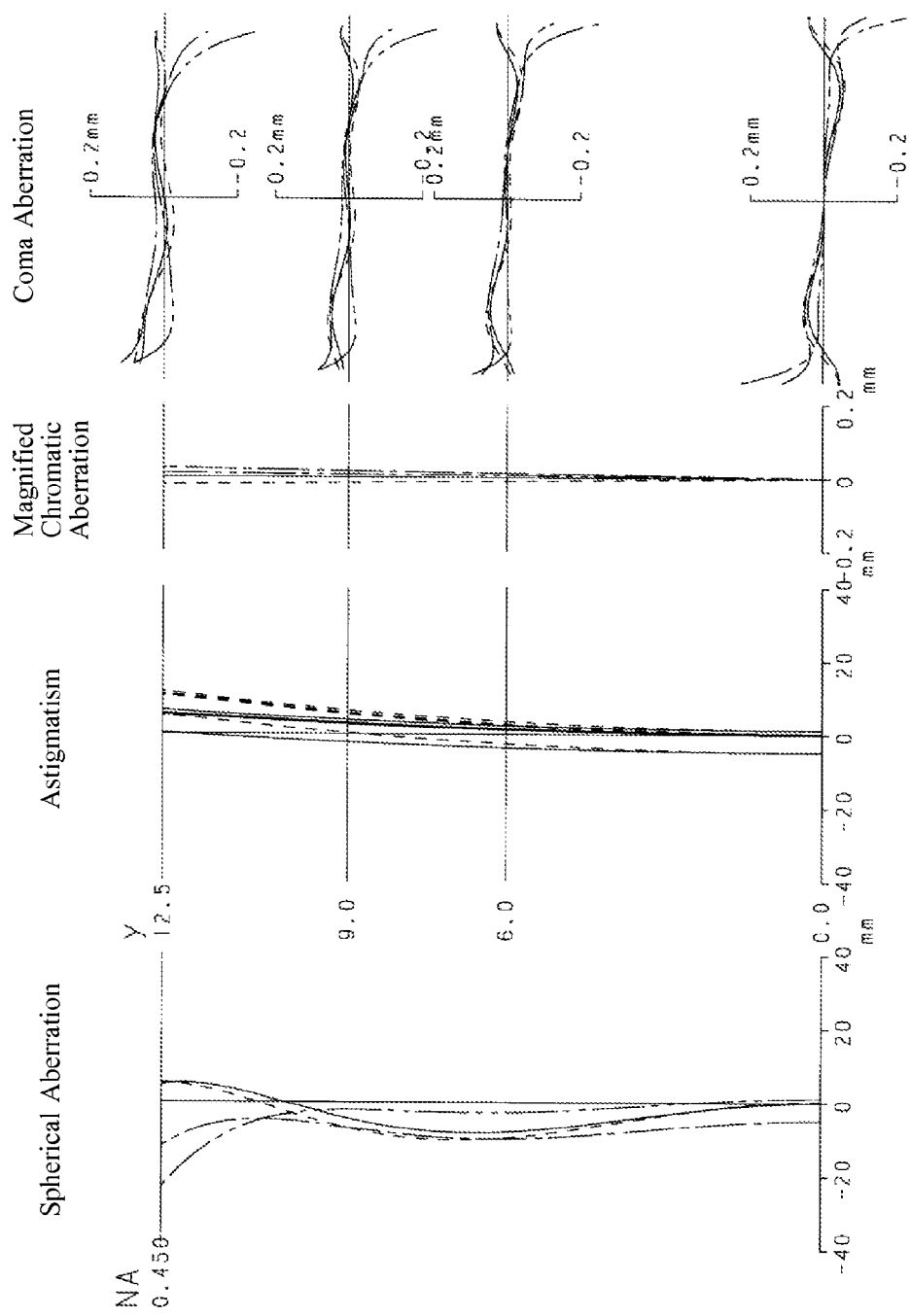
FIG. 14 presents various aberration diagrams of the microscope objective lens according to the seventh example.

Among the condition-corresponding values presented in Table 9, the conditional expression (1) is a value calculated from a curvature radius r of the first surface and refractive indexes n1 and n2 of mediums anterior and posterior to the first surface with respect to the d line. In addition, the conditional expressions (7) and (8) correspond to values of the eleventh surface and the conditional expressions (9) and (10) correspond to values of the ninth surface. As shown, all of the conditional expressions (1) to (10) given above are satisfied in the seventh example. FIG. 14 illustrates various aberration diagrams of spherical aberration, astigmatism, lateral chromatic aberration, and coma aberration of the microscope objective lens OL7 according to the present seventh example. The coma aberration diagram in FIG. 14 illustrates aberration amounts when the image height Y is set to 12.5 mm, to 9.0 mm, to 6.0 mm, and to 0 mm. As is apparent from the various aberration diagrams, similarly in the present seventh example, aberrations are favorably corrected and superior imaging performance is ensured.

Eighth Example

Figure 15:
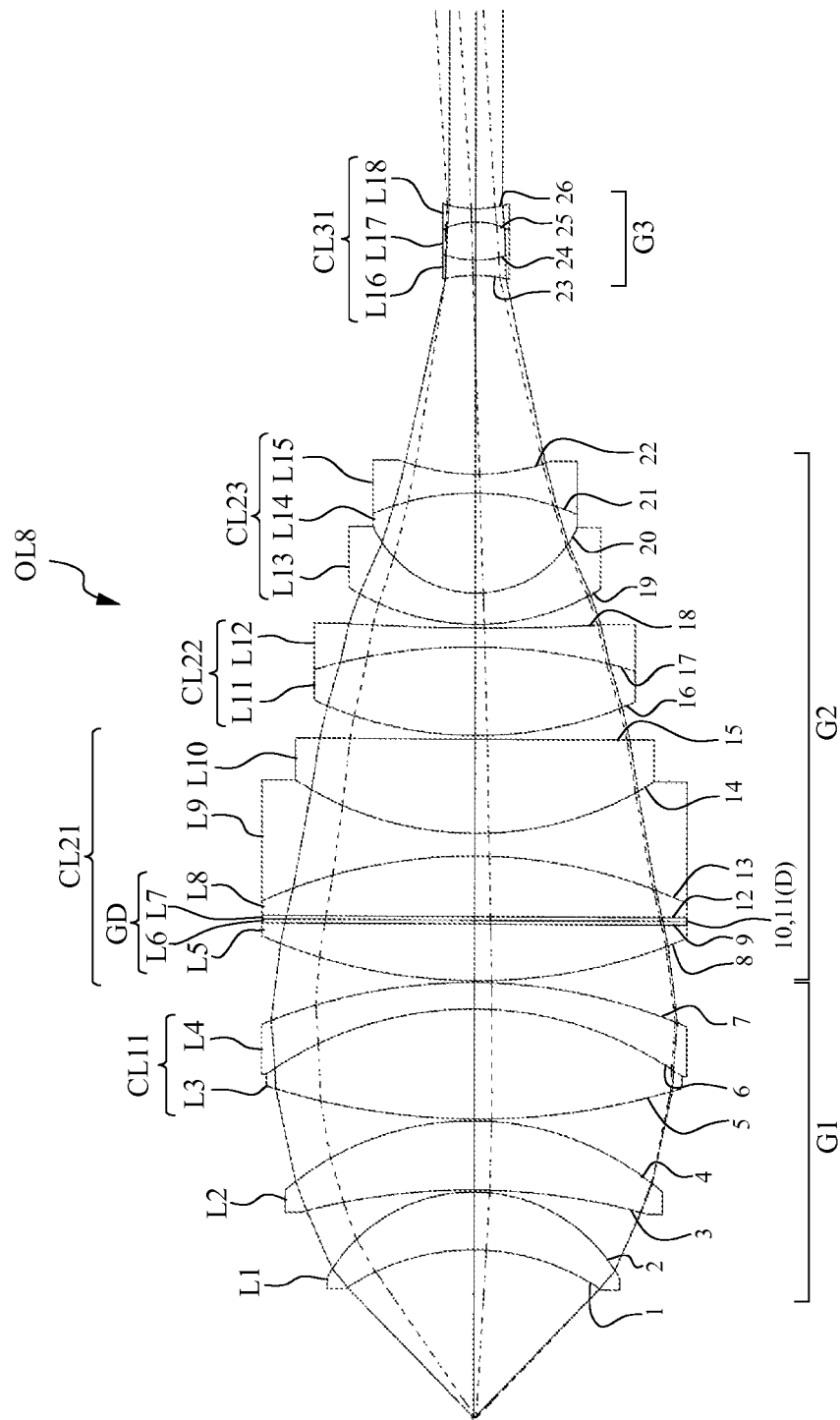
FIG. 15 is a lens configuration diagram of a microscope objective lens according to an eighth example.

Next, a microscope objective lens OL8 illustrated in FIG. 15 will be described as an eighth example. The microscope objective lens OL8 illustrated in FIG. 15 is also a dry objective lens and comprises, in order from the object side, a first lens group G1 having a positive refractive power, a second lens group G2 having a positive refractive power, and a third lens group G3 having a negative refractive power. The first lens group G1 comprises, in order from the object side, a positive meniscus lens L1 whose concave surface faces the object side, a positive meniscus lens L2 whose concave surface faces the object side, and a cemented lens component (achromatizing lens component) CL11 that joins a biconvex lens L3 and a negative meniscus lens L4 whose concave surface faces the object side. In addition, the second lens group G2 comprises, in order from the object side, a cemented lens component (achromatizing lens component) CL21 that joins a diffractive optical element GD including a diffractive optical surface D and having a biconvex lens-shape, a biconcave lens L9, and a positive meniscus lens L10 whose convex surface faces the object side, a cemented lens component L22 that joins a biconvex lens L11 and a biconcave lens L12, and a cemented lens component (achromatizing lens component) CL23 that joins a negative meniscus lens L13 whose convex surface faces the object surface side, a biconvex lens L14, and a biconcave lens L15. Furthermore, the third lens group G3 comprises a cemented lens component CL31 that joins, in order from the object side, a biconcave lens L16, a biconvex lens L17, and a biconcave lens L18. As shown, in the present eighth example, the achromatic lens component CL31 comprising the third lens group G3 is configured as a cemented lens component that joins three lenses. In addition, the lens surfaces that restrict an off-axis light bundle that determines an off-axis principal ray and an effective radius in the present eighth example are an image-side surface (second surface) of the positive meniscus lens L1 and an object-side surface (twenty-third surface) of the biconcave lens L16.

Moreover, the diffractive optical element GD according to the present eighth example is also a bonded-multilayer diffractive optical element and joins a planoconvex lens L5 whose convex surface faces the object side, two optical members L6 and L7 respectively formed from different resin materials, and a planoconvex lens L8 whose convex surface faces the image side, in this order. Diffractive grating grooves (diffractive optical surface D) are formed on a bonded surface of the optical members L6 and L7.

Specifications of the microscope objective lens OL8 according to the eighth example and illustrated in FIG. 15 are presented in Table 10. The surface numbers presented in Table 10 match the surface numbers 1 to 26 illustrated in FIG. 15.

TABLE 10 f = 2.003
NA = 0.7
β = 100x
d0 = 8.824
h = 0.84
f1 = 12.897
f2 = 117.192
f12 = 7.192
f3 = −6.687
N = 43
H = 10.04

| m | r | d | nd | νd |
|---|---|---|---|---|
| 1 | −12.140 | 3.05 | 1.78800 | 47.38 |
| 2 | −8.907 | 0.10 | | |
| 3 | −35.273 | 3.65 | 1.49782 | 82.52 |
| 4 | −15.323 | 0.10 | | |
| 5 | 37.000 | 5.80 | 1.49782 | 82.52 |
| 6 | −19.000 | 1.40 | 1.61340 | 44.26 |
| 7 | −28.903 | 0.10 | | |
| 8 | 28.628 | 3.00 | 1.60300 | 65.47 |
| 9 | 0.000 | 0.20 | 1.55690 | 50.17 |
| 10 | 0.000 | 0.00 | 10001.00000 | −3.45 |
| 11* | 0.000 | 0.20 | 1.52760 | 34.71 |
| 12 | 0.000 | 3.20 | 1.49782 | 82.52 |
| 13 | −27.000 | 1.20 | 1.61340 | 44.27 |
| 14 | 17.614 | 5.00 | 1.49782 | 82.52 |
| 15 | 2747.644 | 0.20 | | |
| 16 | 20.683 | 4.70 | 1.49782 | 82.52 |
| 17 | −29.639 | 1.00 | 1.67270 | 32.11 |
| 18 | 110.800 | 0.20 | | |
| 19 | 12.594 | 1.65 | 1.72047 | 34.71 |
| 20 | 5.909 | 5.30 | 1.49782 | 82.52 |
| 21 | −13.696 | 1.00 | 1.61340 | 44.27 |
| 22 | 11.538 | 10.50 | | |
| 23 | −7.015 | 0.80 | 1.71300 | 53.89 |
| 24 | 5.609 | 2.00 | 1.80518 | 25.43 |
| 25 | −3.931 | 0.70 | 1.61340 | 44.26 |
| 26 | 5.858 | | | |

TABLE 10-continued

Diffractive optical surface data

Eleventh surface

κ = 1.0000 A2 = −2.50000E−08 A4 = 6.08882E−14
A6 = −2.46978E−16 A8 = −1.96414E−19
A10 = 0.00000E+00

Condition-corresponding values

| (1) | $|(n2 − n1)/(r \cdot d0)| = 0.0074$ |
| (2) | $|h/f| = 0.42$ |
| (3) | $|f12/f| = 3.59$ |
| (4) | $|f3/f| = 3.34$ |
| (5) | $|f2/f| = 58.51$ |
| (6) | N/H = 4.28 |
| (7) | nd1 = 1.52760 |
| (8) | nF1 − nC1 = 0.015 |
| (9) | nd2 = 1.55690 |
| (10) | nF2 − nC2 = 0.011 |

Figure 16:
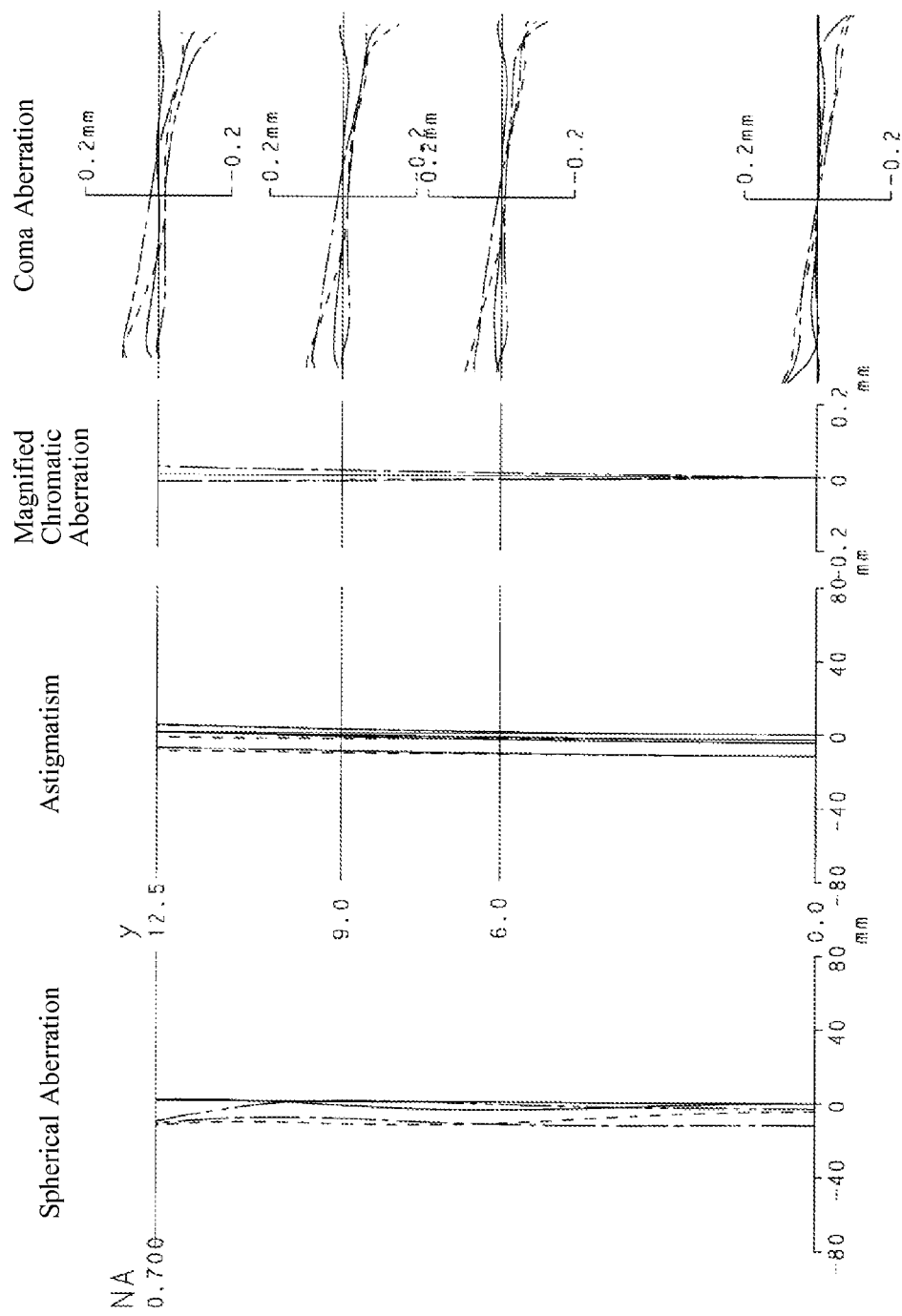
FIG. 16 presents various aberration diagrams of the microscope objective lens according to the eighth example.

Among the condition-corresponding values presented in Table 10, the conditional expression (1) is a value calculated from a curvature radius r of the first surface and refractive indexes n1 and n2 of mediums anterior and posterior to the first surface with respect to the d line. In addition, the conditional expressions (7) and (8) correspond to values of the eleventh surface and the conditional expressions (9) and (10) correspond to values of the ninth surface. As shown, all of the conditional expressions (1) to (10) given above are satisfied in the eighth example. FIG. 16 illustrates various aberration diagrams of spherical aberration, astigmatism, lateral chromatic aberration, and coma aberration of the microscope objective lens OL8 according to the present eighth example. The coma aberration diagram in FIG. 16 illustrates aberration amounts when the image height Y is set to 12.5 mm, to 9.0 mm, to 6.0 mm, and to 0 mm. As is apparent from the various aberration diagrams, similarly in the present eighth example, various aberrations are favorably corrected and superior imaging performance is ensured.

Ninth Example

Figure 17:
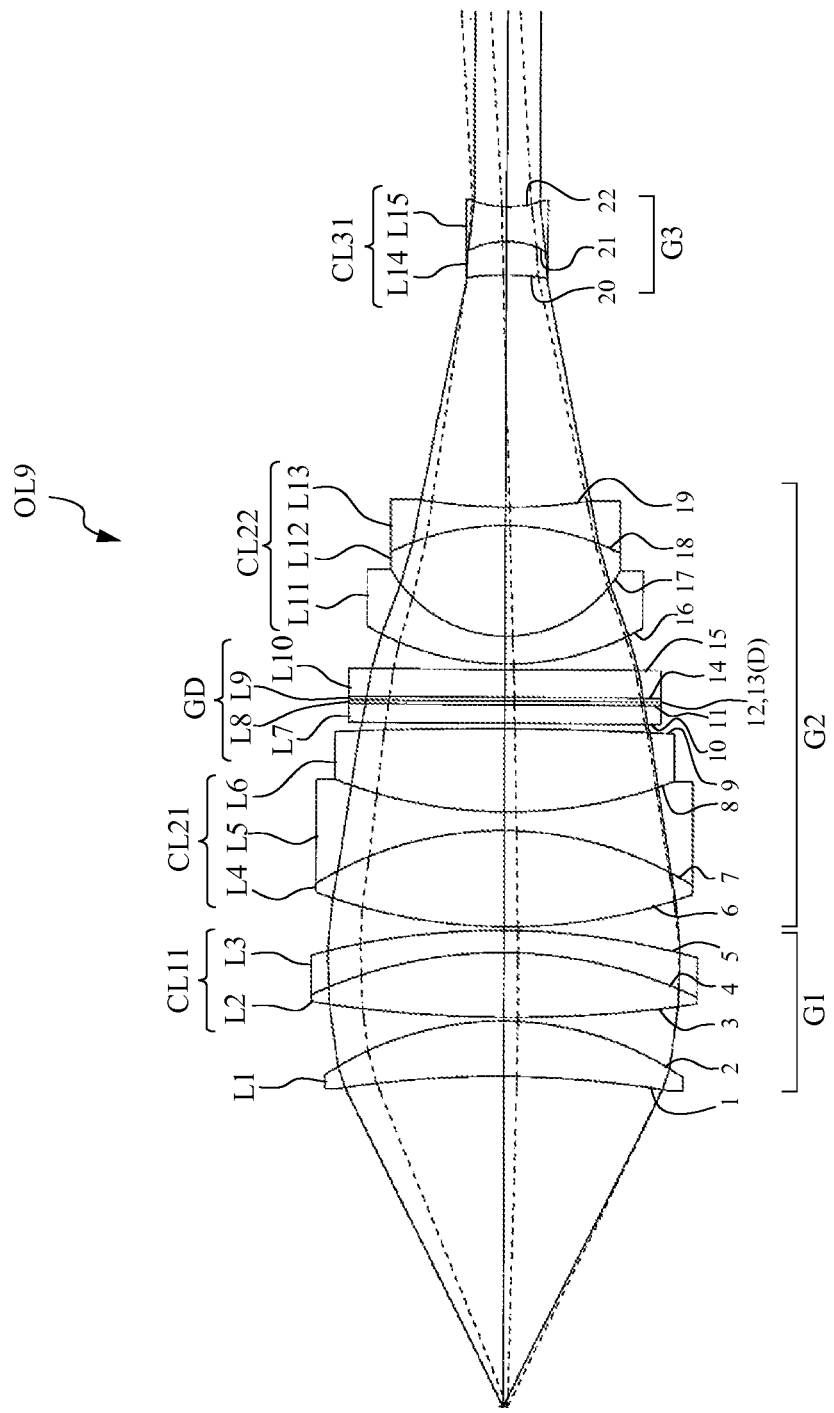
FIG. 17 is a lens configuration diagram of a microscope objective lens according to a ninth example.

Next, a microscope objective lens OL9 illustrated in FIG. 17 will be described as a ninth example. The microscope objective lens OL9 illustrated in FIG. 17 is also a dry objective lens and comprises, in order from the object side, a first lens group G1 having a positive refractive power, a second lens group G2 having a positive refractive power, and a third lens group G3 having a negative refractive power. The first lens group G1 comprises, in order from the object side, a positive meniscus lens L1 whose concave surface faces the object side, and a cemented lens component (achromatizing lens component) CL11 that joins a biconvex lens L2 and a negative meniscus lens L3 whose concave surface faces the object side. In addition, the second lens group G2 comprises, in order from the object side, a cemented lens component (achromatizing lens component) CL21 that joins a biconvex lens L4, a biconcave lens L5, and a biconvex lens L6, a diffractive optical element GD including a diffractive optical surface D and having a plate-like shape, and a cemented lens component (achromatizing lens component) CL22 that joins a negative meniscus lens L11 whose convex surface faces the object side, a biconvex lens L12, and a biconcave lens L13. Furthermore, the third lens group G3 comprises a cemented lens component CL31 that joins, in order from the object side, a positive meniscus lens L14 whose concave surface faces the object side and a biconcave lens L15. As shown, in the present ninth example, the achromatic lens component CL31 comprising the third lens group G3 is configured as a cemented lens component that joins two lenses. In addition, the lens surfaces that restrict an off-axis light bundle that determines an off-axis principal ray and an effective radius in the present ninth example are an image-side surface (second surface) of the positive meniscus lens L1 and an object-side surface (twentieth surface) of the positive meniscus lens L14.

In addition, the diffractive optical element GD according to the present ninth example is also a bonded-multilayer diffractive optical element and joins a plate-like piece of optical glass L7, two plate-like optical members L8 and L9 respectively formed from different resin materials, and a plate-like piece of optical glass L10, in this order. Diffractive grating grooves (diffractive optical surface D) are formed on a bonded surface of the optical members L8 and L9.

Specifications of the microscope objective lens OL9 according to the ninth example and illustrated in FIG. 17 are presented in Table 11. In addition, the surface numbers presented in Table 11 match the surface numbers 1 to 22 illustrated in FIG. 17.

TABLE 11 f = 4.014
NA = 0.45
β = 50x
d0 = 17.83
h = 0.48
f1 = 18.136
f2 = 74.682
f12 = 11.633
f3 = −8.683
N = 61
H = 7.6

| m | r | d | nd | vd |
|---|---|---|---|---|
| 1 | −57.300 | 3.00 | 1.80440 | 39.57 |
| 2 | −17.390 | 0.20 | | |
| 3 | 71.472 | 3.50 | 1.60300 | 65.47 |
| 4 | −24.538 | 1.20 | 1.62004 | 36.24 |
| 5 | −39.899 | 0.20 | | |
| 6 | 30.223 | 5.20 | 1.60300 | 65.47 |
| 7 | −19.420 | 1.00 | 1.64769 | 33.79 |
| 8 | 26.032 | 4.50 | 1.60300 | 65.47 |
| 9 | −200.000 | 0.30 | | |
| 10 | 0.000 | 1.00 | 1.51680 | 64.12 |
| 11 | 0.000 | 0.20 | 1.55690 | 50.17 |
| 12 | 0.000 | 0.00 | 10001.00000 | −3.45 |
| 13* | 0.000 | 0.20 | 1.52760 | 34.71 |
| 14 | 0.000 | 1.50 | 1.51680 | 64.12 |
| 15 | 0.000 | 0.30 | | |
| 16 | 15.092 | 1.50 | 1.67003 | 47.25 |
| 17 | 7.250 | 6.00 | 1.49782 | 82.52 |
| 18 | −14.111 | 1.00 | 1.71700 | 47.93 |
| 19 | 28.782 | 12.50 | | |
| 20 | −14.824 | 1.80 | 1.80518 | 25.43 |
| 21 | −4.550 | 1.85 | 1.60300 | 65.47 |
| 22 | 5.911 | | | |

Diffractive optical surface data

Thirteenth surface

κ = 1.0000 A2 = −6.24941E−08 A4 = 1.04769E−13
A6 = −1.68555E−16 A8 = −1.96387E−19
A10 = 0.00000E+00

Condition-corresponding values

| (1) | $|(n2 - n1)/(r \cdot d0)| = 0.00079$ |
| (2) | $|h/f| = 0.12$ |
| (3) | $|f12/f| = 2.90$ |
| (4) | $|f3/f| = 2.16$ |
| (5) | $|f2/f| = 18.61$ |

TABLE 11-continued

| (6) | N/H = 8.03 |
| (7) | nd1 = 1.52760 |
| (8) | nF1 − nC1 = 0.015 |
| (9) | nd2 = 1.55690 |
| (10) | nF2 − nC2 = 0.011 |

Figure 18:
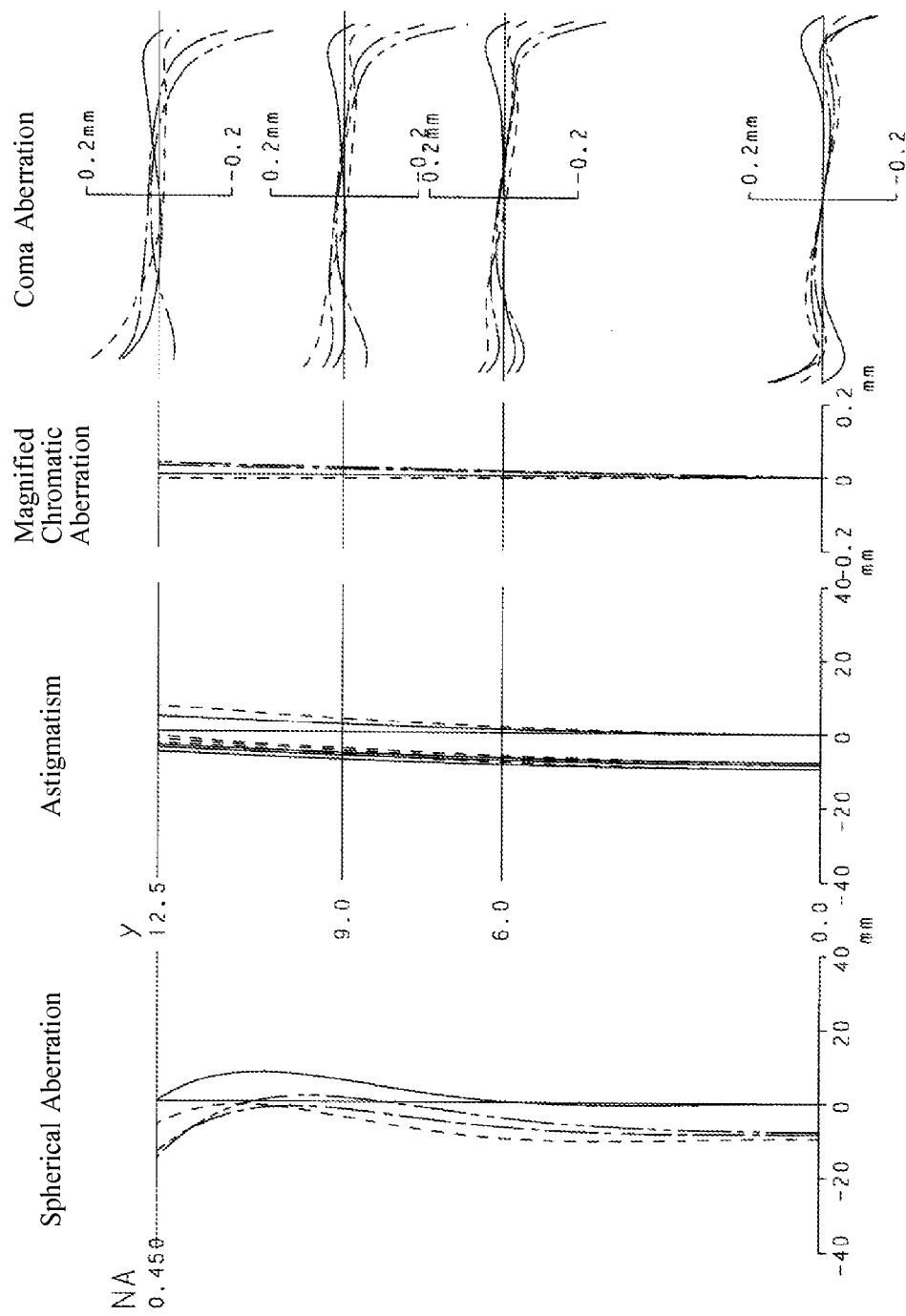
FIG. 18 presents various aberration diagrams of the microscope objective lens according to the ninth example.

Among the condition-corresponding values presented in Table 11, the conditional expression (1) is a value calculated from a curvature radius r of the first surface and refractive indexes n1 and n2 of mediums anterior and posterior to the first surface with respect to the d line. In addition, the conditional expressions (7) and (8) correspond to values of the thirteenth surface and the conditional expressions (9) and (10) correspond to values of the eleventh surface. As shown, all of the conditional expressions (1) to (10) given above are satisfied in the ninth example. FIG. 18 illustrates various aberration diagrams of spherical aberration, astigmatism, lateral chromatic aberration, and coma aberration of the microscope objective lens OL9 according to the present ninth example. The coma aberration diagram in FIG. 18 illustrates aberration amounts when the image height Y is set to 12.5 mm, to 9.0 mm, to 6.0 mm, and to 0 mm. As is apparent from the various aberration diagrams, similarly in the present ninth example, various aberrations are favorably corrected and superior imaging performance is ensured.

Tenth Example

Next, a microscope objective lens OL10 illustrated in FIG. 19 will be described as a tenth example. The microscope objective lens OL10 is a dry objective lens and comprises, in order from the object side, a first lens group G1 having a positive refractive power, a second lens group G2 having a negative refractive power, and a third lens group G3 having a negative refractive power. The first lens group G1 comprises, in order from the object side, a positive meniscus lens (positive lens component) L1 whose concave surface faces the object side, a positive meniscus lens L2 whose concave surface faces the object side, and a cemented lens component CL11 that joins a biconvex lens L3, a biconcave lens L4, and a biconvex lens L5. In addition, the second lens group G2 comprises a cemented lens component CL21 that joins, in order from the object side, a diffractive optical element GD having a biconvex lens-shape and a biconcave lens L10. Furthermore, the third lens group G3 comprises a cemented lens component (achromatic lens component) CL31 that joins, in order from the object side, a biconvex lens L11 and a biconcave lens L12. In the present first example, a positive lens component (positive meniscus lens L1) positioned nearest to the object side in the first lens group G1 has a single lens surface (first surface) having a negative refractive power, and the lens surface (eighteenth surface) nearest to the image side in the third lens group G3 is arranged so that a concave surface thereof faces the image side. In addition, the lens surfaces that restrict an off-axis light bundle that determines an off-axis principal ray and an effective radius in the present tenth example are an object-side surface (fifth surface) of the biconvex lens L3 and an object-side surface (sixteenth surface) of the biconvex lens L11.

Moreover, the diffractive optical element GD according to the present tenth example joins a planoconvex lens L6 whose convex surface faces the object side, two optical members L7 and L8 respectively formed from different resin materials, and a planoconvex lens L9 whose convex surface faces the image side, in this order. Diffractive grating grooves (diffractive optical surface D) are formed on a bonded surface of the optical members L7 and L8. In other words, the diffractive optical element GD is a bonded-multilayer diffractive optical element.

Specifications of the microscope objective lens OL10 according to the tenth example and illustrated in FIG. 19 are presented in Table 12. In Table 12, as described earlier, d0 represents a distance on an optical axis from a specimen (object) to a vertex of a lens surface (first surface) having a negative refractive power and positioned nearest to the object side among lens surfaces having a negative refractive power included in the positive lens component (positive meniscus lens L1) nearest to the object side. Moreover, the present tenth example is configured such that an object (specimen) is observed using a cover glass with a thickness of 0.170 mm, a refractive index of 1.52216 with respect to the d line, and an Abbe's number of 58.8. Therefore, the thickness of the cover glass has been removed from the aforementioned d0. In addition, the surface numbers presented in Table 12 correspond to the surface numbers 1 to 18 illustrated in FIG. 19.

TABLE 12 f = 10.030
NA = 0.75
β = 20x
d0 = 1.426
h = 0.234
f1 = 11.913
f2 = −2083.794
f12 = 11.339
f3 = −842.747
N = 25
H = 9.43

| m | r | d | nd | νd |
|---|---|---|---|---|
| 1 | −5.203 | 10.00 | 1.72916 | 54.7 |
| 2 | −8.542 | 0.15 | | |
| 3 | −494.981 | 5.40 | 1.49782 | 82.5 |
| 4 | −15.368 | 0.15 | | |
| 5 | 93.917 | 5.30 | 1.49782 | 82.5 |
| 6 | −21.131 | 1.50 | 1.61340 | 44.3 |
| 7 | 17.138 | 7.65 | 1.49782 | 82.5 |
| 8 | −24.188 | 0.15 | | |
| 9 | 57.175 | 4.00 | 1.51680 | 64.1 |
| 10 | 0.000 | 0.20 | 1.55690 | 50.2 |
| 11 | 0.000 | 0.00 | 10001.00000 | −3.5 |
| 12* | 0.000 | 0.20 | 1.52760 | 34.7 |
| 13 | 0.000 | 3.80 | 1.60300 | 65.5 |
| 14 | −26.099 | 1.20 | 1.75520 | 27.5 |
| 15 | 166.877 | 14.80 | | |
| 16 | 24.623 | 4.60 | 1.71736 | 29.5 |
| 17 | −41.588 | 1.15 | 1.51742 | 52.3 |
| 18 | 13.348 | | | |

Diffractive optical surface data

Twelfth surface

κ = 1.0000 A2 = −1.6667E−08 A4 = 3.83938E−14
A6 = −1.86752E−16 A8 = −6.20047E−19
A10 = 0.00000E+00

Condition-corresponding values

| (1) | $|(n2 - n1)/(r \cdot dR)| = 0.098$ |
| (2) | $|h/f| = 0.02$ |
| (3) | $|f12/f| = 1.1$ |
| (4) | — |
| (5) | $|f2/f| = 207.7$ |
| (6) | N/H = 2.7 |
| (7) | nd1 = 1.528 |
| (8) | nF1 − nC1 = 0.0152 |
| (9) | nd2 = 1.557 |
| (10) | nF2 − nC2 = 0.0111 |

Figure 20:
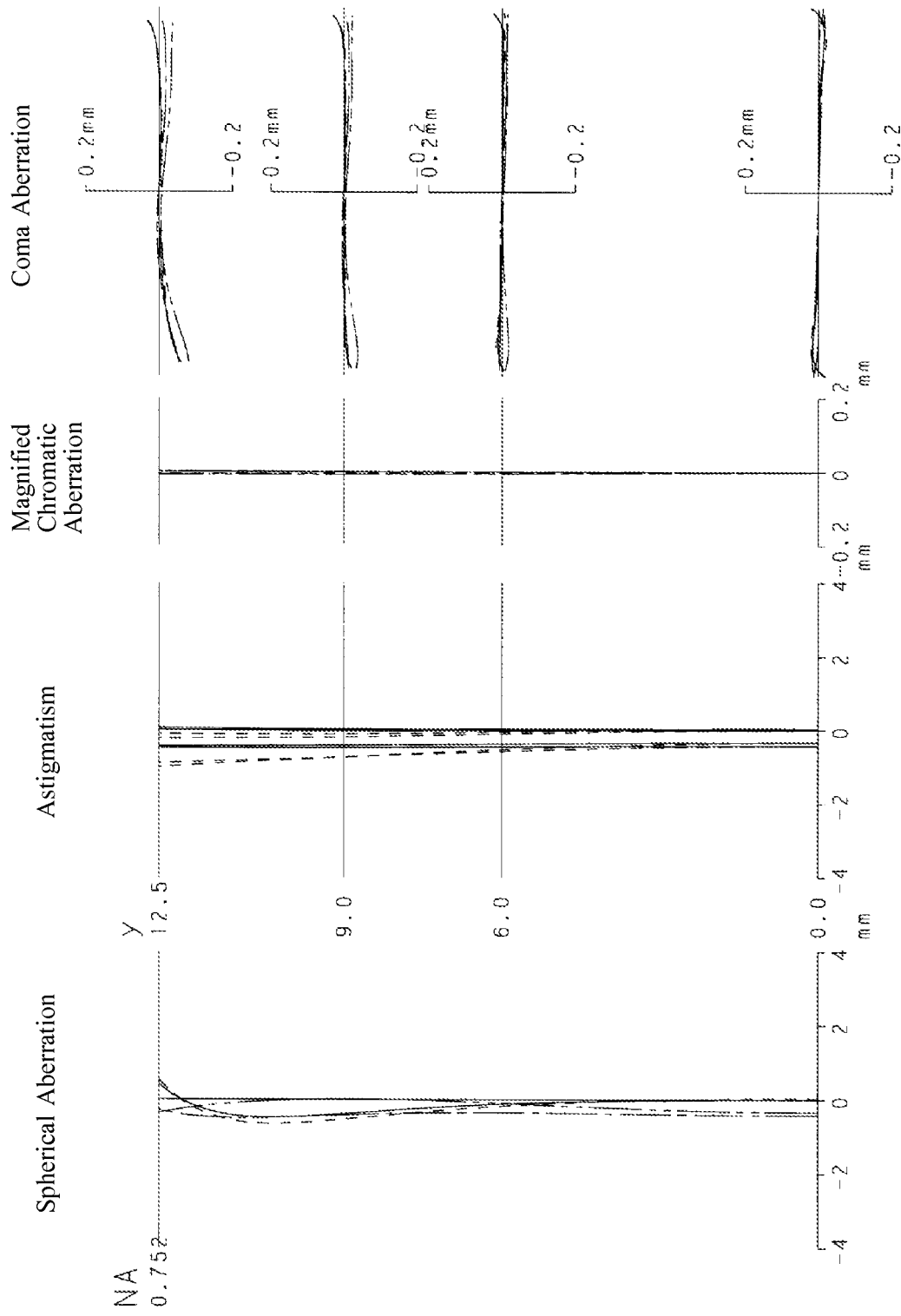
FIG. 20 presents various aberration diagrams of the microscope objective lens according to the tenth example.

Among the condition-corresponding values presented in Table 12, the conditional expression (1) is a value calculated from a curvature radius r of the first surface, refractive indexes n1 and n2 of mediums anterior and posterior to the first surface with respect to the d line, and a distance d0 on an optical axis from the object to the first surface. In addition, the conditional expressions (7) and (8) correspond to values of the twelfth surface and the conditional expressions (9) and (10) correspond to values of the tenth surface. As shown, the conditional expressions (1) to (3) and (5) to (10) given above are all satisfied in the tenth example. FIG. 20 illustrates various aberration diagrams of spherical aberration, astigmatism, lateral chromatic aberration, and coma aberration with respect to rays of the d line, the C line, the F line, and the g line of the microscope objective lens OL10 according to the present tenth example. The coma aberration diagram in FIG. 20 illustrates aberration amounts when the image height Y is set to 12.5 mm, to 9.0 mm, to 6.0 mm, and to 0 mm (the same applies to an eleventh example and to a twelfth example). As is apparent from the various aberration diagrams illustrated in FIG. 20, in the tenth example, various aberrations are favorably corrected and superior imaging performance is ensured.

Eleventh Example

Figure 21:
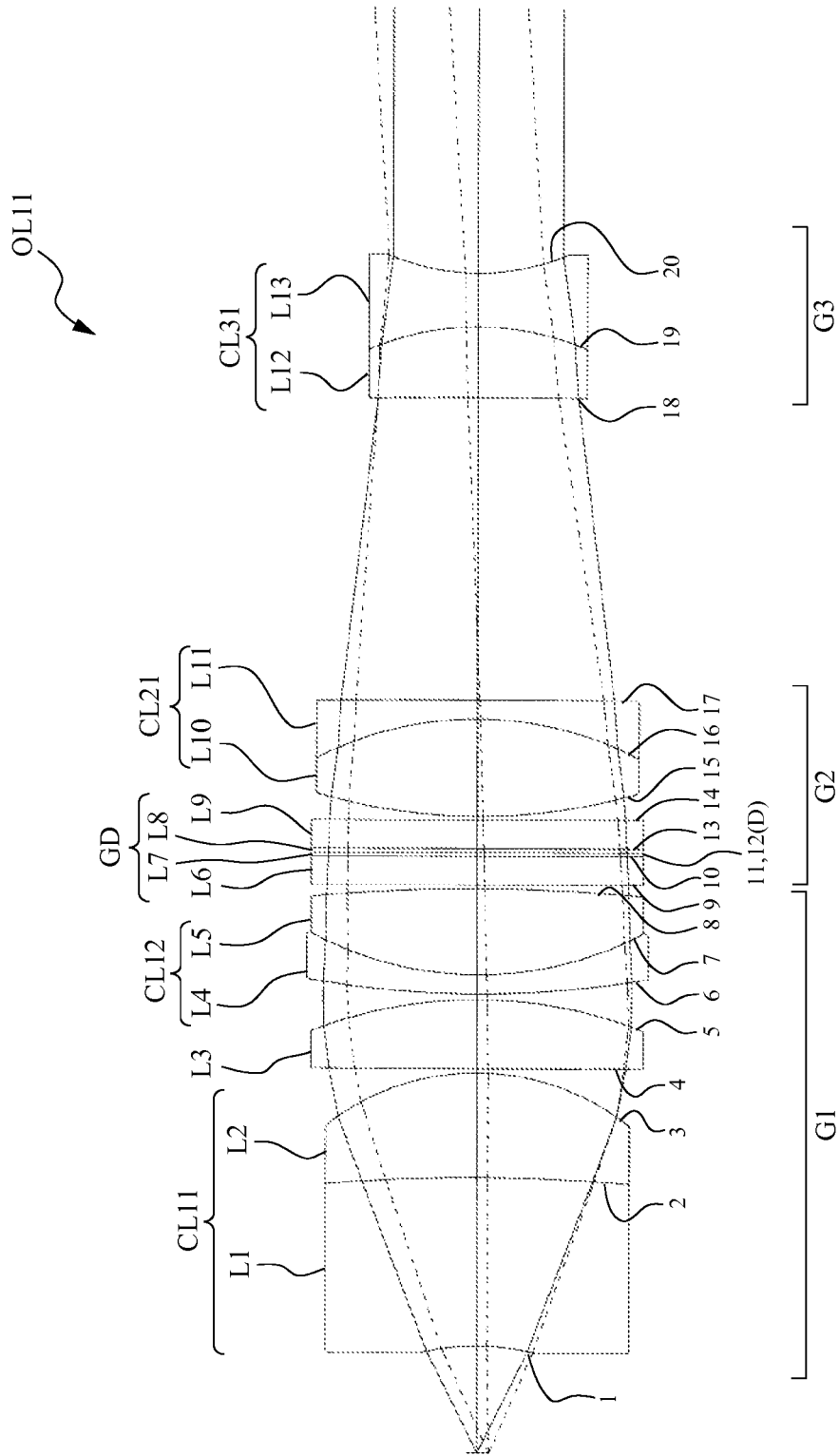
FIG. 21 is a lens configuration diagram of a microscope objective lens according to an eleventh example.

Next, a microscope objective lens OL11 illustrated in FIG. 21 will be described as the eleventh example. The microscope objective lens OL11 illustrated in FIG. 21 is also a dry objective lens and comprises, in order from the object side, a first lens group G1 having a positive refractive power, a second lens group G2 having a positive refractive power, and a third lens group G3 having a negative refractive power. The first lens group G1 comprises, in order from the object side, a cemented lens component (positive lens component) CL11 that joins a negative meniscus lens L1 whose concave surface faces the object side and a positive meniscus lens L2 whose concave surface faces the object side, a biconvex lens L3, and a cemented lens component CL12 that joins a negative meniscus lens L4 whose convex surface faces the object side and a biconvex lens L5. In addition, the second lens group G2 comprises, in order from the object side, a diffractive optical element GD including a diffractive optical surface D and having a plate-like shape, and a cemented lens component CL21 that joins a biconvex lens L10 and a negative meniscus lens L11 whose concave surface faces the object side. Furthermore, the third lens group G3 comprises a cemented lens component (achromatic lens component) CL31 that joins, in order from the object side, a positive meniscus lens L12 whose concave surface faces the object side and a biconcave lens L13. In the present second example, a positive lens component (cemented lens component CL11) positioned nearest to the object side in the first lens group G1 has two lens surfaces (first surface and second surface) having a negative refractive power, and the lens surface (twentieth surface) nearest to the image side in the third lens group G3 is arranged so that a concave surface thereof faces the image side. In addition, the lens surfaces that restrict an off-axis light bundle that determines an off-axis principal ray and an effective radius in the present eleventh example are an image-side surface (third surface) of the positive meniscus lens L2 and an object-side surface (eighteenth surface) of the positive meniscus lens L12.

Furthermore, the diffractive optical element GD according to the present eleventh example is also a bonded-multilayer diffractive optical element and joins a plate-like piece of optical glass L6, two optical members L7 and L8 respectively formed from different resin materials, and a plate-like piece of optical glass L9, in this order. Diffractive grating grooves (diffractive optical surface D) are formed on a bonded surface of the optical members L7 and L8.

Specifications of the microscope objective lens OL11 according to the eleventh example and illustrated in FIG. 21 are presented in Table 13. The surface numbers presented in Table 13 match the surface numbers 1 to 20 illustrated in FIG. 21.

TABLE 13 f = 9.962
NA = 0.45
β = 20x
d0 = 5.561
h = 0.336
f1 = 15.459
f2 = 116.019
f12 = 13.404
f3 = −36.215
N = 26
H = 7.89

| m | r | d | nd | vd |
|---|---|---|---|---|
| 1 | −13.200 | 8.80 | 1.59270 | 35.3 |
| 2 | −89.546 | 5.46 | 1.65160 | 58.5 |
| 3 | −12.975 | 0.20 | | |
| 4 | 1362.063 | 3.65 | 1.49782 | 82.6 |
| 5 | −24.083 | 0.30 | | |
| 6 | 51.899 | 1.00 | 1.64769 | 33.8 |
| 7 | 18.663 | 4.50 | 1.49782 | 82.6 |
| 8 | −93.183 | 0.20 | | |
| 9 | 0.000 | 1.50 | 1.51680 | 64.1 |
| 10 | 0.000 | 0.20 | 1.55690 | 50.2 |
| 11 | 0.000 | 0.00 | 10001.00000 | −3.5 |
| 12* | 0.000 | 0.20 | 1.52760 | 34.7 |
| 13 | 0.000 | 1.50 | 1.51680 | 64.1 |
| 14 | 0.000 | 0.20 | | |
| 15 | 30.634 | 5.10 | 1.49782 | 82.6 |
| 16 | −18.485 | 1.00 | 1.66755 | 42.0 |
| 17 | −1177.040 | 15.83 | | |
| 18 | −550.436 | 3.70 | 1.74077 | 27.8 |
| 19 | −14.581 | 2.80 | 1.51742 | 52.3 |
| 20 | 12.143 | | | |

Diffractive optical surface data

Twelfth surface

κ = 1.0000 A2 = −2.50000E−08 A4 = 1.32542E−13
A6 = −2.23241E−16 A8 = −1.44998E−18
A10 = 0.00000E+00

Condition-corresponding values

| (1) | $|(n2 − n1)/(r \cdot d0)| = 0.008$ |
| (2) | $|h/f| = 0.03$ |
| (3) | $|f12/f| = 1.3$ |
| (4) | — |
| (5) | $|f2/f| = 11.6$ |
| (6) | N/H = 3.3 |
| (7) | nd1 = 1.528 |
| (8) | nF1 − nC1 = 0.0152 |
| (9) | nd2 = 1.557 |
| (10) | nF2 − nC2 = 0.0111 |

Figure 22:
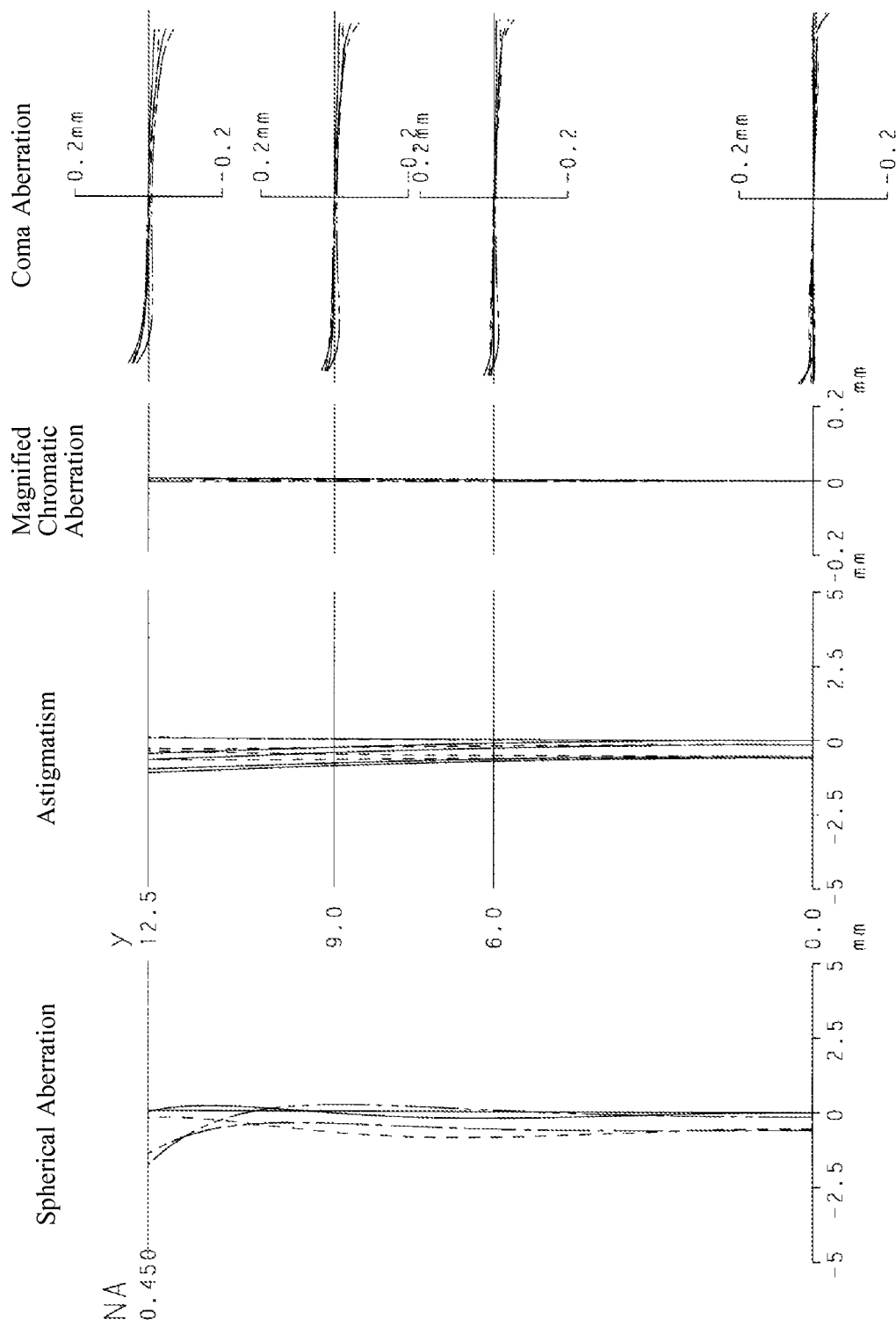
FIG. 22 presents various aberration diagrams of the microscope objective lens according to the eleventh example.

Among the condition-corresponding values presented in Table 13, the conditional expression (1) is a value calculated from a curvature radius r of the first surface, refractive indexes n1 and n2 of mediums anterior and posterior to the first surface with respect to the d line, and a distance d0 on an optical axis from the object to the first surface. In addition, the conditional expressions (7) and (8) correspond to values of the twelfth surface and the conditional expressions (9) and (10) correspond to values of the tenth surface. As shown, the conditional expressions (1) to (3) and (5) to (10) given above are all satisfied in the eleventh example. FIG. 22 illustrates various aberration diagrams of spherical aberration, astigmatism, lateral chromatic aberration, and coma aberration of the microscope objective lens OL11 according to the present eleventh example. As is apparent from the various aberration diagrams, similarly in the present eleventh example, various aberrations are favorably corrected and superior imaging performance is ensured.

Twelfth Example

Figure 23:
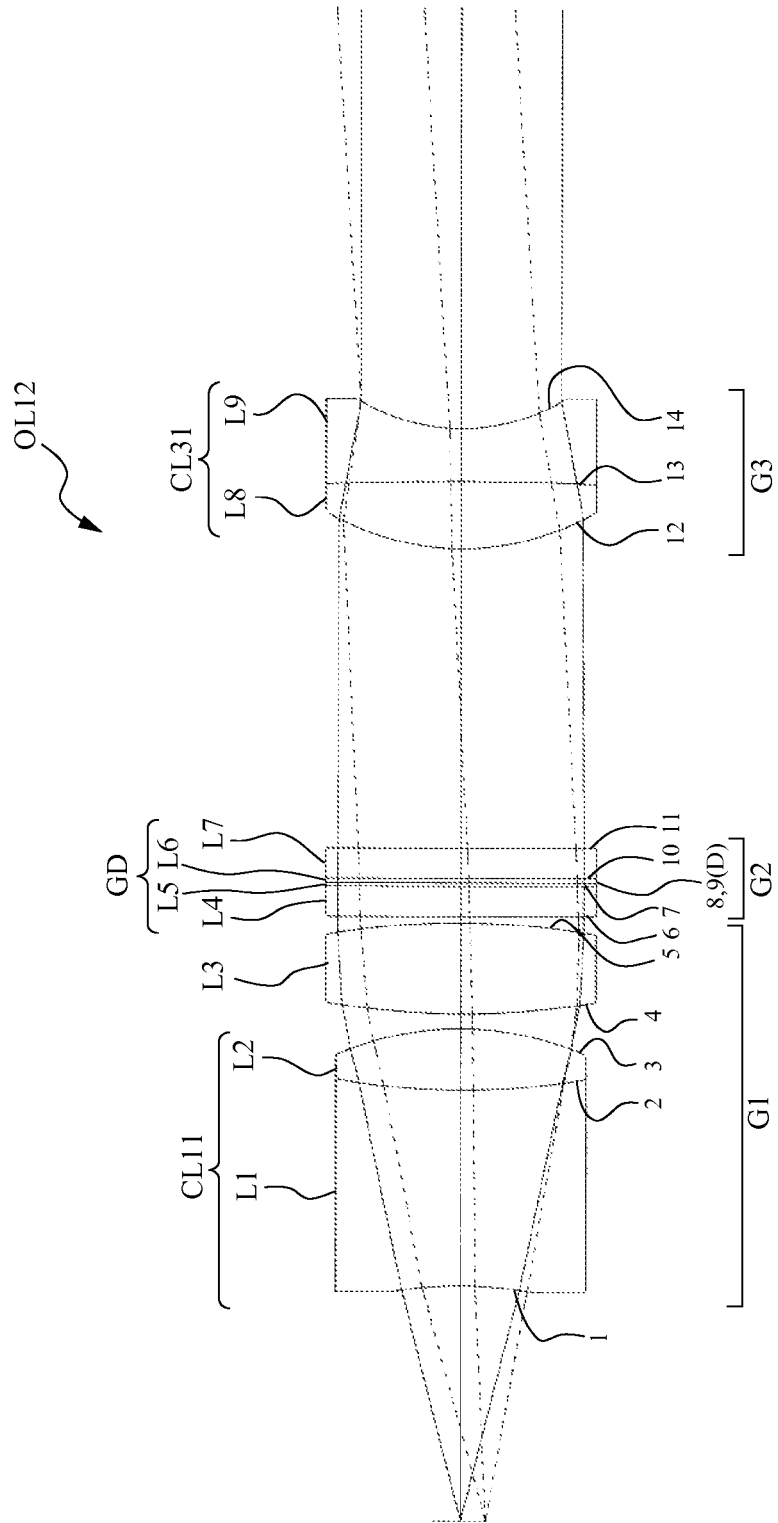
FIG. 23 is a lens configuration diagram of a microscope objective lens according to a twelfth example.

Finally, a microscope objective lens OL12 illustrated in FIG. 23 will be described as a twelfth example. The microscope objective lens OL12 illustrated in FIG. 23 is also a dry objective lens and comprises, in order from the object side, a first lens group G1 having a positive refractive power, a second lens group G2 having a positive refractive power, and a third lens group G3 having a negative refractive power. The first lens group G1 comprises, in order from the object side, a cemented lens component (positive lens component) CL11 that joins a biconcave lens L1 and a biconvex lens L2, and a biconvex lens L3. In addition, the second lens group G2 comprises a diffractive optical element GD having a plate-like shape. Furthermore, the third lens group G3 comprises a cemented lens component (achromatic lens component) CL31 that joins, in order from the object side, a biconvex lens L8 and a biconcave lens L9. In the present third example, similarly, a positive lens component (cemented lens component CL11) positioned nearest to the object side in the first lens group G1 has two lens surfaces (first surface and second surface) having a negative refractive power, and the lens surface (fourteenth surface) nearest to the image side in the third lens group G3 is arranged so that a concave surface thereof faces the image side. In addition, the lens surfaces that restrict an off-axis light bundle that determines an off-axis principal ray and an effective radius in the present twelfth example are an image-side surface (third surface) of the biconvex lens L2 and an image-side surface (fourteenth surface) of the biconcave lens L9.

Furthermore, the diffractive optical element GD according to the present twelfth example is also a bonded-multilayer diffractive optical element and joins a plate-like piece of optical glass L4, two optical members L5 and L6 respectively formed from different resin materials, and a plate-like piece of optical glass L7, in this order. Diffractive grating grooves (diffractive optical surface D) are formed on a bonded surface of the optical members L5 and L6.

Specifications of the microscope objective lens OL12 according to the twelfth example and illustrated in FIG. 23 are presented in Table 14. The surface numbers presented in Table 14 match the surface numbers 1 to 14 illustrated in FIG. 23.

TABLE 14 f = 20.015
NA = 0.25
β = 10x
d0 = 11.600
h = 0.381
f1 = 24.397
f2 = 1200.063
f12 = 23.824
f3 = −2110.168
N = 27
H = 6.15

| m | r | d | nd | vd |
|---|---|---|---|---|
| 1 | −20.000 | 9.70 | 1.80384 | 33.9 |
| 2 | 36.020 | 3.05 | 1.60300 | 65.5 |

TABLE 14-continued

| | | | | |
|---|---|---|---|---|
| 3 | −15.779 | 0.75 | | |
| 4 | 40.984 | 4.50 | 1.60311 | 60.7 |
| 5 | −39.626 | 0.30 | | |
| 6 | 0.000 | 1.50 | 1.51680 | 64.1 |
| 7 | 0.000 | 0.20 | 1.55690 | 50.2 |
| 8 | 0.000 | 0.00 | 10001.00000 | −3.5 |
| 9* | 0.000 | 0.20 | 1.52760 | 34.7 |
| 10 | 0.000 | 1.50 | 1.51680 | 64.1 |
| 11 | 0.000 | 14.90 | | |
| 12 | 13.519 | 3.30 | 1.56883 | 56.3 |
| 13 | −180.667 | 2.65 | 1.51823 | 58.9 |
| 14 | 10.140 | | | |

Diffractive optical surface data

Ninth surface

κ = 1.0000  A2 = −4.16667E−08  A4 = 1.32746E−13
A6 = −2.17799E−16  A8 = −1.31199E−18
A10 = 0.00000E+00

Condition-corresponding values

| | |
|---|---|
| (1) | $|(n2 - n1)/(r \cdot d0)| = 0.003$ |
| (2) | $|h/f| = 0.02$ |
| (3) | $|f12/f| = 1.2$ |
| (4) | — |
| (5) | $|f2/f| = 60.0$ |
| (6) | N/H = 4.4 |
| (7) | nd1 = 1.528 |
| (8) | nF1 − nC1 = 0.0152 |
| (9) | nd2 = 1.557 |
| (10) | nF2 − nC2 = 0.0111 |

Figure 24:
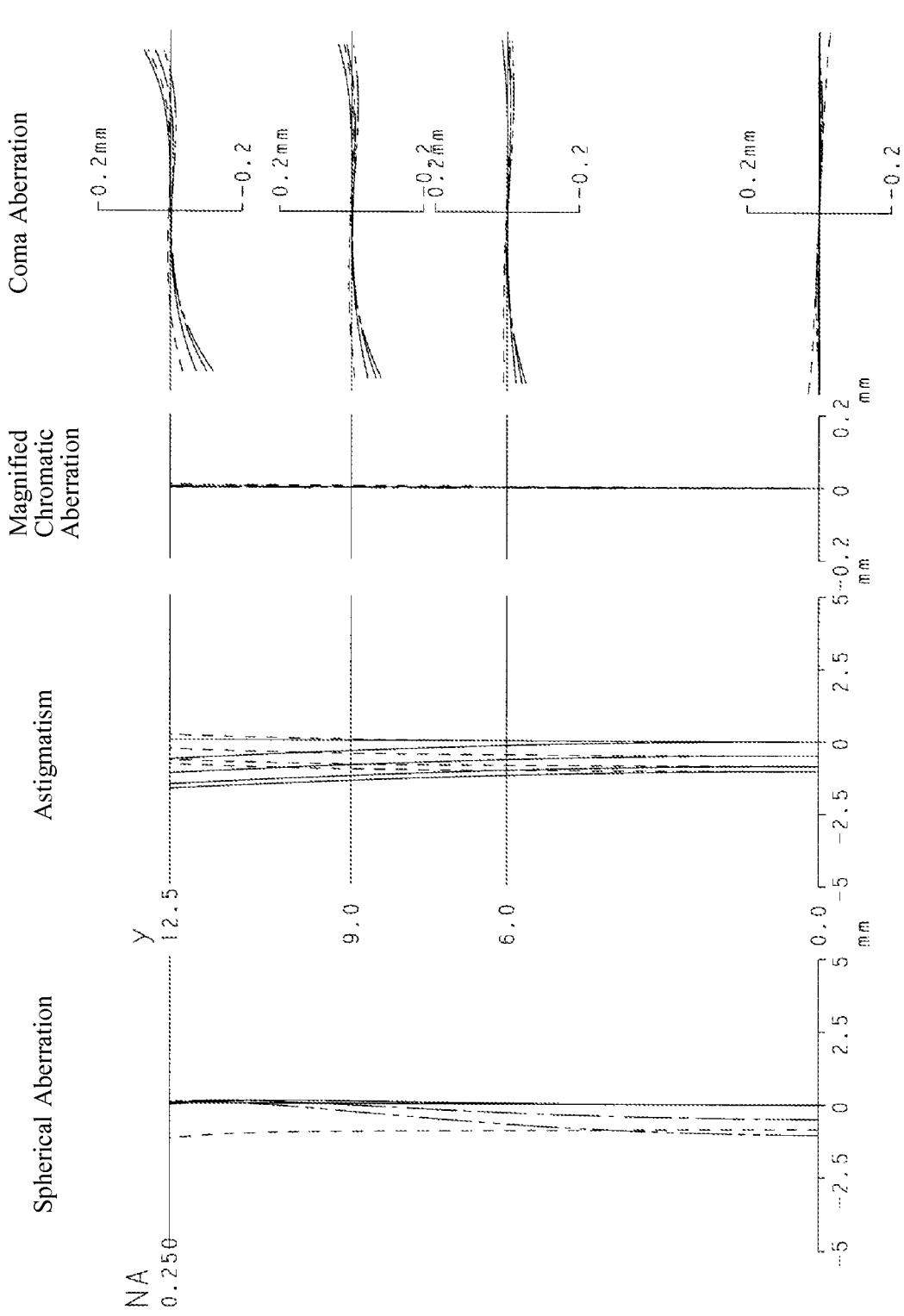
FIG. 24 presents various aberration diagrams of the microscope objective lens according to the twelfth example.

Among the condition-corresponding values presented in Table 14, the conditional expression (1) is a value calculated from a curvature radius r of the first surface, refractive indexes n1 and n2 of mediums anterior and posterior to the first surface with respect to the d line, and a distance d0 on an optical axis from the object to the first surface. In addition, the conditional expressions (7) and (8) correspond to values of the ninth surface and the conditional expressions (9) and (10) correspond to values of the seventh surface. As shown, the conditional expressions (1) to (3) and (5) to (10) given above are all satisfied in the twelfth example. FIG. 24 illustrates various aberration diagrams of spherical aberration, astigmatism, lateral chromatic aberration, and coma aberration of the microscope objective lens OL12 according to the present twelfth example. As is apparent from the various aberration diagrams, similarly in the present twelfth example, various aberrations are favorably corrected and superior imaging performance is ensured.

The invention claimed is:

1. A microscope objective lens comprising, in order from an object side:
a first lens group having a positive refractive power,
a second lens group, and
a third lens group having a negative refractive power, wherein
the first lens group includes a positive lens component having a lens surface positioned nearest to the object side and having a negative refractive power,
the second lens group includes a diffractive optical element that joins two diffractive element components respectively made from different optical materials and which has a diffractive optical surface on which diffractive grating grooves are formed on a bonded surface of the two diffractive element components,
the third lens group includes at least one achromatic lens component having a negative refractive power, and a lens surface of the third lens group nearest to an image side is arranged so that a concave surface of the lens surface faces the image side,
the microscope objective lens is configured such that if r denotes a curvature radius of the lens surface positioned nearest to the object side and having a negative refractive power among lens surfaces having a negative refractive power included in the positive lens component provided in the first lens group, n1 denotes a refractive index of an object-side medium of the lens surface having a negative refractive power with respect to a d line, n2 denotes a refractive index of an image-side medium with respect to the d line, and d0 denotes a distance on an optical axis from a vertex of the lens surface having a negative refractive power to the object, then the microscope objective lens satisfies a condition expressed by $|(n2-n1)/(r \cdot d0)| \leq 0.1$, and if f denotes a focal length of the microscope objective lens and h denotes a height from an optical axis of a principal ray of a light bundle passing through the diffractive optical surface and corresponding to a maximum field angle, then the microscope objective lens satisfies a condition expressed by $0.01 \leq |h/f| \leq 0.04$.

2. The microscope objective lens according to claim 1, wherein
if f2 denotes a focal length of the second lens group, then the microscope objective lens satisfies a condition expressed by $10 \leq |f2/f1|$.

3. The microscope objective lens according to claim 1, wherein
if N denotes a number of diffractive grating grooves of the diffractive optical surface of the diffractive optical element and H denotes an effective radius of the diffractive optical surface, then the microscope objective lens satisfies a condition expressed by $2 \leq N/H \leq 5$.

4. The microscope objective lens according to claim 1, wherein
if nd1, nF1, and nC1 respectively denote refractive indexes of a material of a diffractive element component whose refractive index and Abbe's number are smaller among the two diffractive element components of the diffractive optical element with respect to the d line, an F line, and a C line, and nd2, nF2, and nC2 respectively denote refractive indexes of a material of a diffractive element component whose refractive index and Abbe's number are greater among the two diffractive element components of the diffractive optical element with respect to the d line, the F line, and the C line, then the microscope objective lens satisfies conditions expressed by $nd1 \leq 1.54$, $0.0145 \leq nF1 - nC1$, $1.55 \leq nd2$, and $nF2 - nC2 \leq 0.013$.

* * * * *